US012785604B2

(12) United States Patent
Furukawa

(10) Patent No.: US 12,785,604 B2
(45) Date of Patent: Nov. 3, 2026

(54) AC ROTARY MACHINE CONTROLLER, VEHICLE DRIVING APPARATUS, AND ELECTRIC POWER STEERING APPARATUS

(71) Applicant: Mitsubishi Electric Corporation, Tokyo (JP)

(72) Inventor: Akira Furukawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 276 days.

(21) Appl. No.: 18/691,740

(22) PCT Filed: Nov. 11, 2021

(86) PCT No.: PCT/JP2021/041546
§ 371 (c)(1),
(2) Date: Mar. 13, 2024

(87) PCT Pub. No.: WO2023/084693
PCT Pub. Date: May 19, 2023

(65) Prior Publication Data

US 2024/0388234 A1 Nov. 21, 2024

(51) Int. Cl.
*H02P 27/08* (2006.01)
*H02P 25/022* (2016.01)

(52) U.S. Cl.
CPC ............ *H02P 27/08* (2013.01); *H02P 25/022* (2013.01)

(58) Field of Classification Search
CPC .......... H02P 27/06; H02P 27/08; H02P 21/22; H02P 25/022; H02P 27/085; H02P 6/10;
(Continued)

(56) References Cited

U.S. PATENT DOCUMENTS

2011/0221375 A1* 9/2011 Suzuki .................... H02P 27/08
318/496
2016/0190972 A1 6/2016 Mori et al.
(Continued)

FOREIGN PATENT DOCUMENTS

JP 2011-061950 A 3/2011
JP 2020-137233 A 8/2020
WO 2015/068300 A1 5/2015

OTHER PUBLICATIONS

Extended European Search Report issued Dec. 5, 2024 in European Application No. 21964048.9.
(Continued)

*Primary Examiner* — Antony M Paul
(74) *Attorney, Agent, or Firm* — Sughrue Mion, PLLC

(57) ABSTRACT

To provide an AC rotary machine controller, a vehicle driving apparatus, and an electric power steering apparatus which can reduce the influence of the leakage current generated by the variation of the voltage of winding terminal of each phase by turning on and off the switching devices. An AC rotary machine controller executes, for each set, a flat-top two-phase modulation or a flat-bottom two-phase modulation; generates first comparison pulse wave and second comparison pulse wave; shifts one or both of paired the first comparison pulse wave and the second comparison pulse wave in an advance direction or a delay direction so that a rising timing of one of paired the first comparison pulse wave and the second comparison pulse wave coincides with a falling timing of the other.

18 Claims, 36 Drawing Sheets

(58) Field of Classification Search
CPC .......... H02P 21/14; H02P 21/05; H02P 27/12; H02P 29/50; H02P 6/28; H02P 2101/45; H02M 7/5395; H02M 7/48; H02M 7/53875; H02M 7/5387; H02M 7/53871; H02M 1/0009; H02M 1/0025; B60L 2220/14; B60L 2240/427; B60L 15/20; B62D 5/0463; B62D 5/0409; B62D 5/046
See application file for complete search history.

(56) References Cited

U.S. PATENT DOCUMENTS

| | | | | |
|---|---|---|---|---|
| 2018/0269771 | A1* | 9/2018 | Mori ................. | H02M 7/53873 |
| 2021/0111658 | A1 | 4/2021 | Miyake et al. | |

OTHER PUBLICATIONS

Hobraiche et al., "A New PWM Strategy to Reduce the Inverter Input Current Ripples", IEEE Transactions on Power Electronics, vol. 24, No. 1, Jan. 2009, pp. 172-180 (9 Pages total).
Liu et al., "Reduction of Common-Mode Voltage in Multiphase Two-Level Inverters Using SPWM With Phase-Shifted Carriers", IEEE Transactions on Power Electronics, vol. 31, No. 9, Sep. 2016, pp. 6631-6645 (15 Pages total).
Shen et al., "Common-Mode Voltage Elimination for Dual Two-Level Inverter-Fed Asymmetrical Six-Phase PMSM", IEEE Transactions on Power Electronics, vol. 35, No. 4, Apr. 2020, pp. 3828-3840 (13 Pages total).
Tcai et al., "DC-link Ripple Reduction in a DPWM-Based Two-Level VSI", Energies, vol. 11, No. 3008, Nov. 1, 2018, pp. 1-16 (16 Pages total).
International Search Report for PCT/JP2021/041546 dated Jan. 25, 2022.
Nguyen et al., "A Direct Digital Technique Implementation of General Discontinuous Pulse Width Modulation Strategy", IEEE Transactions on Industrial Electronics, Sep. 2011, vol. 58, No. 9, pp. 4445-4454.
Communication dated Jun. 24, 2026, issued in European Application No. 21 964 048.9.

* cited by examiner

FIG. 8

A

POWER-FACTOR ANGLE = 0 degree

| θi1 [Degree] | 0 ~ 30 | 30 ~ 60 | 60 ~ 90 | 90 ~ 120 | 120 ~ 150 | 150 ~ 180 | 180 ~ 210 | 210 ~ 240 | 240 ~ 270 | 270 ~ 300 | 300 ~ 330 | 330 ~ 360 |
|---|---|---|---|---|---|---|---|---|---|---|---|---|
| PHASE OF MAXIMUM CURRENT ABSOLUTE VALUE | U1 | W1 | | V1 | | U1 | | W1 | | V1 | | U1 |
| PHASE OF Vmax1 | U1 | | V1 | | | | W1 | | | | U1 | |
| PHASE OF Vmid1 | V1 | | U1 | | W1 | | V1 | | U1 | | W1 | |
| PHASE OF Vmin1 | W1 | | | | U1 | | | | V1 | | | |
| SWITCHING STOP PHASE | U1 | W1 | | V1 | | U1 | | W1 | | V1 | | U1 |
| CARRIER WAVE SIGNAL FOR U1 PHASE | C1 | C1 | | | | C2 | | C2 | | | | C1 |
| CARRIER WAVE SIGNAL FOR V1 PHASE | C2 | | | C1 | | C1 | | | | C2 | | C2 |
| CARRIER WAVE SIGNAL FOR W1 PHASE | C1 | C2 | | C2 | | | | C1 | | C1 | | |

FIG. 11

POWER-FACTOR ANGLE = 60 degrees

B

<table>
<tr><td>θi1 [Degree]</td><td>0 ~ 30</td><td>~ 60</td><td>~ 90</td><td>~ 120</td><td>~ 150</td><td>~ 180</td><td>~ 210</td><td>~ 240</td><td>~ 270</td><td>~ 300</td><td>~ 330</td><td>~ 360</td></tr>
<tr><td>PHASE OF MAXIMUM CURRENT ABSOLUTE VALUE</td><td>U1</td><td colspan="2">W1</td><td colspan="2">V1</td><td colspan="2">U1</td><td colspan="2">W1</td><td colspan="2">V1</td><td>U1</td></tr>
<tr><td>PHASE OF Vmax1</td><td colspan="4">V1</td><td colspan="4">W1</td><td colspan="4">U1</td></tr>
<tr><td>PHASE OF Vmid1</td><td colspan="2">U1</td><td colspan="2">W1</td><td colspan="2">V1</td><td colspan="2">U1</td><td colspan="2">W1</td><td colspan="2">V1</td></tr>
<tr><td>PHASE OF Vmin1</td><td colspan="2">W1</td><td colspan="4">U1</td><td colspan="4">V1</td><td colspan="2">W1</td></tr>
<tr><td>SWITCHING STOP PHASE</td><td>V1</td><td>W1</td><td>U1</td><td>V1</td><td>W1</td><td>U1</td><td>V1</td><td>W1</td><td>U1</td><td>V1</td><td>W1</td><td>U1</td></tr>
<tr><td>CARRIER WAVE SIGNAL FOR U1 PHASE</td><td colspan="2">C1</td><td>C1</td><td colspan="2">C1</td><td>C2</td><td colspan="2">C2</td><td>C2</td><td colspan="2">C2</td><td>C1</td></tr>
<tr><td>CARRIER WAVE SIGNAL FOR V1 PHASE</td><td>C2</td><td colspan="2">C2</td><td>C1</td><td colspan="2">C1</td><td>C1</td><td colspan="2">C1</td><td>C2</td><td colspan="2">C2</td></tr>
<tr><td>CARRIER WAVE SIGNAL FOR W1 PHASE</td><td>C1</td><td>C2</td><td colspan="2">C2</td><td>C2</td><td colspan="2">C2</td><td>C1</td><td colspan="2">C1</td><td>C1</td><td>C1</td></tr>
</table>

FIG. 13

| SPu | SNu | SPv | SNv | SPw | SNw | VOLTAGE VECTOR | BUS CURRENT Iinv |
|---|---|---|---|---|---|---|---|
| 0 | 1 | 0 | 1 | 0 | 1 | V0 | 0 |
| 1 | 0 | 0 | 1 | 0 | 1 | V1 | Iu |
| 1 | 0 | 1 | 0 | 0 | 1 | V2 | −Iw |
| 0 | 1 | 1 | 0 | 0 | 1 | V3 | Iv |
| 0 | 1 | 1 | 0 | 1 | 0 | V4 | −Iu |
| 0 | 1 | 0 | 1 | 1 | 0 | V5 | Iw |
| 1 | 0 | 0 | 1 | 1 | 0 | V6 | −Iv |
| 1 | 0 | 1 | 0 | 1 | 0 | V7 | 0 |

FIG. 18

A ↓ POWER-FACTOR ANGLE = 0 degree

<table>
<tr><th>θi1 [Degree]</th><th>0 ~ 30</th><th>30 ~ 60</th><th>60 ~ 90</th><th>90 ~ 120</th><th>120 ~ 150</th><th>150 ~ 180</th><th>180 ~ 210</th><th>210 ~ 240</th><th>240 ~ 270</th><th>270 ~ 300</th><th>300 ~ 330</th><th>330 ~ 360</th></tr>
<tr><td>PHASE OF MAXIMUM CURRENT ABSOLUTE VALUE</td><td colspan="2">U2</td><td colspan="2">W2</td><td colspan="2">V2</td><td colspan="2">U2</td><td colspan="2">W2</td><td colspan="2">V2</td></tr>
<tr><td>PHASE OF Vmax2</td><td colspan="3">U2</td><td colspan="4">V2</td><td colspan="4">W2</td><td>U2</td></tr>
<tr><td>PHASE OF Vmid2</td><td>W2</td><td colspan="2">V2</td><td colspan="2">U2</td><td colspan="2">W2</td><td colspan="2">V2</td><td colspan="2">U2</td><td>W2</td></tr>
<tr><td>PHASE OF Vmin2</td><td>V2</td><td colspan="4">W2</td><td colspan="4">U2</td><td colspan="3">V2</td></tr>
<tr><td>SWITCHING STOP PHASE</td><td colspan="2">U2</td><td colspan="2">W2</td><td colspan="2">V2</td><td colspan="2">U2</td><td colspan="2">W2</td><td colspan="2">V2</td></tr>
<tr><td>CARRIER WAVE SIGNAL FOR U2 PHASE</td><td colspan="2">C1</td><td colspan="4">C1</td><td colspan="2">C2</td><td colspan="4">C2</td></tr>
<tr><td>CARRIER WAVE SIGNAL FOR V2 PHASE</td><td colspan="4">C2</td><td colspan="2">C1</td><td colspan="4">C1</td><td colspan="2">C2</td></tr>
<tr><td>CARRIER WAVE SIGNAL FOR W2 PHASE</td><td colspan="2">C1</td><td colspan="2">C2</td><td colspan="4">C2</td><td colspan="2">C1</td><td colspan="2">C1</td></tr>
</table>

FIG. 19

POWER-FACTOR ANGLE = 60 degrees

B

| θi 1 [Degree] | 0 ~ 30 | 30 ~ 60 | 60 ~ 90 | 90 ~ 120 | 120 ~ 150 | 150 ~ 180 | 180 ~ 210 | 210 ~ 240 | 240 ~ 270 | 270 ~ 300 | 300 ~ 330 | 330 ~ 360 |
|---|---|---|---|---|---|---|---|---|---|---|---|---|
| PHASE OF MAXIMUM CURRENT ABSOLUTE VALUE | U2 | | W2 | | V2 | | U2 | | W2 | | V2 | |
| PHASE OF Vmax2 | U2 | V2 | | | | W2 | | | | U2 | | |
| PHASE OF Vmid2 | V2 | U2 | | W2 | | V2 | | U2 | | W2 | | V2 |
| PHASE OF Vmin2 | W2 | W2 | | U2 | | | | V2 | | | | W2 |
| SWITCHING STOP PHASE | U2 | V2 | W2 | U2 | V2 | W2 | U2 | V2 | W2 | U2 | V2 | W2 |
| CARRIER WAVE SIGNAL FOR U2 PHASE | C1 | C1 | | C1 | C1 | | C2 | C2 | | C2 | C2 | |
| CARRIER WAVE SIGNAL FOR V2 PHASE | C2 | C2 | C2 | | C1 | C1 | | C1 | C1 | | C2 | C2 |
| CARRIER WAVE SIGNAL FOR W2 PHASE | C1 | | C2 | C2 | | C2 | C2 | | C1 | C1 | | C1 |

FIG. 32

POWER-FACTOR ANGLE = 0 degree

| θi1 [Degree] | 0 ~ 30 | 30 ~ 60 | 60 ~ 90 | 90 ~ 120 | 120 ~ 150 | 150 ~ 180 | 180 ~ 210 | 210 ~ 240 | 240 ~ 270 | 270 ~ 300 | 300 ~ 330 | 330 ~ 360 |
|---|---|---|---|---|---|---|---|---|---|---|---|---|
| PHASE OF MAXIMUM CURRENT ABSOLUTE VALUE | U1 | W1 | | V1 | | U1 | | W1 | | V1 | | U1 |
| PHASE OF Vmax1 | U1 | | V1 | | | | W1 | | | | U1 | |
| PHASE OF Vmid1 | V1 | | U1 | | W1 | | V1 | | U1 | | W1 | |
| PHASE OF Vmin1 | W1 | | | | U1 | | | | V1 | | | |
| PHASE OF Vmax2 | U2 | | V2 | | | | W2 | | | | U2 | |
| PHASE OF Vmid2 | V2 | | U2 | | W2 | | V2 | | U2 | | W2 | |
| PHASE OF Vmin2 | W2 | | | | U2 | | | | V2 | | | |
| SWITCHING STOP PHASE | U1<br>U2 | W1<br>W2 | | V1<br>V2 | | U1<br>U2 | | W1<br>W2 | | V1<br>V2 | | U1<br>U2 |
| CARRIER WAVE SIGNAL OF FIRST SET | C1 | | | | | | | | | | | |
| CARRIER WAVE SIGNAL OF SECOND SET | C2 | | | | | | | | | | | |

AC ROTARY MACHINE CONTROLLER, VEHICLE DRIVING APPARATUS, AND ELECTRIC POWER STEERING APPARATUS

CROSS REFERENCE TO RELATED APPLICATIONS

This application is a National Stage of International Application No. PCT/JP2021/041546 filed Nov. 11, 2021.

TECHNICAL FIELD

The present disclosure relates to an AC rotary machine controller, a vehicle driving apparatus, and an electric power steering apparatus.

BACKGROUND ART

In the power converter described in patent document 1, in two inverters, using two carrier wave signals whose phases differ by 180 degrees with each other, the mode in which the effective voltage vectors are set at the same time is avoided, and the ripple current of capacitor is reduced. In the power converter described in patent document 2, by stopping switching of one phase of the first electric power converter and one phase of the second electric power converter, and making the carrier wave signals of remaining two phase in each electric power converter different, the ripple current of capacitor is reduced. In the power converter described in patent document 3, by adjoining or coinciding the voltage vectors outputted in two inverters, the change of phase current is suppressed.

CITATION LIST

Patent Literature

Patent document 1: JP 2011-61950 A
Patent document 2: JP 2020-137233 A
Patent document 3: WO 2015/68300 A

SUMMARY OF INVENTION

Technical Problem

In the electric power converter which controls the applied voltages to windings by turning on and off the switching devices, the voltage of winding terminal of each phase is varied by switching operation, a leakage current flows via a floating capacitance which exists between the winding terminal of each phase, and the ground. As the result, an electromagnetic noise is generated.

In the case where the control techniques of patent document 1 and patent document 2 are used, by providing the switching stop phase which stops switching, the number of variation times of the voltage of winding terminal of each phase by turning on and off the switching devices can be reduced to 8 times compared with 12 times of the modulation method which does not provide the switching stop phase. If the influence of the leakage current generated by the variation of the voltage of winding terminal of each phase by turning on and off the switching devices can be further reduced, the electromagnetic noise can be further reduced.

Then, the purpose of the present disclosure is to provide an AC rotary machine controller, a vehicle driving apparatus, and an electric power steering apparatus which can reduce the influence of the leakage current generated by the variation of the voltage of winding terminal of each phase by turning on and off the switching devices.

Solution to Problem

An AC rotary machine controller according to the present disclosure that controls an AC rotary machine having a stator provided with m sets of n-phase windings (m is one or more natural numbers, and n is three or more natural numbers) via m sets of inverters, the AC rotary machine controller including:

- a voltage command calculation unit that, for each set of m sets, calculates voltage command values of n-phase applied to the n-phase windings; and
- a PWM control unit that, for each set of m sets, generates pulse waves of n-phase by comparing each of the voltage command values of n-phase with a carrier wave signal oscillating at a PWM period, and turns on and off application of a DC voltage to a winding terminal of each phase by turning on and off switching devices of each phase of the inverter by each of the pulse waves of n-phase;
- wherein, for each set of m sets, the voltage command calculation unit calculates basic voltage command values of n-phase; and executes a flat-top two-phase modulation that calculates an offset voltage which makes the voltage command value of a phase of a maximum voltage in the voltage command values of n-phase coincide with a maximum value of the carrier wave signal, and calculates the voltage command values of n-phase by subtracting the offset voltage from the basic voltage command values of n-phase, or a flat-bottom two-phase modulation that calculates the offset voltage which makes the voltage command value of a phase of a minimum voltage in the voltage command values of n-phase coincide with a minimum value of the carrier wave signal, and calculates the voltage command values of n-phase by subtracting the offset voltage from the basic voltage command values of n-phase, and
- wherein the PWM control unit uses, as the carrier wave signal, a first carrier wave signal, and a second carrier wave signal which differs from the first carrier wave signal by 180 degrees in phase;
- the PWM control unit generates at least one first comparison pulse wave which is at least one the pulse wave by comparing the first carrier wave signal with at least one the voltage command value, and generates at least one second comparison pulse wave which is at least one the pulse wave by comparing the second carrier wave signal with at least one other the voltage command value, out of the voltage command values of $m\times(n-1)$ not coinciding with the maximum value or the minimum value of the carrier wave signal in m sets;
- within the same PWM period, the PWM control unit sets at least one pair of the first comparison pulse wave and the second comparison pulse wave; and
- within the same PWM period, the PWM control unit shifts one or both of paired the first comparison pulse wave and the second comparison pulse wave in an advance direction or a delay direction so that a rising timing of one of a potential of the winding terminal applied by the paired first comparison pulse wave and a potential of the winding terminal applied by the paired second comparison pulse wave coincides with a falling timing of the other.

A vehicle driving apparatus according to the present disclosure including:

the AC rotary machine controller, the AC rotary machine, and a driving force transmission mechanism that transmits a driving force of the AC rotary machine to wheels of a vehicle.

An electric power steering apparatus according to the present disclosure including:

the AC rotary machine controller, the AC rotary machine, and a driving force transmission mechanism that transmits a driving force of the AC rotary machine to a steering apparatus of a vehicle.

Advantage of Invention

According to the AC rotary machine controller, the vehicle driving apparatus, and the electric power steering apparatus of the present disclosure, one or both of paired the first comparison pulse wave and the second comparison pulse wave is shifted in the advance direction or the delay direction so that the rising timing of one of the potential of the winding terminal by the paired first comparison pulse wave and the potential of the winding terminal by the paired second comparison pulse wave coincides with the falling timing of the other. Accordingly, the leakage current on the charging side generated by the rising of the potential of the winding terminal, and the leakage current on the discharging side generated by the falling of the potential of the winding terminal are canceled, and the leakage current can be further reduced. The electromagnetic noise can be further reduced by reduction of the leakage current.

And, in m sets, at least one first comparison pulse wave is generated by comparing the first carrier wave signal with at least one the voltage command value, and at least one second comparison pulse wave is generated by comparing the second carrier wave signal with at least one other the voltage command value, out of the voltage command values of m×(n−1) other than the switching stop phase. The order of on-off of the first comparison pulse wave, and the order of on-off of the second comparison pulse wave are opposite with each other. Accordingly, within the same PWM period, at least one pair of the first comparison pulse wave and the second comparison pulse wave can be set. And, the rising timing and the falling timing can be shifted so as to coincide with each other, and can be canceled with each other.

BRIEF DESCRIPTION OF THE DRAWINGS

FIG. 8 is a figure for explaining the modulation control and the setting of carrier wave signal of first set when the power-factor angle is 0 degree, according to Embodiment 1;

FIG. 11 is a figure for explaining the modulation control and the setting of carrier wave signal of first set when the power-factor angle is 60 degrees, according to Embodiment 1;

FIG. 13 is a figure for explaining the voltage vectors, according to Embodiment 1;

FIG. 18 is a figure for explaining the modulation control and the setting of carrier wave signal of second set when the power-factor angle is 0 degree, according to Embodiment 1;

FIG. 19 is a figure for explaining the modulation control and the setting of carrier wave signal of second set when the power-factor angle is 60 degrees, according to Embodiment 1;

FIG. 32 is a figure for explaining the modulation control and the setting of carrier wave signal of first set and second set when the power-factor angle is 0 degree, according to Embodiment 2;

DETAILED DESCRIPTION OF THE EMBODIMENTS

1. Embodiment 1

Figure 1:
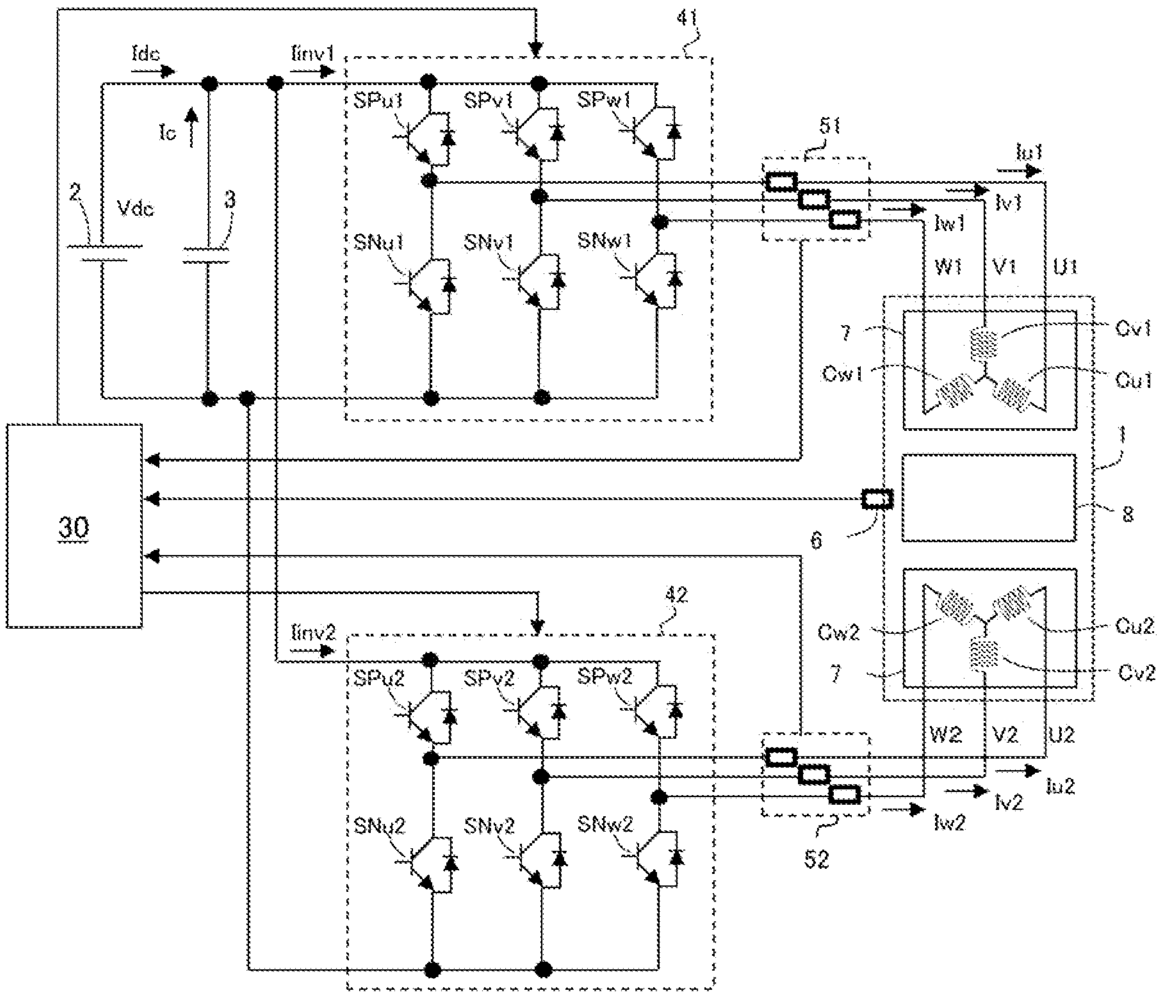
FIG. 1 is a schematic configuration diagram of the AC rotary machine, the inverters, and the controller, according to Embodiment 1.

An AC rotary machine controller 30 (hereinafter, referred to simply as the controller 30) according to Embodiment 1 will be explained with reference to drawings. In each figure, the same or corresponding part is explained with the same sign. FIG. 1 is a schematic configuration diagram of an AC rotary machine 1, inverters 41, 42, and the controller 30 according to the present embodiment.

1-1. AC Rotary Machine 1

The AC rotary machine 1 is provided with a stator 7 and a rotor 8 disposed on the radial-direction inner side of the stator 7. The stator 7 is provided with m sets of n-phase windings (m is one or more natural numbers, and n is three or more natural numbers). In the present embodiment, m is two, n is three. Accordingly, the one stator 7 is provided with the three-phase windings of first set Cu1, Cv1, Cw1, and the three-phase windings of second set Cu2, Cv2, Cw2. The three-phase windings of first set and the three-phase windings of second set are wound around the stator 7, without electrically being connected with each other. The three-phase windings of each set may be connected by star connection, or may be connected by delta connection. The three-phase of first set is defined as U1 phase, V1 phase, and W1 phase. The three-phase of second set is defined as U2 phase, V2 phase, and W2 phase.

Figure 2:
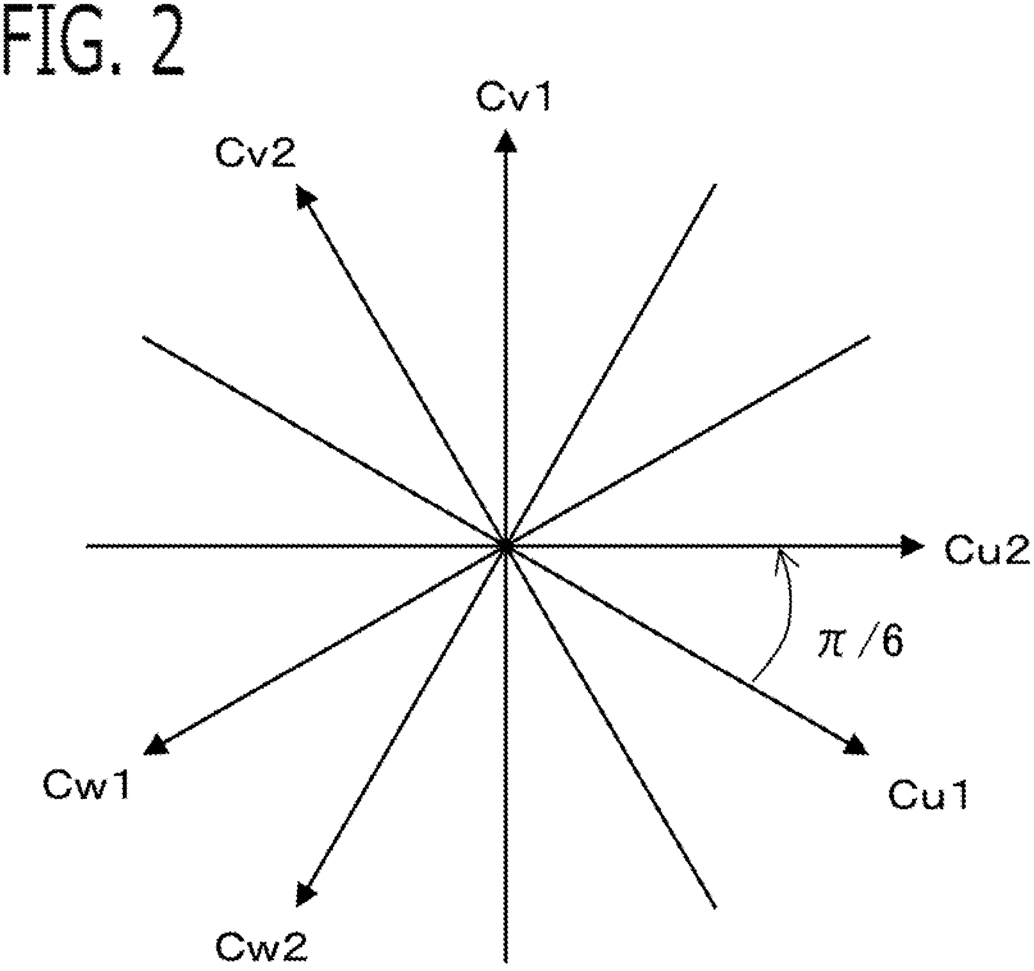
FIG. 2 is a figure for explaining the phase difference between the windings of first set and the windings of second set, according to Embodiment 1.

In the present embodiment, as FIG. 2 shows a schematic diagram, a phase difference in the electrical angle of the position of the three-phase windings of second set Cu2, Cv2, Cw2 with respect to the position of the three-phase windings of first set Cu1, Cv1, Cw1 is set to $\pi/6$ (30 degrees). The phase difference may be set to any angles.

The rotor 8 is provided with a permanent magnet, and the AC rotary machine 1 is a synchronous permanent magnet type synchronous rotary machine. The three-phase windings may be connected by star connection, or may be connected by delta connection. The AC rotary machine 1 may be a field winding type synchronous rotary machine with an electromagnet in the rotor, or may be an induction rotary machine with an iron core in the rotor.

The rotor 8 is provided with a rotation sensor 6 for detecting a rotational angle of the rotor 8. An output signal of the rotation sensor 6 is inputted into the controller 30. Various sensors, such as a Hall element, resolver, or an encoder, are used for the rotation sensor 6. The rotation sensor 6 may be not provided, and the rotational angle (the magnetic pole position) may be estimated based on current information which are obtained by superimposing a harmonic wave component on the current command value describes below (so-called, sensorless system).

1-2. Inverter m sets of inverters are provided. In the present embodiment, an inverter of first set 41 for the three-phase windings of first set and an inverter of second set 42 for the three-phase windings of second set are provided.

The inverter of first set 41 is provided with three sets of series circuits (leg) in each of which a high potential side switching device SP1 connected to the high potential side of the DC power source 2 and a low potential side switching device SN1 connected to the low high potential side of the DC power source 2 are connected in series, corresponding to each phase of three-phase. A connection node of two switching devices in the series circuit of each phase is connected to the winding of the corresponding phase.

Specifically, in the series circuit of U1 phase, the high potential side switching device SPu1 of U1 phase and the low potential side switching device SNu1 of U1 phase are connected in series, and the connection node of two switching devices is connected to the winding Cu1 of U1 phase. In the series circuit of V1 phase, the high potential side switching device SPv1 of V1 phase and the low potential side switching device SNv1 of V1 phase are connected in series, and the connection node of two switching devices is connected to the winding Cv1 of V1 phase. In the series circuit of W1 phase, the high potential side switching device SPw1 of W1 phase and the low potential side switching device SNw1 of W1 phase are connected in series, and the connection node of two switching devices is connected to the winding Cw1 of W1 phase.

The inverter of second set 42 is provided with three sets of series circuits (leg) in each of which a high potential side switching device SP2 connected to the high potential side of the DC power source 2 and a low potential side switching device SN2 connected to the low high potential side of the DC power source 2 are connected in series, corresponding to each phase of three-phase. A connection node of two switching devices in the series circuit of each phase is connected to the winding of the corresponding phase.

Specifically, in the series circuit of U2 phase, the high potential side switching device SPu2 of U2 phase and the low potential side switching device SNu2 of U2 phase are connected in series, and the connection node of two switching devices is connected to the winding Cu2 of U2 phase. In the series circuit of V2 phase, the high potential side switching device SPv2 of Va2 phase and the low potential side switching device SNv2 of V2 phase are connected in series, and the connection node of two switching devices is connected to the winding Cv2 of V2 phase. In the series circuit of W2 phase, the high potential side switching device SPw2 of W2 phase and the low potential side switching device SNw2 of W2 phase are connected in series, and the connection node of two switching devices is connected to the winding Cw2 of W2 phase.

The inverter of first set 41 and the inverter of second set 42 are connected to the one DC power source 2. One smoothing capacitor 3 is connected to the DC power source 2 in parallel. The smoothing capacitor may be provided in each of the inverters of first set and second set 41, 42.

IGBT (Insulated Gate Bipolar Transistor) in which a diode is connected in reversely parallel, MOSFET (Metal Oxide Semiconductor Field Effect Transistor), bipolar transistor in which a diode is connected in reversely parallel, or the like is used for the switching devices. A gate terminal of each switching device is connected to the controller 30 via a gate drive circuit and the like. Each switching device of the inverter of first set 41 is turned on or turned off by the switching signals QPu1 to QNw1 for the first set outputted from the controller 30. Each switching device of the inverter of second set 42 is turned on or turned off by the switching signals QPu2 to QNw2 for the second set outputted from the controller 30.

The DC power source 2 outputs a DC voltage Vdc to the inverter of first set 41 and the inverter of second set 42. The DC power source 2 may be any apparatus which outputs the DC voltage Vdc, such as a battery, a DC-DC converter, a diode rectifier, and a PWM rectifier.

A current sensor of first set 51 and a current sensor of second set 52 for detecting current flowing into winding of each phase of first set and second set are provided. The current sensors of first set and second set 51, 52 are current sensors, such as shunt resistance or Hall element. Output signals of the current sensors of first set and second set 51, 52 are inputted into the controller 30.

In the present embodiment, the current sensor 51, 52 of each set are provided on the electric wire which connects the series circuit of the switching device of each phase, and the winding of each phase. The current sensor 51, 52 of each set may be connected in series to the series circuit of the switching devices of each phase. Alternatively, the current sensor of each set may be provided on a wire which connects between the inverter of each set 41, 42 and the DC power source 2, and the current of the winding of each phase of each set may be detected by well-known "bus line one-shunt method".

1-3. Controller 30

Figure 3:
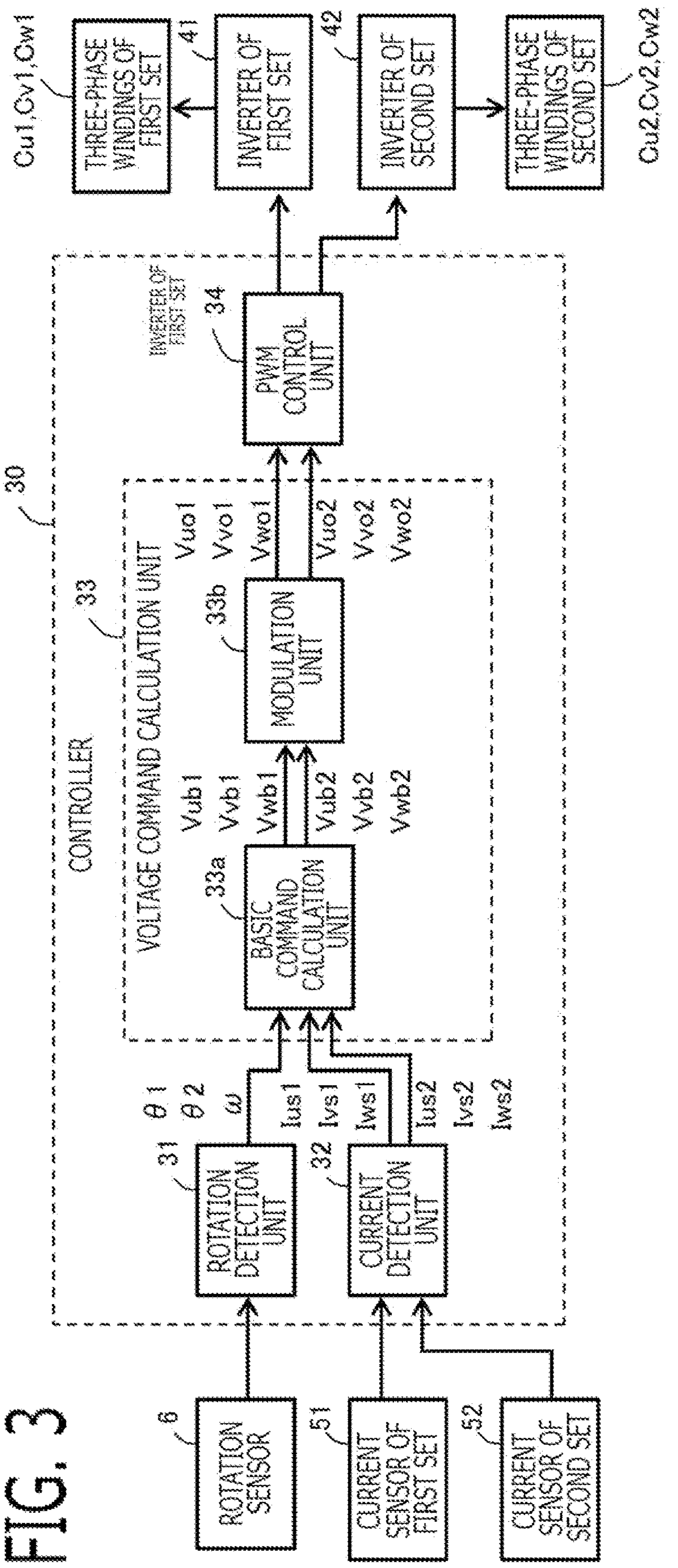
FIG. 3 is a schematic block diagram of the controller according to Embodiment 1.
Figure 4:
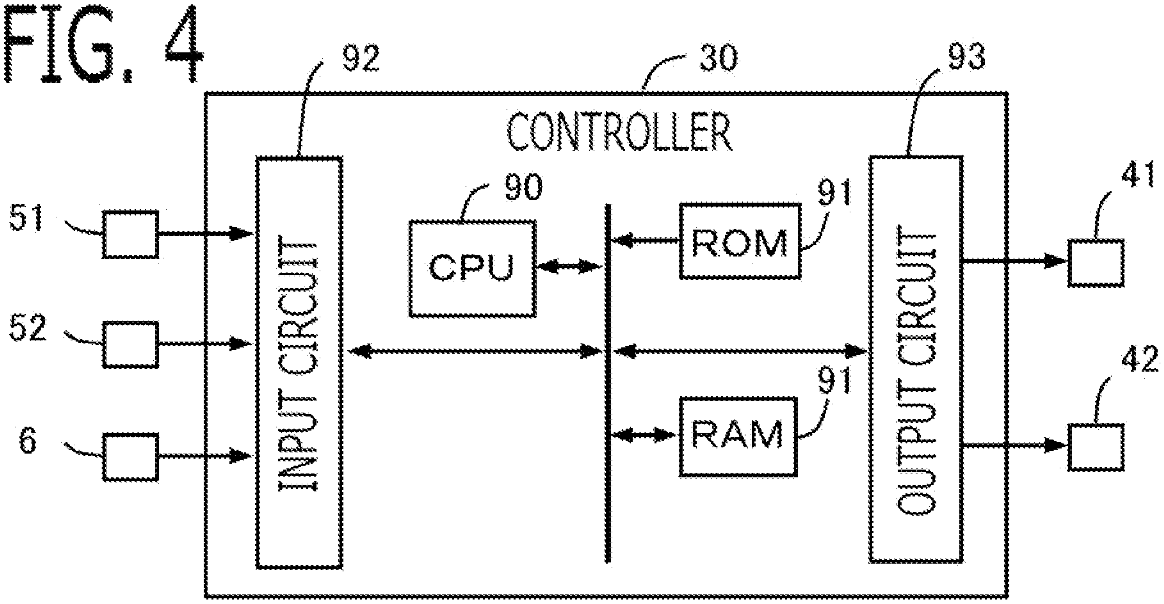
FIG. 4 is a hardware configuration diagram of the controller according to Embodiment 1.

The controller 30 controls the AC rotary machine 1 via the inverters of first set and second set 41, 42. As shown in FIG. 3, the controller 30 is provided with a rotation detection unit 31, a current detection unit 32, a voltage command calculation unit 33, a PWM control unit 34, and the like. Each function of the controller 30 is realized by processing circuits provided in the controller 30. Specifically, as shown in FIG. 4, the controller 30 is provided with, as a processing circuit, an arithmetic processor (computer) 90 such as a CPU (Central Processing Unit), storage apparatuses 91 that exchange data with the arithmetic processor 90, an input circuit 92 that inputs external signals to the arithmetic processor 90, an output circuit 93 that outputs signals from the arithmetic processor 90 to the outside, and the like. Corresponding to the three-phase windings of each set, a plurality of sets of controllers may be provided.

As the arithmetic processor 90, ASIC (Application Specific Integrated Circuit), IC (Integrated Circuit), DSP (Digital Signal Processor), FPGA (Field Programmable Gate Array), various kinds of logical circuits, various kinds of signal processing circuits, and the like may be provided. As the arithmetic processor 90, a plurality of the same type ones or the different type ones may be provided, and each processing may be shared and executed. As the storage apparatuses 91, a RAM (Random Access Memory) which can read data and write data from the arithmetic processor 90, a ROM (Read Only Memory) which can read data from the arithmetic processor 90, and the like are provided. The input circuit 92 is connected with various kinds of sensors, such as the current sensors of first set and second set 51, 52 and the rotation sensor 6, and is provided with an A/D converter and the like for inputting output signals of these sensors to the arithmetic processor 90. The output circuit 93 is connected with electric loads, such as a gate drive circuit which drive on/off the switching devices, and is provided with a driving circuit and the like for outputting a control signal from the arithmetic processor 90.

Then, the arithmetic processor 90 runs software items (programs) stored in the storage apparatus 91 such as a ROM and collaborates with other hardware devices in the controller 30, such as the storage apparatus 91, the input circuit 92, and the output circuit 93, so that the respective functions of the control units 31 to 34 provided in the controller 30 are realized. Setting data items such as a determination value to be utilized in the control units 31 to 34 are stored, as part of software items (programs), in the storage apparatus 91 such as a ROM. Each function of the controller 30 will be described in detail below.

1-3-1. Rotation Detection Unit 31

The rotation detection unit 31 detects a rotational angle θ of each set and a rotational angle speed ω in the electrical angle, based on the output signal of the rotation sensor 6. The rotational angle of first set θ1 is an angle (position) of the N pole (magnetic pole) in the electrical angle on the basis of the winding of U1 phase of first set. The rotational angle of second set θ2 is an angle (position) of the N pole (magnetic pole) in the electrical angle on the basis of the winding of U2 phase of second set.

The rotation detection unit 31 may estimate the rotational angle (the magnetic pole position) without using the rotation sensor, based on current information which are obtained by superimposing a harmonic wave component on the current command value (so-called, sensorless system).

1-3-2. Current Detection Unit 32

For each set, the current detection unit 32 detects three-phase currents Ius, Ivs, Iws which flow into the three-phase windings, based on the output signal of the current sensor. In the present embodiment, the current detection unit 32 detects three-phase currents Ius1, Ivs1, Iws1 which flow into the three-phase windings of first set, based on the output signal of the current sensor of first set 51; and detects three-phase currents Ius2, Ivs2, Iws2 which flow into the three-phase windings of second set, based on the output signal of the current sensor of second set 52.

1-3-3. Voltage Command Calculation Unit 33

For each set, the voltage command calculation unit 33 calculates voltage command values of three-phase Vuo, Vvo, Vwo applied to the three-phase windings. The voltage command values of three-phase of first set are defined as Vuo1, Vvo1, Vwo1; and the voltage command values of three-phase of second set are defined as Vuo2, Vvo2, Vwo2. In the present embodiment, the voltage command calculation unit 33 is provided with a basic command calculation unit 33*a* and a modulation unit 33*b*.

1-3-3-1. Basic Command Calculation Unit 33*a*

For each set, the basic command calculation unit 33*a* calculates basic voltage command values of three-phase Vub, Vvb, Vwb. The basic voltage command values of three-phase of first set is defined as Vub1, Vvb1, Vwb1; and the basic voltage command values of three-phase of second set is defined as Vub2, Vvb2, Vwb2. In the present embodiment, the basic voltage command values of three-phase of each set are sine waves which oscillate centering on the center value Vdc/2 of the DC voltage supplied to the inverter 4 from the DC power source 2. The basic voltage command values of three-phase of each set may be sine waves which oscillate centering on 0.

For example, in the calculation of the basic voltage command values of three-phase of each set, a vector control which controls currents on a rotating coordinate system of d-axis and q-axis is used. The rotating coordinate system of d-axis and q-axis is a rotating coordinate system of two-axis which consist of a d-axis defined in the direction of the N-pole (the magnetic pole position θ1, θ2 of each set) and a q-axis defined in a direction which advanced to the d-axis by 90 degrees in the electrical angle.

For each set, the basic command calculation unit 33*a* converts the current detection values of three-phase Ius, Ivs, Iws into a current detection value of d-axis Ids and a current detection value of q-axis Iqs, by performing well-known the three-phase/two-phase conversion and the rotating coordinate conversion based on the magnetic pole position θ of each set. For each set, the basic command calculation unit 33*a* calculates a current command value of d-axis Ido and a current command value of q-axis Iqo using various kinds of well-known methods. Then, for each set, the basic command calculation unit 33*a* calculates a voltage command value of d-axis Vdo and a voltage command value of q-axis Vqo by performing well-known current feedback control, based on the current command values of d-axis and q-axis Ido, Iqo, and the current detection values of d-axis and q-axis Ids, Iqs. For each set, the basic command calculation unit 33*a* may calculate the voltage command value of d-axis Vdo and the voltage command value of q-axis Vqo by well-known feed-forward control, based on the current command values of d-axis and q-axis Ido, Iqo.

For each set, the basic command calculation unit 33*a* calculates the basic voltage command values of three-phase Vub, Vvb, Vwb by performing well-known fixed coordinate conversion and two-phase/three-phase conversion to the voltage command values of d-axis and q-axis Vdo, Vqo based on the magnetic pole position θ of each set, and then adding the center value Vdc/2 of the DC voltage.

The basic voltage command values of three-phase of each set may be calculated using other well-known control methods such as the V/f control. If the V/f control is performed, the current detection values are not required, so the current sensor may not be provided.

1-3-3-2. Modulation Unit 33*b*

For each set, the modulation unit 33*b* calculates the voltage command values of three-phase Vuo, Vvo, Vwo by applying a modulation to the basic voltage command values of three-phase Vub, Vvb, Vwb.

<Flat-Top Two-Phase Modulation, Flat-Bottom Two-Phase Modulation>

For each set, the modulation unit 33*b* executes a flat-top two-phase modulation that calculates an offset voltage Voff which makes the voltage command value of a phase of a maximum voltage Vmax in the voltage command values of three-phase coincide with a maximum value of the carrier wave signal, and calculates the voltage command values of three-phase Vuo, Vvo, Vwo by subtracting the offset voltage Voff from the basic voltage command values of three-phase Vub, Vvb, Vwb; or a flat-bottom two-phase modulation that calculates the offset voltage Voff which makes the voltage command value of a phase of a minimum voltage Vmin in the voltage command values of three-phase coincide with a minimum value of the carrier wave signal, and calculates the voltage command values of three-phase Vuo, Vvo, Vwo by subtracting the offset voltage Voff from the basic voltage command values of three-phase Vub, Vvb, Vwb.

<Switching of Flat-Top Two-Phase Modulation and Flat-Bottom Two-Phase Modulation>

In the present embodiment, for each set, the modulation unit 33*b* executes the flat-top two-phase modulation, when a phase of a maximum current absolute value Iabsmax in absolute values of currents of three-phase flowing into the three-phase windings coincides with the phase of the maximum voltage Vmax in the voltage command values of three-phase; and executes the flat-bottom two-phase modulation, when a phase of the maximum current absolute value Iabsmax coincides with the phase of the minimum voltage Vmin in the voltage command values of three-phase.

And, in the present embodiment, for each set, the modulation unit 33*b* executes the flat-top two-phase modulation or the flat-bottom two-phase modulation, when the phase of the maximum current absolute value Iabsmax coincides with a phase of a middle voltage Vmid in the voltage command values of three-phase.

<Switching of Flat-Top Two-Phase Modulation and Flat-Bottom Two-Phase Modulation of First Set>

Figure 5:
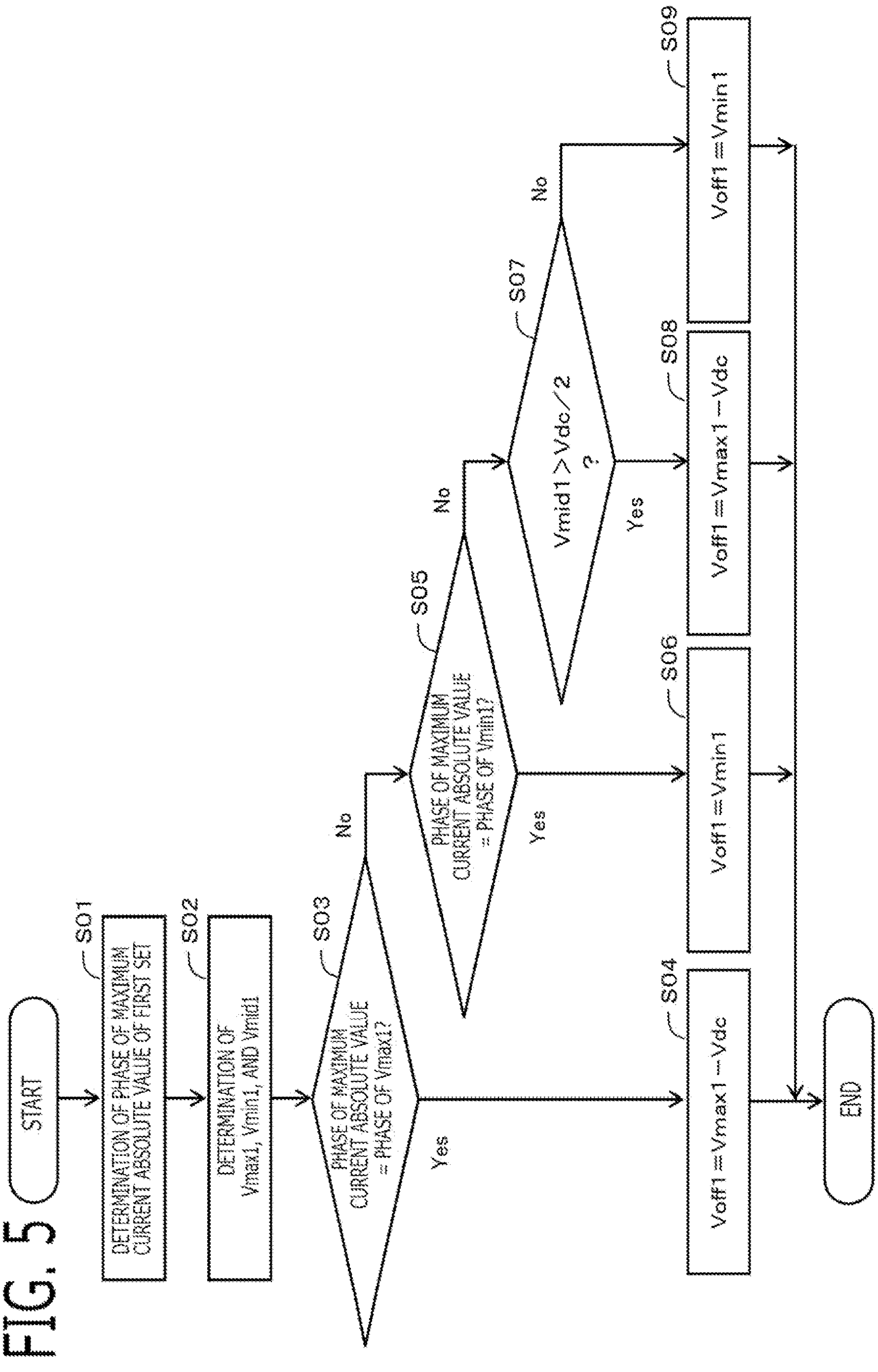
FIG. 5 is a flowchart for explaining the flat-top two-phase modulation and the flat-bottom two-phase modulation of first set, according to Embodiment 1.

In the present embodiment, for the first set, the switching is performed as shown in the flowchart of FIG. 5, and the equation (1). In the step S01, the modulation unit 33*b* determines the maximum current absolute value of first set Iabsmax1 which is the maximum value of the absolute values of the winding currents of three-phase of first set, based on the detection values of three-phase currents of first set Ius1, Ivs1, Iws1; and determines the phase of the maximum current absolute value of first set Iabsmax1. The modulation unit 33*b* may estimate the winding currents of three-phase of first set, based on the voltage command values of first set or the current command values of first set, and may use them for determination.

In the step S02, the modulation unit 33*b* determines the maximum voltage Vmax1, the minimum voltage Vmin1, and the middle voltage Vmid1 in the voltage command values of three-phase of first set. In the present embodiment, the modulation unit 33*b* determines the maximum voltage Vmax1, the minimum voltage Vmin1, and the middle voltage Vmid1 in the basic voltage command values of three-phase of first set Vub1, Vvb1, Vwb1.

In the step S03, the modulation unit 33*b* determines whether or not the phase of the maximum current absolute value of first set Iabsmax1 coincides with the phase of the maximum voltage of first set Vmax1. When it coincides, it advances to the step S04, and when it does not coincide, it advances to the step S05. In the step S04, the modulation unit 33*b* executes the flat-top two-phase modulation that calculates the offset voltage of first set Voff1 which makes the voltage command value of the phase of the maximum voltage of first set Vmax1 coincide with the maximum value (in this example, Vdc) of the carrier wave signal (Voff1=Vmax1−Vdc), and calculates the voltage command values of three-phase of first set Vuo1, Vvo1, Vwo1 by subtracting the offset voltage of first set Voff1 from the basic voltage command values of three-phase of first set Vub1, Vvb1, Vwb1.

On the other hand, in the step S05, the modulation unit 33*b* determines whether or not the phase of the maximum current absolute value of first set Iabsmax1 coincides with the phase of the minimum voltage of first set Vmin1. When it coincides, it advances to the step S06, and when it does not coincide, it advances to the step S07. In the step S06, the modulation unit 33*b* executes the flat-bottom two-phase modulation that calculates the offset voltage of first set Voff1 which makes the voltage command value of the phase of the minimum voltage of first set Vmin1 coincide with the minimum value (in this example, 0) of the carrier wave signal (Voff1=Vmin1), and calculates the voltage command values of three-phase of first set Vuo1, Vvo1, Vwo1 by subtracting the offset voltage of first set Voff1 from the basic voltage command values of three-phase of first set Vub1, Vvb1, Vwb1.

On the other hand, in the step S07, the phase of the maximum current absolute value of first set Iabsmax1 does not coincide with the phase of the maximum voltage of first set Vmax1 and the phase of minimum voltage of first set Vmin1, but the phase of the maximum current absolute value of first set Iabsmax1 coincides with the phase of the middle voltage of first set Vmid1. In this case, the modulation unit 33*b* determines whether or not the middle voltage of first set Vmid1 is larger than the center value (in this example, Vdc/2) of the DC voltage supplied to the inverter. When it is larger, it advances to the step S08, and when it is not larger, it advances to the step S09. In the step S08, similarly to the step S04, the modulation unit 33*b* executes the flat-top two-phase modulation that calculates the offset voltage of first set Voff1 which makes the voltage command value of the phase of the maximum voltage of first set Vmax1 coincide with the maximum value (Vdc) of the carrier wave signal (Voff1=Vmax1−Vdc), and calculates the voltage command values of three-phase of first set Vuo1, Vvo1, Vwo1 by subtracting the offset voltage of first set Voff1 from the basic voltage command values of three-phase of first set Vub1, Vvb1, Vwb1. On the other hand, in the step S09, similarly to the step S06, the modulation unit 33*b* executes the flat-bottom two-phase modulation that calculates the offset voltage of first set Voff1 which makes the voltage command value of the phase of the minimum voltage of first set Vmin1 coincide with the minimum value (0) of the carrier wave signal (Voff1=Vmin1), and calculates the voltage command values of three-phase of first set Vuo1, Vvo1, Vwo1 by subtracting the offset voltage of first set Voff1 from the basic voltage command values of three-phase of first set Vub1, Vvb1, Vwb1.

[Math. 1]

$$Iabsmax1 = \mathrm{MAX}(|Ius1|, |Ivs1|, |Iws1|) \tag{1}$$

$$Vmax1 = \mathrm{MAX}(Vub1, Vvb1, Vwb1)$$

$$Vmin1 = \mathrm{MIN}(Vub1, Vvb1, Vwb1)$$

$$Vmid1 = MID(Vub1, Vvb1, Vwb1)$$

$$Voff1 = Vmax1 - Vdc \text{ or } Voff1 = Vmin1$$

$$Vuo1 = Vub1 - Voff1$$

$$Vvo1 = Vvb1 - Voff1$$

$$Vwo1 = Vwb1 - Voff1$$

When the power-factor angle of first set described below is 0 degree, the phase of the maximum current absolute value of first set coincides with the phase of the maximum voltage of first set or the phase of the minimum voltage of first set, and does not coincide with the phase of the middle voltage of first set. Accordingly, one of the step S03 and the step S05 is established, and processing of the step S07 to the step S09 is not performed. When the power-factor angle of first set is operated around −30 degrees to 30 degrees, a frequency that the phase of the maximum current absolute value of first set coincides with the phase of the middle voltage of first set is small. Accordingly, processing of the step S07 to the step S09 may be not performed, and instead, processing of the step S04 or the step S06 corresponding to the step S03 or the step S05 established last may be continued.

<Switching of Flat-Top Two-Phase Modulation and Flat-Bottom Two-Phase Modulation of Second Set>

Figure 6:
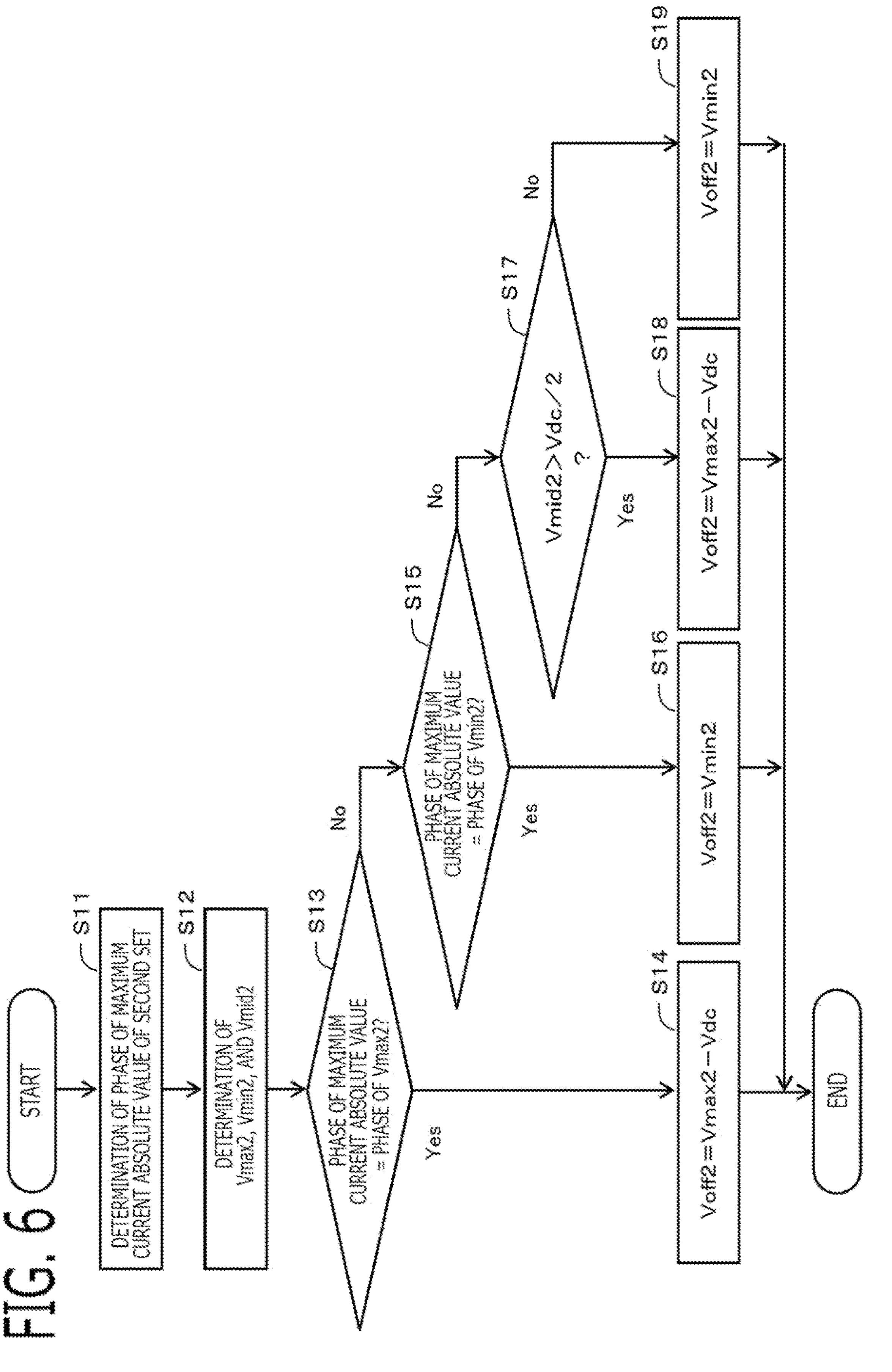
FIG. 6 is a flowchart for explaining the flat-top two-phase modulation and the flat-bottom two-phase modulation of second set, according to Embodiment 1.

In the present embodiment, for the second set, the switching is performed as shown in the flowchart of FIG. 6, and the equation (2). In the step S11, the modulation unit 33*b* determines the maximum current absolute value of second set Iabsmax2 which is the maximum value of the absolute values of the winding currents of three-phase of second set, based on the detection values of three-phase currents of second set Ius2, Ivs2, Iws2; and determines the phase of the maximum current absolute value of second set Iabsmax2. The modulation unit 33*b* may estimate the winding currents of three-phase of second set, based on the voltage command values of second set or the current command values of second set, and may use them for determination.

In the step S12, the modulation unit 33*b* determines the maximum voltage Vmax2, the minimum voltage Vmin2, and the middle voltage Vmid2 in the voltage command values of three-phase of second set. In the present embodiment, the modulation unit 33*b* determines the maximum voltage Vmax2, the minimum voltage Vmin2, and the middle voltage Vmid2 in the basic voltage command values of three-phase of second set Vub2, Vvb2, Vwb2.

In the step S13, the modulation unit 33*b* determines whether or not the phase of the maximum current absolute value of second set Iabsmax2 coincides with the phase of the maximum voltage of second set Vmax2. When it coincides, it advances to the step S14, and when it does not coincide, it advances to the step S15. In the step S14, the modulation unit 33*b* executes the flat-top two-phase modulation that calculates the offset voltage of second set Voff2 which makes the voltage command value of the phase of the maximum voltage of second set Vmax2 coincide with the maximum value (in this example, Vdc) of the carrier wave signal (Voff2=Vmax2−Vdc), and calculates the voltage command values of three-phase of second set Vuo2, Vvo2, Vwo2 by subtracting the offset voltage of second set Voff2 from the basic voltage command values of three-phase of second set Vub2, Vvb2, Vwb2.

On the other hand, in the step S15, the modulation unit 33*b* determines whether or not the phase of the maximum current absolute value of second set Iabsmax2 coincides with the phase of the minimum voltage of second set Vmin2. When it coincides, it advances to the step S16, and when it does not coincide, it advances to the step S17. In the step S16, the modulation unit 33*b* executes the flat-bottom two-phase modulation that calculates the offset voltage of second set Voff2 which makes the voltage command value of the phase of the minimum voltage of second set Vmin2 coincide with the minimum value (0) of the carrier wave signal (Voff2=Vmin2), and calculates the voltage command values of three-phase of second set Vuo2, Vvo2, Vwo2 by subtracting the offset voltage of second set Voff2 from the basic voltage command values of three-phase of second set Vub2, Vvb2, Vwb2.

On the other hand, in the step S17, the modulation unit 33*b* determines whether or not the middle voltage of second set Vmid2 is larger than the center value (Vdc/2) of the DC voltage. When it is larger, it advances to the step S18, and when it is not larger, it advances to the step S19. In the step S18, similarly to the step S14, the modulation unit 33*b* executes the flat-top two-phase modulation. On the other hand, in the step S19, similarly to the step S16, the modulation unit 33*b* executes the flat-bottom two-phase modulation.

[Math. 2]

$$Iabsmax2=\mathrm{MAX}(|Ius2|,|Ivs2|,|Iws2|) \quad (2)$$

$$Vmax2=\mathrm{MAX}(Vub2,Vvb2,Vwb2)$$

$$Vmin2=\mathrm{MIN}(Vub2,Vvb2,Vwb2)$$

$$Vmid2=MID(Vub2,Vvb2,Vwb2)$$

$$Voff2=Vmax2-Vdc \text{ or } Voff2=Vmin2$$

$$Vuo2=Vub2-Voff2$$

$$Vvo2=Vvb2-Voff2$$

$$Vwo2=Vwb2-Voff2$$

<When Power-Factor Angle=0 Degree>

Waveforms of the voltage command values of three-phase vary according to the power-factor angle. Herein, although the three-phase currents and the voltage command values of three-phase of first set are explained, the phase of the three-phase currents of second set and the phase of the voltage command values of three-phase of second set is shifted from the phase of the three-phase currents of first set and the voltage command values of three-phase of first set by 30 degrees.

The power-factor angle is a phase difference of the current vector with respect to the voltage vector. The current vector is a current vector obtained by performing the three-phase/two-phase conversion to the winding currents of three-phase. The voltage vector is a voltage vector obtained by performing the three-phase/two-phase conversion to the voltage command values of three-phase after subtracting Vdc/2. The phase θi1 of the current vector of first set is a phase of the current vector of first set with respect to the winding position of U1 phase.

Figure 7:
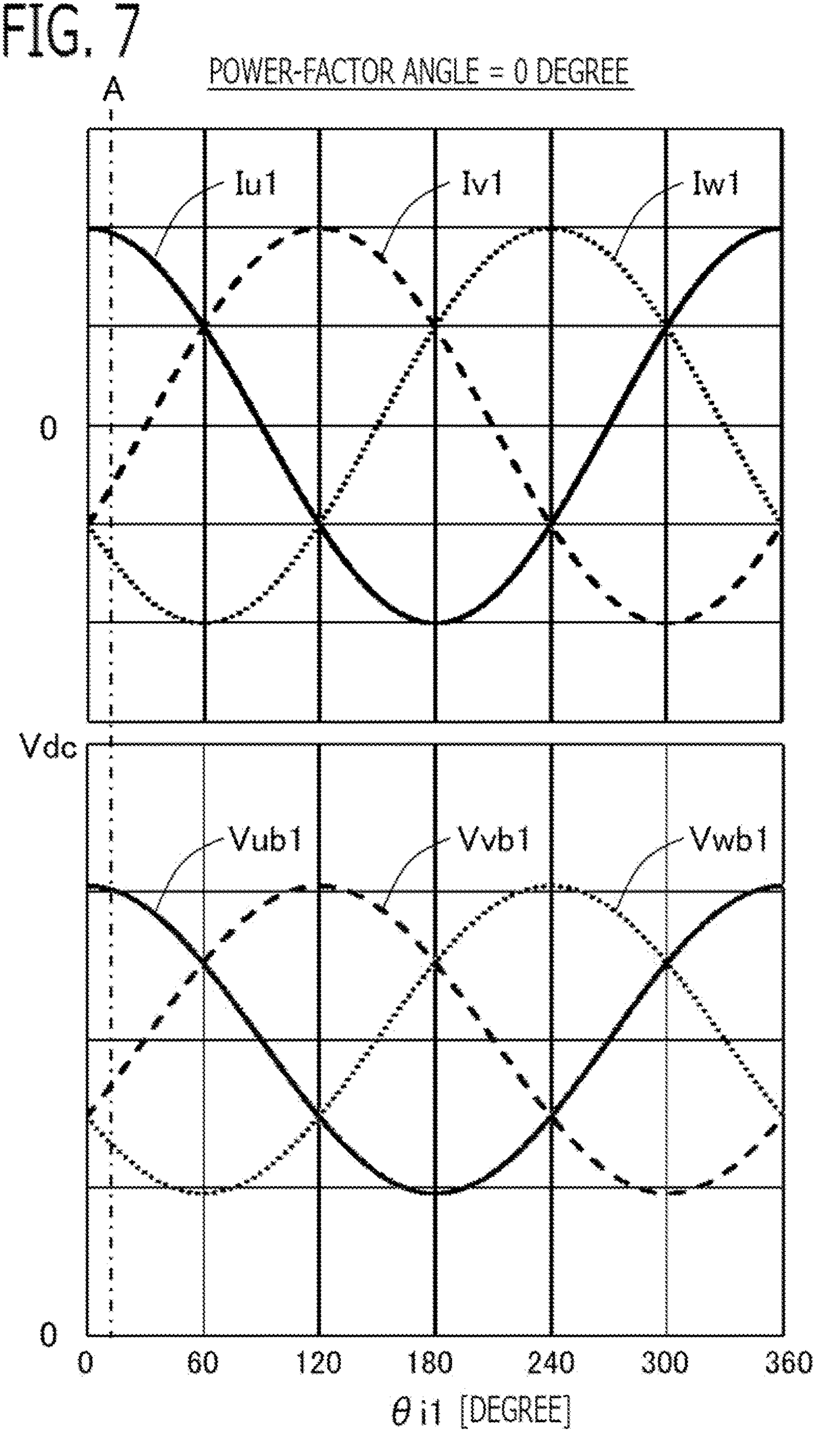
FIG. 7 is a time chart for explaining the current waveforms and the voltage waveforms of first set when the power-factor angle is 0 degree, according to Embodiment 1.

When the power-factor angle is 0 degree, the waveforms of the three-phase currents of first set Iu1, Iv1, Iw1 and the waveforms of the basic voltage command values of three-phase of first set Vub1, Vvb1, Vwb1 with respect to the phase θi1 of the current vector of first set are as shown in FIG. 7. The phase of the maximum current absolute value is U1 phase in 0 to 30 degrees and 330 to 360 degrees of the current vector phase θi1, is W1 phase in 30 to 90 degrees, is V1 phase in 90 to 150 degrees, is U1 phase in 150 to 210 degrees, is W1 phase in 210 to 270 degrees, and is V1 phase in 270 to 330 degrees. The phase of the maximum voltage Vmax1 is U1 phase in 0 to 60 degrees and 300 to 360 degrees of the current vector phase θi1, is V1 phase in 60 to 180 degrees, and is W1 phase in 180 to 300 degrees. The phase of the minimum voltage Vmin1 is W1 phase in 0 to 120 degrees of the current vector phase θi1, is U1 phase in 120 to 240 degrees, and is V1 phase in 240 to 360 degrees. The phase of the maximum current absolute value coincides with either the phase of the maximum voltage Vmax1, or the phase of the minimum voltage Vmin1.

Figure 9:
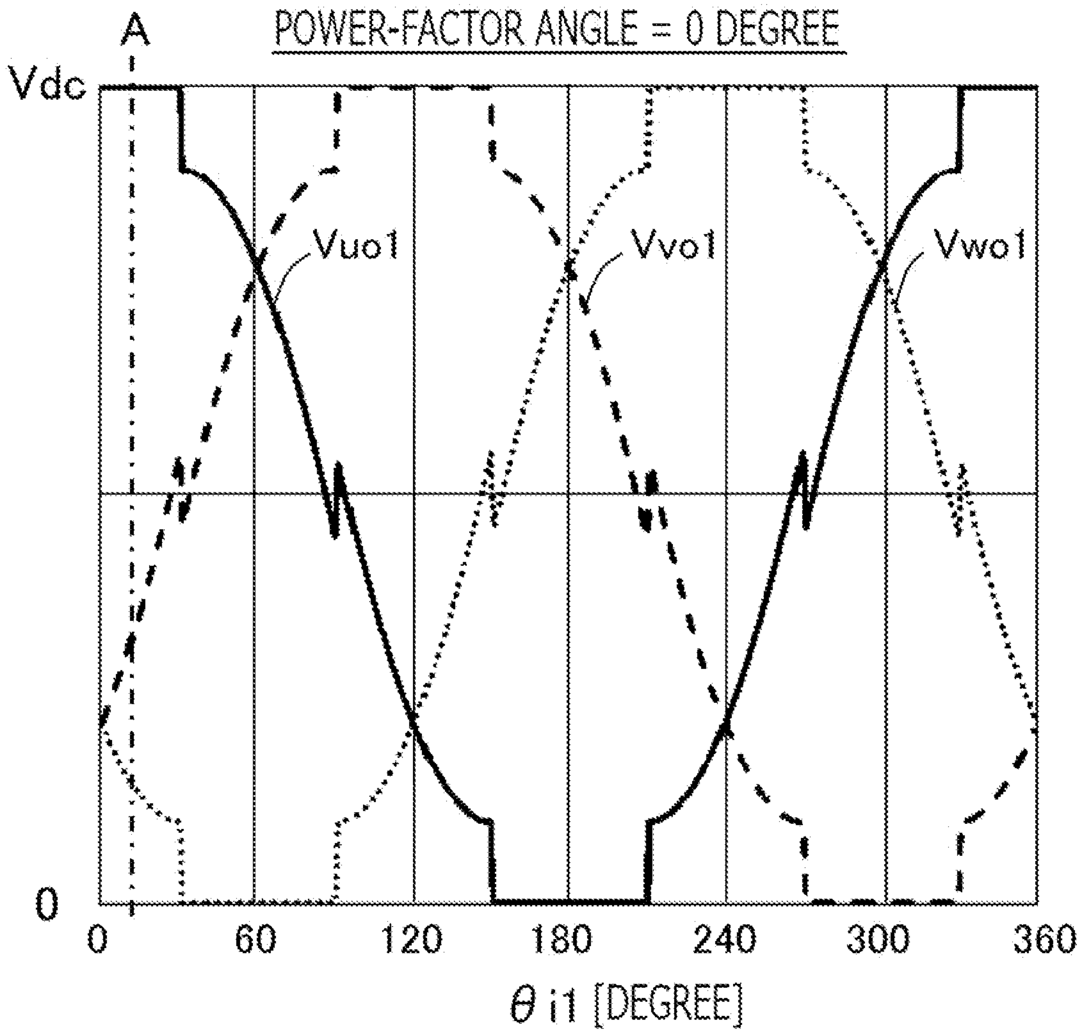
FIG. 9 is a time chart for explaining the waveforms of the voltage command values of first set when the power-factor angle is 0 degree, according to Embodiment 1.

When the offset voltage Voff1 is determined according to the flowchart of FIG. 5, a switching stop phase is set as shown in FIG. 8. The switching stop phase is a phase in which the voltage command value coincides with the maximum value or the minimum value of the carrier wave signal, and switching operation is stopped. As the result, as shown in FIG. 9, the voltage command values of three-phase of first set Vuo1, Vvo1, Vwo1 become waveforms that the switching stop phase is switched every 60 degrees. The flat-top two-phase modulation and the flat-bottom two-phase modulation are switched every 60 degrees. When the power-factor angles are 0 to 30 degrees, 150 to 180 degrees, and 330 to 360 degrees, similar voltage command values are set.

<When Power-Factor Angle=60 Degrees>

Figure 10:
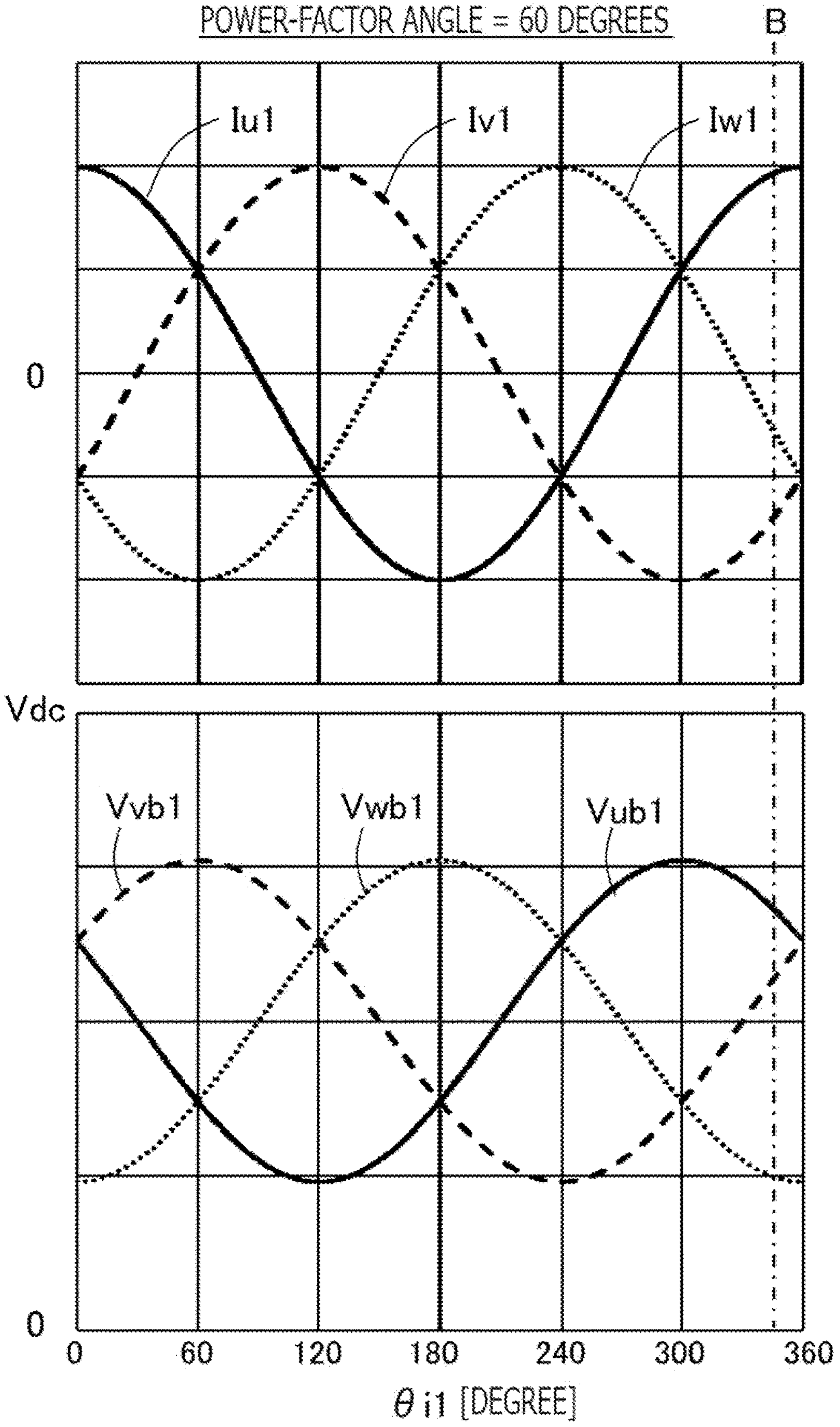
FIG. 10 is a time chart for explaining the current waveforms and the voltage waveforms of first set when the power-factor angle is 60 degrees, according to Embodiment 1.

When the power-factor angle is 60 degrees, the waveforms of the three-phase currents of first set Iu1, Iv1, Iw1 and the waveforms of the basic voltage command values of three-phase of first set Vub1, Vvb1, Vwb1 with respect to the phase θi1 of the current vector of first set are as shown in FIG. 10. The phase of the maximum voltage Vmax1 is V1 phase in 0 to 120 degrees of the current vector phase θi1, is W1 phase in 120 to 240 degrees, and is U1 phase in 240 to 360 degrees. The phase of the minimum voltage Vmin1 is W1 phase in 0 to 60 degrees and 300 to 360 degrees of the current vector phase θi1, is U1 phase in 60 to 180 degrees, and is V1 phase in 180 to 300 degrees. The phase of the middle voltage Vmid1 is U1 phase in 0 to 60 degrees and 180 to 240 degrees of the current vector phase θi1, is W1 phase in 60 to 120 degrees and 240 to 300 degrees, and is V1 phase in 120 to 180 degrees and 300 to 360 degrees. Unlike when the power-factor angle is 0 degree, a range where the phase of the maximum current absolute value becomes the phase of the middle voltage Vmid1 occurs every 30 degrees.

Figure 12:
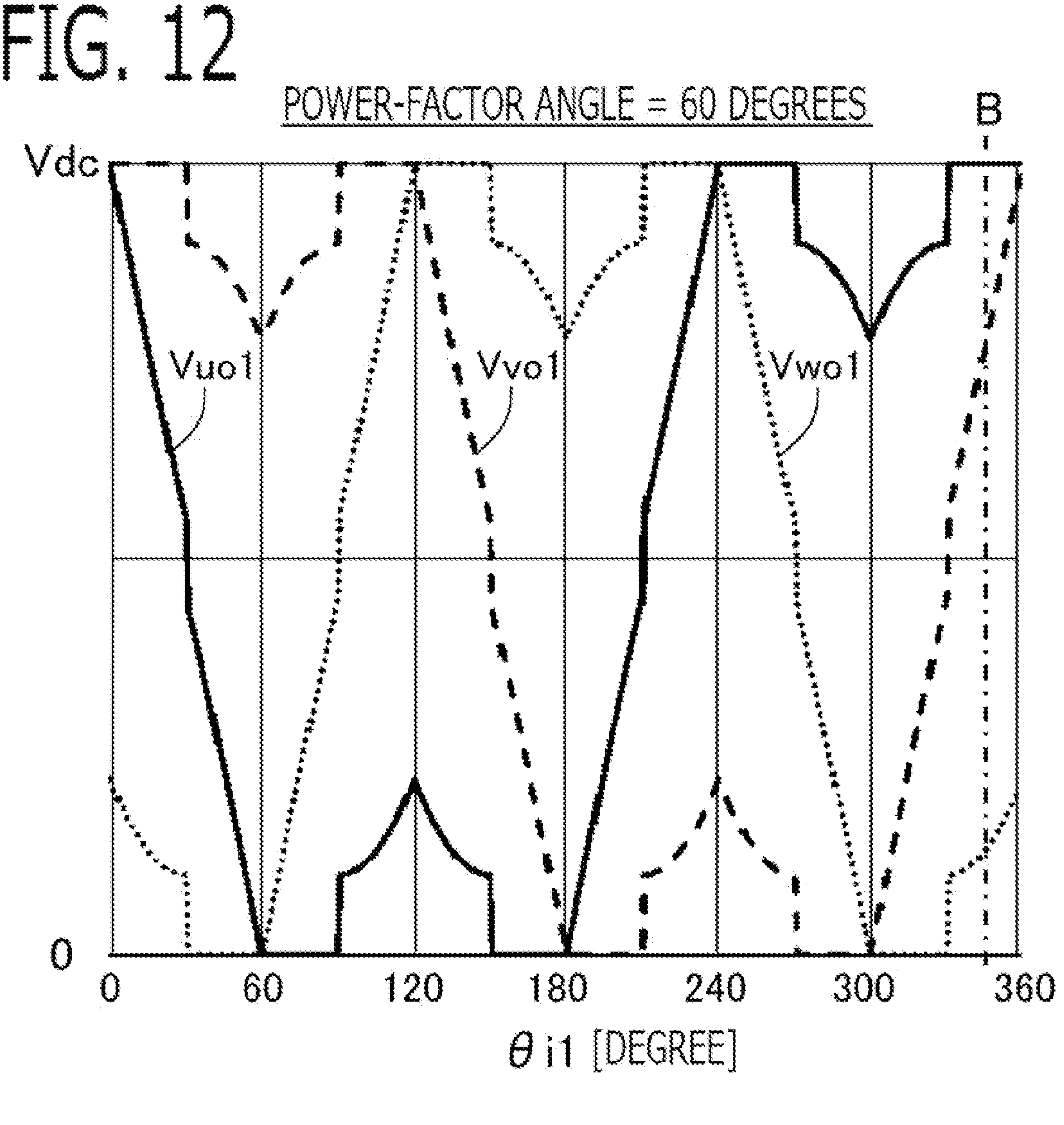
FIG. 12 is a time chart for explaining the waveforms of the voltage command values of first set when the power-factor angle is 60 degrees, according to Embodiment 1.

When the offset voltage Voff1 is determined according to the flowchart of FIG. 5, the switching stop phase is set as shown in FIG. 11. the voltage command values of three-phase of first set Vuo1, Vvo1, Vwo1 become waveforms that the switching stop phase is switched every 30 degrees, as shown in FIG. 12. By the determination result of the step S07 of FIG. 5, the offset direction is varied every 60 degrees, and the flat-top two-phase modulation and the flat-bottom two-phase modulation are switched every 60 degrees.

1-3-4. PWM Control Unit 34

For each set, the PWM control unit 34 generates pulse waves of three-phase PWu, PWv, PWw by comparing each of the voltage command values of three-phase Vuo, Vvo, Vwo with the carrier wave signal which oscillates at the PWM period Tc. The PWM control unit 34 performs a shift correction described below to the pulse waves of three-phase PWu, PWv, PWw of each set. For each set, the PWM control unit 34 turns on and off application of the DC voltage Vdc to the winding terminal of each phase by turning on and off the switching devices of each phase by the pulse waves of three-phase PWu, PWv, PWw after the shift correction.

The on-off of the pulse wave PW of each phase corresponds to the on-off of application of the DC voltage Vdc to the winding terminal of each phase. In the present embodiment, a case where the dead time is not provided between the on period of the high potential side switching device SP and the on period of the low potential side switching device SN, or a case where the influence of the provided dead time is small and is not considered will be explained. If the dead time is not considered, the on-off of the pulse wave PW of each phase corresponds to the on-off of the high potential side switching device SP of each phase. The on-off obtained by inverting the on-off of the pulse wave PW of each phase corresponds to the on-off of the low potential side switching device SN of each phase. Accordingly, for each phase, when the pulse wave PW is on, the application of the DC voltage Vdc to the winding terminal of each phase is turned on. When the pulse wave PW is off, the application of the DC voltage Vdc to the winding terminal of each phase is turned off. Accordingly, the following Embodiment will be explained assuming that the on-off of the pulse wave PW of each phase coincides with the on-off of the application of the DC voltage Vdc to the winding terminal of each phase.

If the dead time is considered between the on period of the high potential side switching device SP and the on period of the low potential side switching device SN, a prescribed time difference corresponding to the dead time is provided between the timing of on-off of the pulse wave PW of each phase and the timing of on-off of the high potential side switching device SP of each phase; and the prescribed time difference corresponding to the dead time is provided between the timing of on-off obtained by inverting the on-off of the pulse wave PW of each phase, and the timing of on-off of the low potential side switching device SN of each phase. There is a case where the diode connected to the switching device in reversely parallel is turned on according to the positive or negative of the winding current of each phase, and the switching device becomes on state during the dead time. Accordingly, if the dead time is considered, the on-off of the pulse wave PW of each phase corresponds to the on-off of application of the DC voltage Vdc to the winding terminal of each phase, with the prescribed time difference according to the positive or negative of the winding current of each phase.

<Voltage Vectors V0 to V7>

As shown in FIG. 13, for each set, in the PWM period Tc, on-off patterns of the six switching devices are changed, and voltage vectors V0 to V7 corresponding to each on-off pattern are switched. For each set, there are eight on-off patterns of the six switching devices. In FIG. 13, "0" indicates that the corresponding switching device is off, and "1" indicates that the corresponding switching device is on. The eight on-off patterns are referred to as the voltage vectors V0 to V7. In the following, the voltage vectors V0 to V7 of first set are described as V0_1 to V7_1, and the voltage vectors V0 to V7 of second set are described as V0_2 to V7_2.

For each set, in the voltage vector V0, all of the low potential side switching devices SNu, SNv, SNw of U phase, V phase, and W phase are turned on, and all of the high potential side switching devices SPu, SPv, SPw of U phase, V phase, and W phase are turned off. And, the terminals of the three-phase windings Cu, Cv, Cw is mutually connected via the electric wire on the low potential side. In this voltage vector V0, current circulates between the three-phase windings and the inverter, and it becomes a state of a zero vector in which a bus current Iinv which flows between the DC power source 2 and the inverter becomes zero.

In the voltage vector V7, all of the high potential side switching devices SPu, SPv, SPw of U phase, V phase, and W phase are turned on, and all of the low potential side switching devices SNu, SNv, SNw of U phase, Vphase, and W phase are turned off. And, the terminals of the three-phase windings Cu, Cv, Cw is mutually connected via the electric wire on the high potential side. In this voltage vector V7, current circulates between the three-phase windings and the inverter, and it becomes a state of the zero vector in which the bus current Iinv which flows between the DC power source 2 and the inverter 4 becomes zero.

In other voltage vectors V1 to V6, the bus current Iinv becomes equal to any one of the currents Iu, Iv, Iw which flow through the windings of U phase, V phase, and W phase. In these voltage vectors V1 to V6, it becomes a state of an effective vector in which the bus current Iinv which flows between the DC power source 2 and the inverter 4 does not become zero.

1-3-4-1. Switching of Carrier Wave Signal, and Generation of Pulse Wave Before Shift Correction <Switching of First Carrier Wave Signal C1 and Second Carrier Wave Signal C2>

The PWM control unit 34 uses, as the carrier wave signal, the first carrier wave signal C1, and the second carrier wave signal C2 which differs from the first carrier wave signal C1 by 180 degrees in phase.

The PWM control unit 34 generates at least one first comparison pulse wave PW1 which is at least one pulse wave by comparing the first carrier wave signal C1 with at least one the voltage command value, and generates at least one second comparison pulse wave PW2 which is at least one pulse wave by comparing the second carrier wave signal C2 with at least one other the voltage command value, out of the voltage command values of 2×(3−1) not coinciding with the maximum value or the minimum value of the carrier wave signal in two sets.

In the present embodiment, for each set, when the phase of the maximum current absolute value coincides with the phase of the maximum voltage Vmax or the minimum voltage Vmin in the voltage command values of three-phase, in two phases other than the phase of the maximum voltage Vmax at the execution time of the flat-top two-phase modulation (the phase of the minimum voltage Vmin, the phase of the middle voltage Vmid), or two phases other than the phase of the minimum voltage Vmin at the execution time of the flat-bottom two-phase modulation (the phase of the maximum voltage Vmax, the phase of the middle voltage Vmid), the PWM control unit 34 generates the first comparison pulse wave PW1 by comparing the voltage command value of one phase with the first carrier wave signal C1, and generates the second comparison pulse wave PW2 by comparing the voltage command value of the other phase with the second carrier wave signal C2.

For each set, when the phase of the maximum current absolute value coincides with the phase of the middle voltage Vmid in the voltage command values of three-phase, the PWM control unit 34 compares the voltage command values of two phases other than the phase of the maximum voltage Vmax at the execution time of the flat-top two-phase modulation, or the voltage command values of two phases other than the phase of the minimum voltage Vmin at the execution time of the flat-bottom two-phase modulation, with one of the first carrier wave signal C1 and the second carrier wave signal C2.

<Pulse Waves Before Shift Correction>

Figure 14:
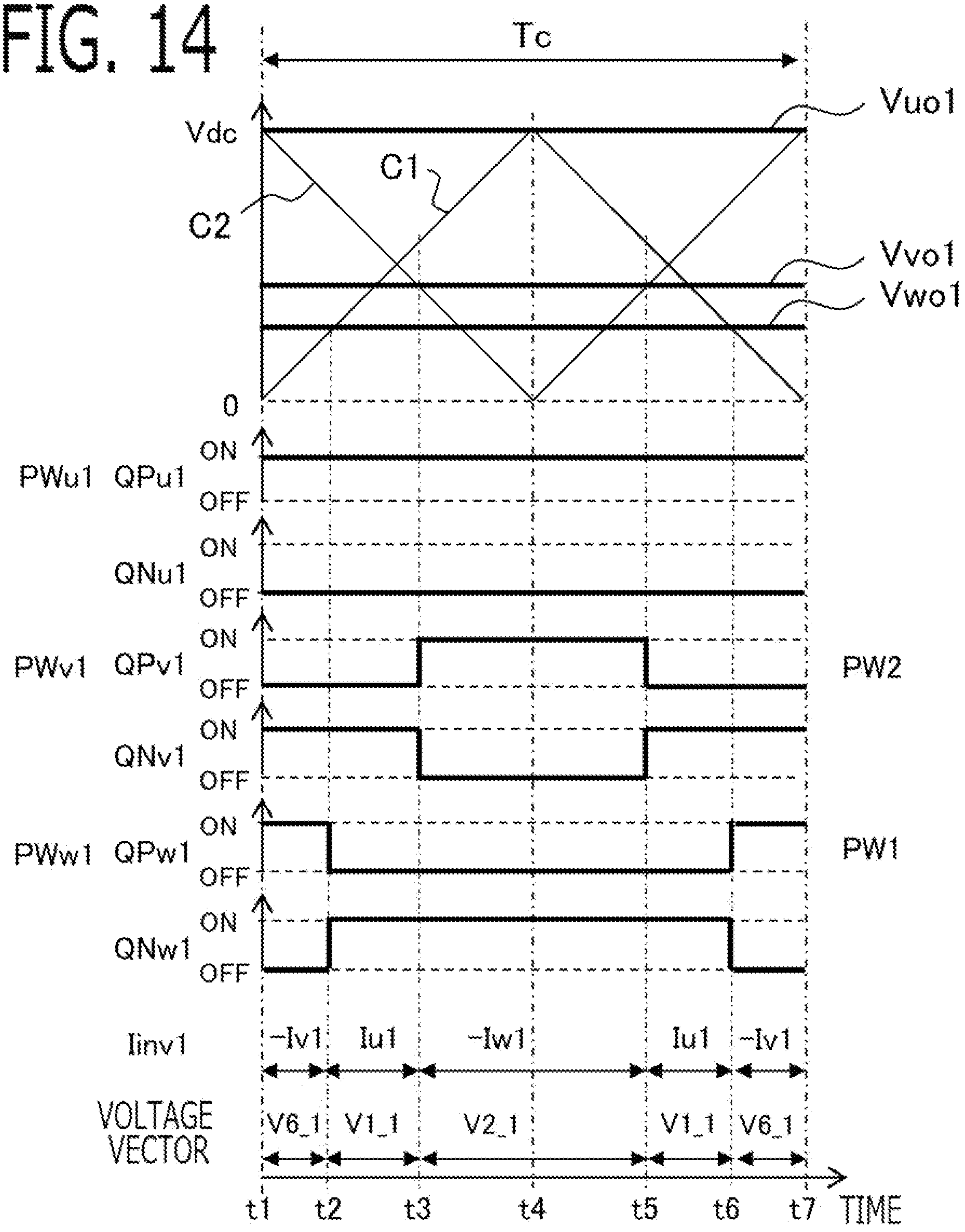
FIG. 14 is a time chart for explaining the PWM control of first set when the power-factor angle is 0 degree, according to Embodiment 1.

FIG. 14 is a time chart explaining generation of the pulse waves before the shift correction of first set at the timing A of FIG. 9. FIG. 14 shows the voltage command values of three-phase of first set Vuo1, Vvo1, Vwo1, the first and the second carrier wave signals C1, C2, the pulse waves of three-phase of first set PWu1, PWv1, PWw1, and the switching signals of each switching device QPu1 to QNw1, in the PWM period Tc. Since the generation of the pulse waves before the shift correction of second set is similar to the first set, explanation is omitted.

Each carrier wave signal C1, C2 is a triangular wave which oscillates at the PWM period Tc with an amplitude of a half value Vdc/2 of the DC voltage centering on a center value Vdc/2 of the DC voltage. The minimum value of the carrier wave signal is 0, and the maximum value is Vdc. Any waveform other than the triangular wave, such as a saw tooth wave, may be used for the carrier wave signal. The common PWM period Tc is used for the first set and the second set. That is, the start time point and the end time point of the PWM period Tc coincides between two sets.

In FIG. 14, the voltage command value Vuo1 of U1 phase is compared with the first carrier wave signal C1, the voltage command value Vvo1 of V1 phase is compared with the second carrier wave signal C2, and the voltage command value Vwo1 of W1 phase is compared with the first carrier wave signal C1.

For each phase, the PWM control unit 34 turns on the pulse wave PW, when the carrier wave signal of comparison object is less than the voltage command value, and turns off the pulse wave PW, when the carrier wave signal of comparison object exceeds the voltage command value.

In the present embodiment, for each phase, the PWM control unit 34 sets the pulse wave PW as the high potential side switching signal QP as it is, and sets a pulse wave obtained by inverting on-off of the pulse wave PW as the low potential side switching signal QN. When the high potential side switching signal QP is turned on, the high potential side switching device SP is turned on, and when the high potential side switching signal QP is turned off, the high potential side switching device SP is turned off. When the low potential side switching signal QN is turned on, the low potential side switching device SN is turned on, and when the low potential side switching signal QN is turned off, the low potential side switching device SN is turned off.

As mentioned above, if the dead time is considered, the prescribed time difference corresponding to the dead time is provided between the timing of on-off of the pulse wave PW of each phase and the timing of on-off of the high potential side switching signal QP of each phase; and the prescribed time difference corresponding to the dead time is provided between the timing of on-off obtained by inverting the on-off of the pulse wave PW of each phase, and the timing of on-off of the low potential side switching signal QN of each phase.

The bus current of first set Iinv1 which flows into the inverter of first set 41 from the DC power source 2 is –Iv1 in t1 to t2, is Iu1 in t2 to t3, is –Iw1 in t3 to t5, is Iu1 in t5 to t6, and is –Iv1 in t6 to t7. Power current flows at all the timings.

Figure 15:
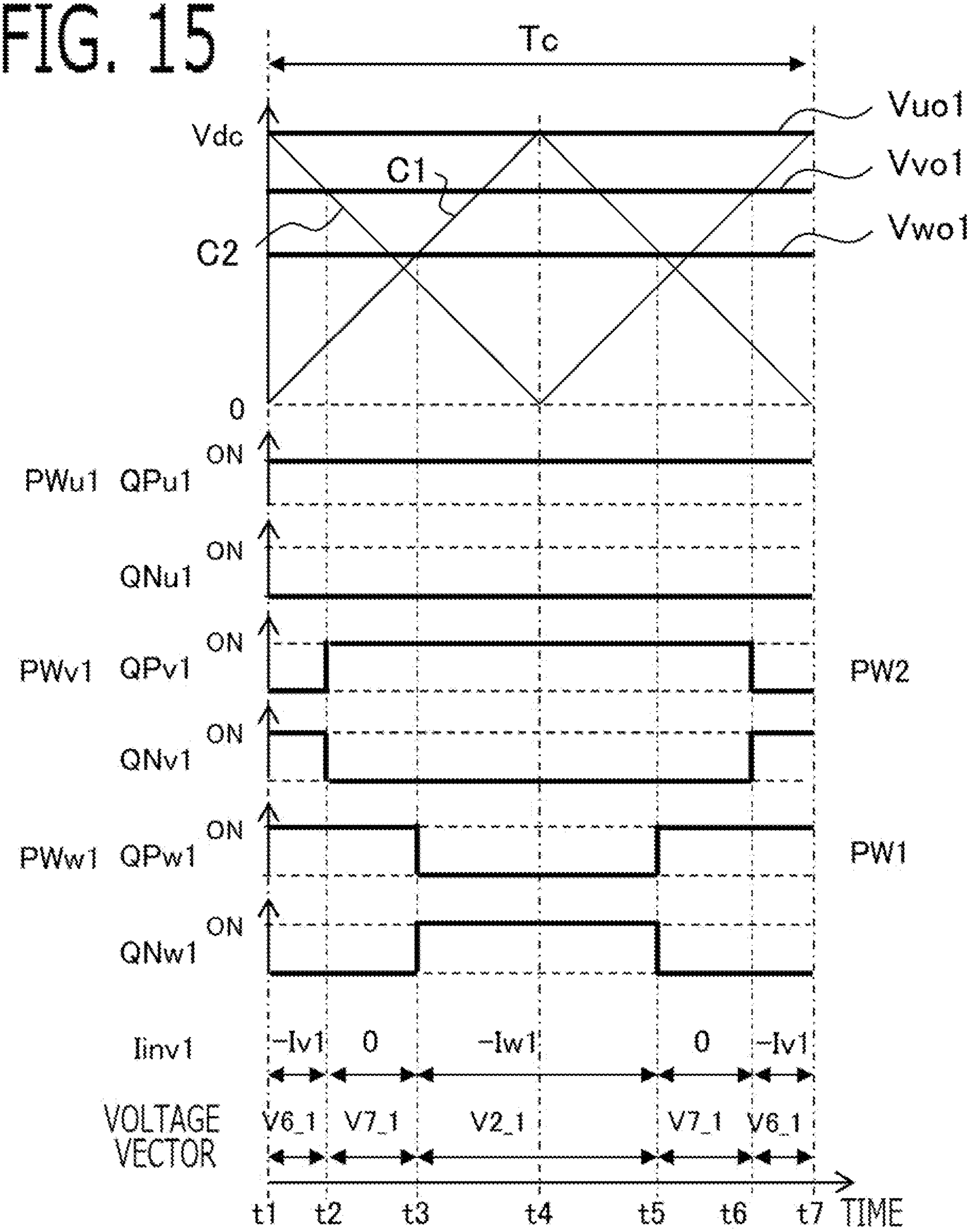
FIG. 15 is a time chart for explaining the PWM control of first set when the power-factor angle is 0 degree, according to Embodiment 1.

When a modulation rate corresponding to a ratio of the absolute value of the voltage vector with respect to the DC voltage Vdc is low, the generation of the pulse wave before the shift correction of first set is as shown in FIG. 15. The bus current of first set Iinv1 is –Iv1 in t1 to t2, is 0 in t2 to t3, is –Iw1 in t3 to t5, is 0 in t5 to t6, and is –Iv1 in t6 to t7. The current Iu1 of U1 phase which is the phase of the maximum current absolute value does not flow.

The relation of the next equation is established. As shown in FIG. 1, Iinv1 is the bus current of first set which flows into the inverter of first set 41 from the DC power source 2 and the smoothing capacitor 3. Iinv2 is the bus current of second set which flows into the inverter of second set 42 from the DC power source 2 and the smoothing capacitor 3. Idc is a power source current which flows into the smoothing capacitor 3 and the inverters of first set and second set 41, 42 from the DC power source 2. Ic is a capacitor current which flows from the smoothing capacitor 3.

[Math. 3]

$$Iinv1 + Iinv2 = Idc + Ic \qquad (3)$$

$$Ic = Iinv1 + Iinv2 - Idc$$

The power source current Idc is almost a constant value in the PWM period Tc. When the current flowing into the three-phase windings of first set and the current flowing into the three-phase windings of second set are equalized, the power source current Idc is given by the next equation using a modulation rate k, the power-factor angle θiv, and a current effective value Irms. The modulation rate k is a value obtained by dividing the amplitude of the line voltages of the voltage command values of three-phase by the half value Vdc/2 of the DC voltage.

[Math. 4]

$$Idc = 2\sqrt{3}\,k\cos\theta_{iv}I_{rms}/\sqrt{2} \qquad (4)$$

In order to reduce the capacitor current Ic, Iinv1+Iinv2 should avoid being a large value in the low modulation rate, and Iinv1+Iinv2 should avoid being zero or being negative in the high modulation rate. The same is applicable to Iinv2. And, in the present embodiment, after suppressing Iinv1–Idc/2, Ic is also suppressed.

<Switching of Carrier Wave Signals when Power-Factor Angle is 0 Degree>

A switching behavior of the carrier wave signals of first set when the power-factor angle is 0 degree will be explained. When the power-factor angle is 0 degree, as shown in FIG. 8, the first carrier wave signal C1 and the second carrier wave signal C2 are switched.

Since the hatching portions are the switching stop phases, the output result does not change even if either carrier wave signal is selected. In order to reduce the capacitor current, the other two phases should be different carrier wave signals. Accordingly, the carrier wave signals are switched in the switching stop phase. If the rotation direction changes from the left to the right of FIG. 8, U1 phase is switched to the second carrier wave signal C2 in 150 to 210 degrees, and is switched to the first carrier wave signal C1 in 330 to 360 degrees, or 0 to 30 degrees. V1 phase is switched to the second carrier wave signal in 270 to 330 degrees, and is switched to the first carrier wave signal in 90 to 150 degrees. W1 phase is switched to the second carrier wave signal C2 in 30 to 90 degrees, and is switched to the first carrier wave signal C1 in 210 to 270 degrees.

Figure 16:
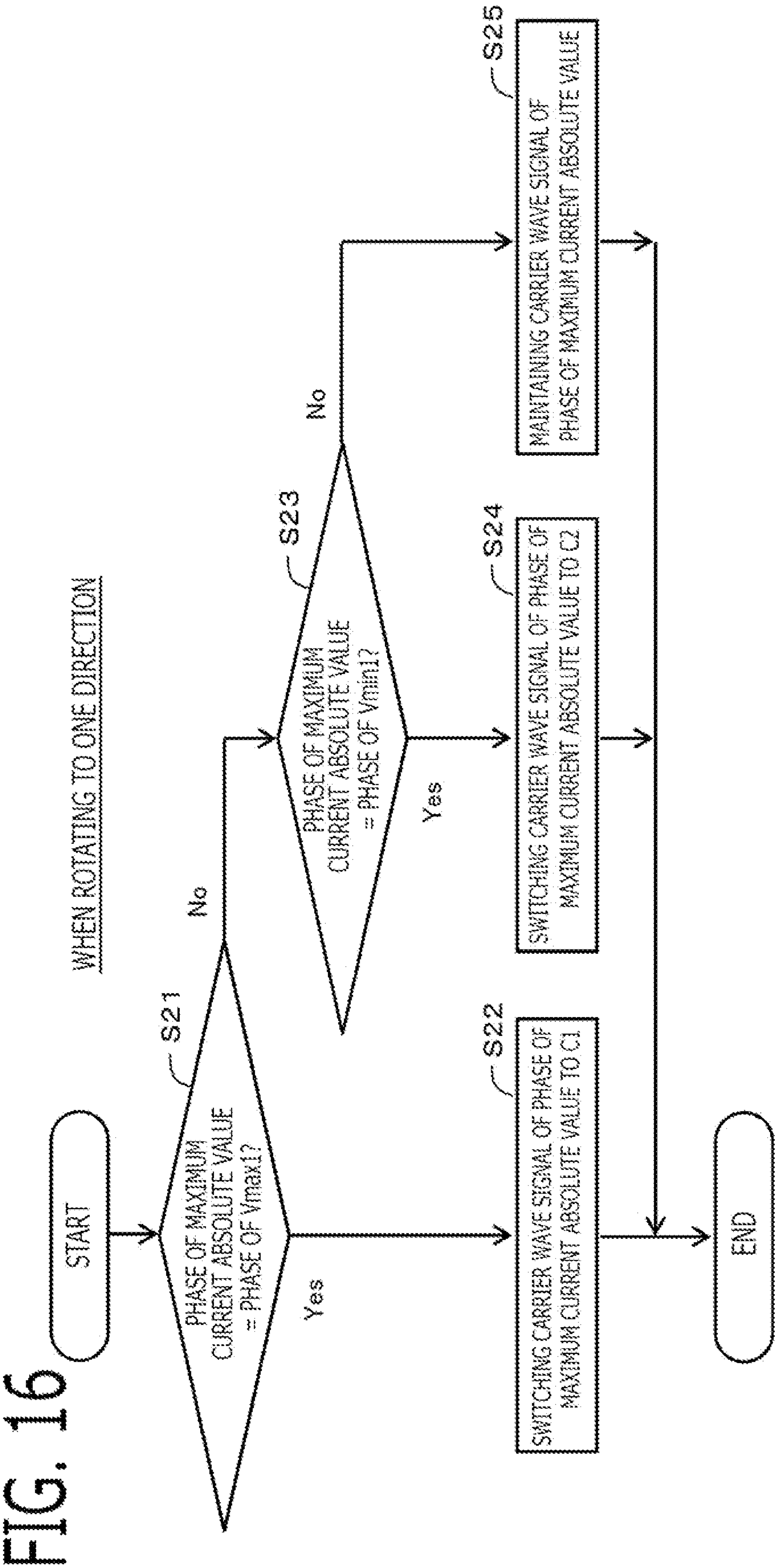
FIG. 16 is a flowchart for explaining the switching processing of the carrier wave signals of first set when rotating to one direction, according to Embodiment 1.

For example, as shown in FIG. 8, when rotating to one direction, the switching processing may be performed according to the flowchart of FIG. 16. In the step S21, the PWM control unit 34 determines whether or not the phase of the maximum current absolute value of first set Iabsmax1 coincides with the phase of the maximum voltage Vmax1 in the voltage command values of three-phase of first set. When it coincides, it advances to the step S22, and when it does not coincide, it advances to the step S23. In the step S22, the PWM control unit 34 switches the carrier wave signal of the phase of the maximum current absolute value of first set to the first carrier wave signal C1.

On the other hand, in the step S23, the PWM control unit 34 determines whether or not the phase of the maximum current absolute value of first set Iabsmax1 coincides with the phase of the minimum voltage Vmin1 in the voltage command values of three-phase of first set. When it coincides, it advances to the step S24, and when it does not coincide, it advances to the step S25. In the step S24, the PWM control unit 34 switches the carrier wave signal of the phase of the maximum current absolute value of first set to the second carrier wave signal C2.

On the other hand, in the step S25, the phase of the maximum current absolute value of first set Iabsmax1 coincides with the phase of the middle voltage of first set Vmid1, and the PWM control unit 34 maintains the currently set carrier wave signal of the phase of the maximum current absolute value of first set, without switching.

According to the above processing, when the step S21 is established, the voltage command value of the phase of the maximum current absolute value coincides with the maximum value of the carrier wave signal by the flat-top two-phase modulation, and the switching operation stops. In this state, since the carrier wave signal of the phase of the maximum current absolute value of first set is switched to the first carrier wave signal C1, disturbance of the applied voltage by switching can be suppressed. When the step S23 is established, the voltage command value of the phase of the maximum current absolute value of first set coincides with the minimum value of the carrier wave signal of first set by the flat-bottom two-phase modulation, and the switching operation stops. In this state, since the carrier wave signal of the phase of the maximum current absolute value of first set is switched to the second carrier wave signal C2, disturbance of the applied voltage by switching can be suppressed.

Figure 17:
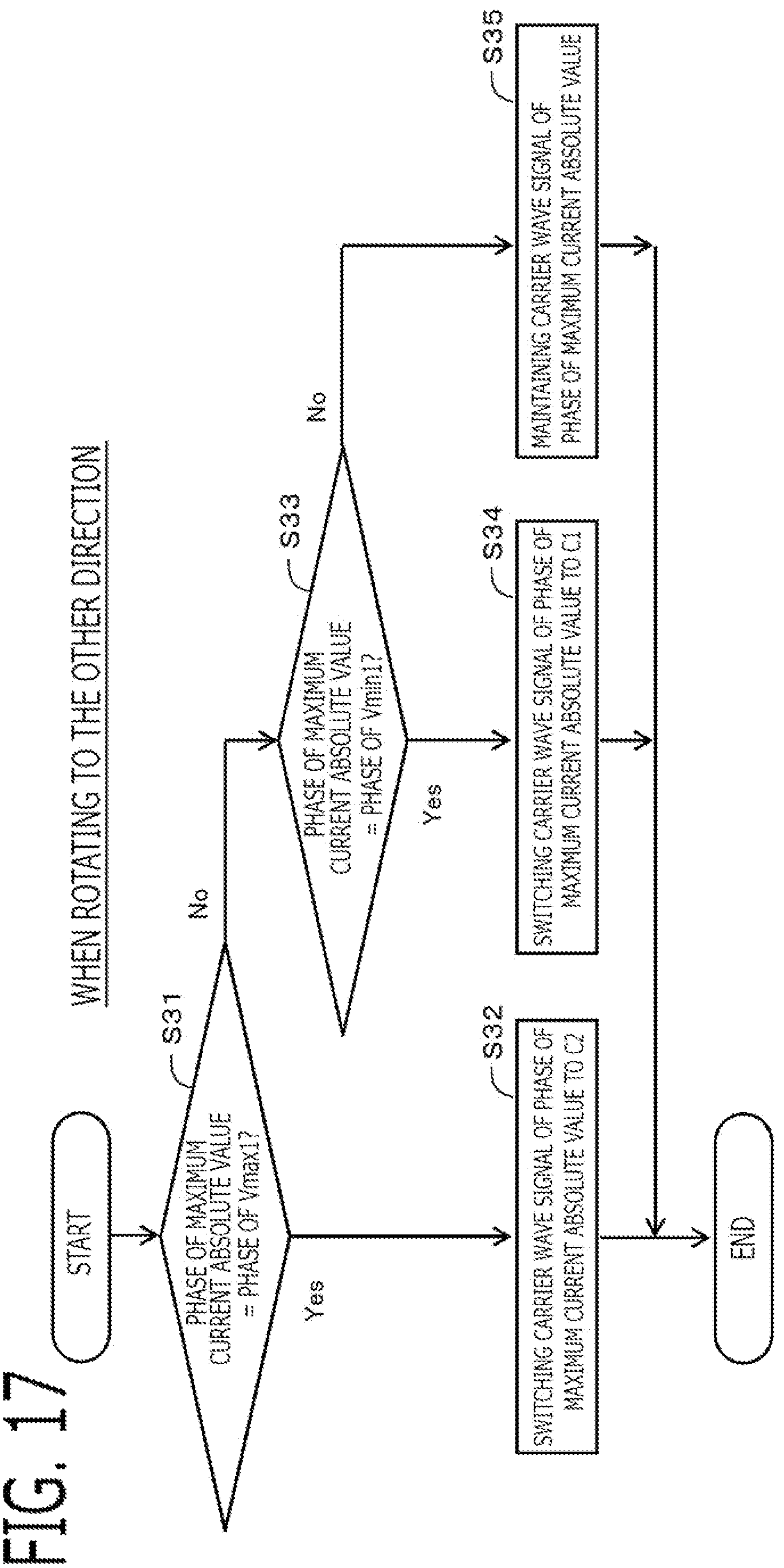
FIG. 17 is a flowchart for explaining the switching processing of the carrier wave signals of first set when rotating to the other direction, according to Embodiment 1.

When rotating to the other direction opposite to FIG. 8, the switching processing may be performed according to the flowchart of FIG. 17. In the step S31, the PWM control unit 34 determines whether or not the phase of the maximum current absolute value Iabsmax1 coincides with the phase of the maximum voltage Vmax1 in the voltage command values of three-phase. When it coincides, it advances to the step S32, and when it does not coincide, it advances to the step S33. In the step S32, the PWM control unit 34 switches the carrier wave signal of the phase of the maximum current absolute value to the second carrier wave signal C2.

On the other hand, in the step S33, the PWM control unit 34 determines whether or not the phase of the maximum current absolute value Iabsmax1 coincides with the phase of the minimum voltage Vmin1 in the voltage command values of three-phase. When it coincides, it advances to the step S34, and when it does not coincide, it advances to the step S35. In the step S34, the PWM control unit 34 switches the carrier wave signal of the phase of the maximum current absolute value to the first carrier wave signal C1.

On the other hand, in the step S35, the phase of the maximum current absolute value Iabsmax1 coincides with the phase of the middle voltage Vmid1, and the PWM control unit 34 maintains the currently set carrier wave signal of the phase of the maximum current absolute value, without switching.

In the PWM period Tc, the first carrier wave signal C1 is a triangular wave projecting upward, and the second carrier wave signal C2 is a triangular wave projecting downward. However, these may be opposite.

FIG. 18 shows a switching behavior of the carrier wave signal of second set when the power-factor angle is 0 degree. The phases Gi of the current vectors are shifted by 30 degrees between two sets. In FIG. 18, similarly to FIG. 8, since the phase θi1 of the current vector of first set is used as the reference, the phase in FIG. 18 is shifted by 30 degrees with respect to the phase in FIG. 8. Other than the phase shift, the behavior is similar to FIG. 8. Also for the second set, when rotating to one direction, the processing similar to the flowchart of the first set of FIG. 16 is performed, and when rotating to the other direction, the processing similar to the flowchart of the first set of FIG. 17 is performed.

When the phase θi1 of the current vector is 15 degrees, at the center of the PWM period Tc, the voltage vector V2_1 of first set and the voltage vector V2_2 of second set are outputted, and at the ends, the voltage vector V6_1 of first set and the voltage vector V6_2 of second set are outputted.

When the phase θi1 of the current vector is 45 degrees, at the center of the PWM period Tc, the voltage vector V3_1 of first set and the voltage vector V2_2 of second set are outputted, and at the ends, the voltage vector V1_1 of first set and the voltage vector V6_2 of second set are outputted. By setting the phase difference between the windings of first set and the windings of second set to 30 degrees, the adjacent voltage vectors can be outputted at the same time, so the phase current ripple can be suppressed.

<Switching of Carrier Wave Signals when Power-Factor Angle is 60 Degrees>

A switching behavior of the carrier wave signals of first set when the power-factor angle is 60 degree will be explained. When the power-factor angle is 60 degrees, as shown in FIG. 11, the first carrier wave signal C1 and the second carrier wave signal C2 are switched.

Since the hatching portions are the switching stop phases, the output result does not change even if either carrier wave signal is selected. In order to reduce the capacitor current, the other two phases should be different carrier wave signals. Accordingly, the carrier wave signals are switched in the switching stop phase. If the rotation direction changes from the left to the right of FIG. 11, U1 phase is switched to the second carrier wave signal C2 in 150 to 180 degrees, and is switched to the first carrier wave signal C1 in 330 to 360 degrees. V1 phase is switched to the second carrier wave signal C2 in 270 to 300 degrees, and is switched to the first carrier wave signal C1 in 90 to 120 degrees. W1 phase is switched to the second carrier wave signal C2 in 30 to 60 degrees, and is switched to the first carrier wave signal C1 in 210 to 240 degrees. Accordingly, when the power-factor angle is 60 degrees, it becomes similar to FIG. 8 when the power-factor angle is 0 degree. Accordingly, the switching processing of the carrier wave signals is performed according to the flowchart of FIG. 16. That is, the processing of the flowchart of FIG. 16 is used irrespective of the power-factor angle.

When the power-factor angle is 0 degree, the phase of the maximum current absolute value was either the phase of the maximum voltage Vmax1, or the phase of the minimum voltage Vmin1. However, when the power-factor angle is 60 degrees, there is an interval where the phase of the maximum current absolute value is the phase of the middle voltage Vmid1. For example, in FIG. 11, the intervals are 0 to 30 degrees, 60 to 90 degrees, 120 to 150 degrees, 180 to 210 degrees, 240 to 270 degrees, and 300 to 330 degrees. In these intervals, the capacitor current can be reduced by the same carrier wave signal being set to two phases other than the switching stop phase.

That is, for each set, when the phase of the maximum current absolute value coincides with the phase of the middle voltage Vmid, the PWM control unit 34 compares the voltage command values of two phases other than the phase of the maximum voltage at the execution time of the flat-top two-phase modulation, or the voltage command values of two phases other than the phase of the minimum voltage at the execution time of the flat-bottom two-phase modulation, with one of the first carrier wave signal C1 and the second carrier wave signal C2.

FIG. 19 shows a switching behavior of the carrier wave signal of second set when the power-factor angle is 60 degrees. The phases θi of the current vectors are shifted by 30 degrees between two sets. In FIG. 19, similarly to FIG. 18, since the phase θi1 of the current vector of first set is used as the reference, the phase in FIG. 19 is shifted by 30 degrees with respect to the phase in FIG. 11. Other than the phase shift, the behavior is similar to FIG. 11. Also for the second set, the processing similar to the flowchart of the first set of FIG. 16 is performed.

When the phase θi1 of the current vector is 15 degrees, at the center of the PWM period Tc, the voltage vector V3_1 of first set and the voltage vector V2_2 of second set are outputted, and at the ends, the voltage vector V7_1 of first set and the voltage vector V6_2 of second set are outputted. When the phase θi1 of the current vector is 45 degrees, at the center of the PWM period Tc, the voltage vector V3_1 of first set and the voltage vector V7_2 of second set are outputted, and at the ends, the voltage vector V1_1 of first set and the voltage vector V6_2 of second set are outputted. By setting the phase difference between the windings of first set and the windings of second set to 30 degrees, the adjacent voltage vectors can be outputted at the same time, or the zero voltage vector can be outputted in one set, so the phase current ripple can be suppressed.

By setting the phase difference between the windings of first set and the windings of second set to 30 degrees, since the combination of the voltage vectors of first set and second set changes every 30 degrees, at least one of the total four carrier wave signals of two phases other than the switching stop phase of first set and two phases other than the switching stop phase of second set can be a different carrier wave signal from the others.

1-3-4-2. Shift Correction

The PWM control unit 34 sets at least one pair of the first comparison pulse wave PW1 compared with the first carrier wave signal C1 and the second comparison pulse wave PW2 compared with the second carrier wave signal C2 within the same PWM period Tc. Within the same PWM period, the PWM control unit 34 shifts one or both of paired the first comparison pulse wave PW1 and the second comparison pulse wave PW2 in an advance direction or a delay direction so that a rising timing of one of a potential of the winding terminal applied by the paired first comparison pulse wave PW1 and a potential of the winding terminal applied by the paired second comparison pulse wave PW2 coincides with a falling timing of the other.

Herein, the rising timing of the potential of the winding terminal applied by the pulse wave is a timing when the high potential side switching device is turned on from off, and the potential of the winding terminal becomes the high potential (in this example, Vdc) of the DC voltage from the low potential (in this example, 0V) of the DC voltage. In the present embodiment, since the dead time is not considered, the rising timing of the potential of the winding terminal coincides with a rising timing when the pulse wave is turned on from off. The falling timing of the potential of the winding terminal applied by the pulse wave is a timing when the low potential side switching device is turned on from off, and the potential of the winding terminal becomes the low potential (0V) of the DC voltage from the high potential (Vdc) of the DC voltage. In the present embodiment, since the dead time is not considered, the falling timing of the potential of the winding terminal coincides with a falling timing when the pulse wave is tuned off from on.

The winding terminal of each phase and the middle point connection part of the series circuit of the high potential side switching device and the low potential side switching device of each phase in the inverter are connected to the low potential side of the DC power source 2 via an insulating member. Accordingly, between the middle point connection part of the series circuit of each phase of the inverter and the winding terminal of each phase, and the low potential side of the DC power source 2, a floating capacitance is generated via the insulating member and works as a floating capacitor. Then, for each phase, when the high potential side switching device is turned on and the low potential side switching device is turned off by the rising of the pulse wave, the potential of the middle point connection part of the series circuit of the inverter and the winding terminal of each phase changes from low potential to high potential. The floating capacitor is charged by this potential change, and a leakage current flows into the inverter from the low potential side of the DC power source 2. On the other hand, for each phase, when the high potential side switching device is turned off and the low potential side switching device is turned on by the falling of the pulse wave, the potential of the middle point connection part of the series circuit of the inverter and the winding terminal of each phase changes from high potential to low potential. The floating capacitor is discharged by this potential change, and the leakage current flows into the low potential side of the DC power source 2 from the inverter.

According to the above configuration, one or both of paired the first comparison pulse wave PW1 and the second comparison pulse wave PW2 is shifted in the advance direction or the delay direction so that the rising timing of one of the potential of the winding terminal by the paired first comparison pulse wave PW1 and the potential of the winding terminal by the paired second comparison pulse wave PW2 coincides with the falling timing of the other. Accordingly, the leakage current on the charging side generated by the rising of the potential of the winding terminal, and the leakage current on the discharging side generated by the falling of the potential of the winding terminal are canceled, and the leakage current can be reduced. The electromagnetic noise can be reduced by reduction of the leakage current.

Figure 20:
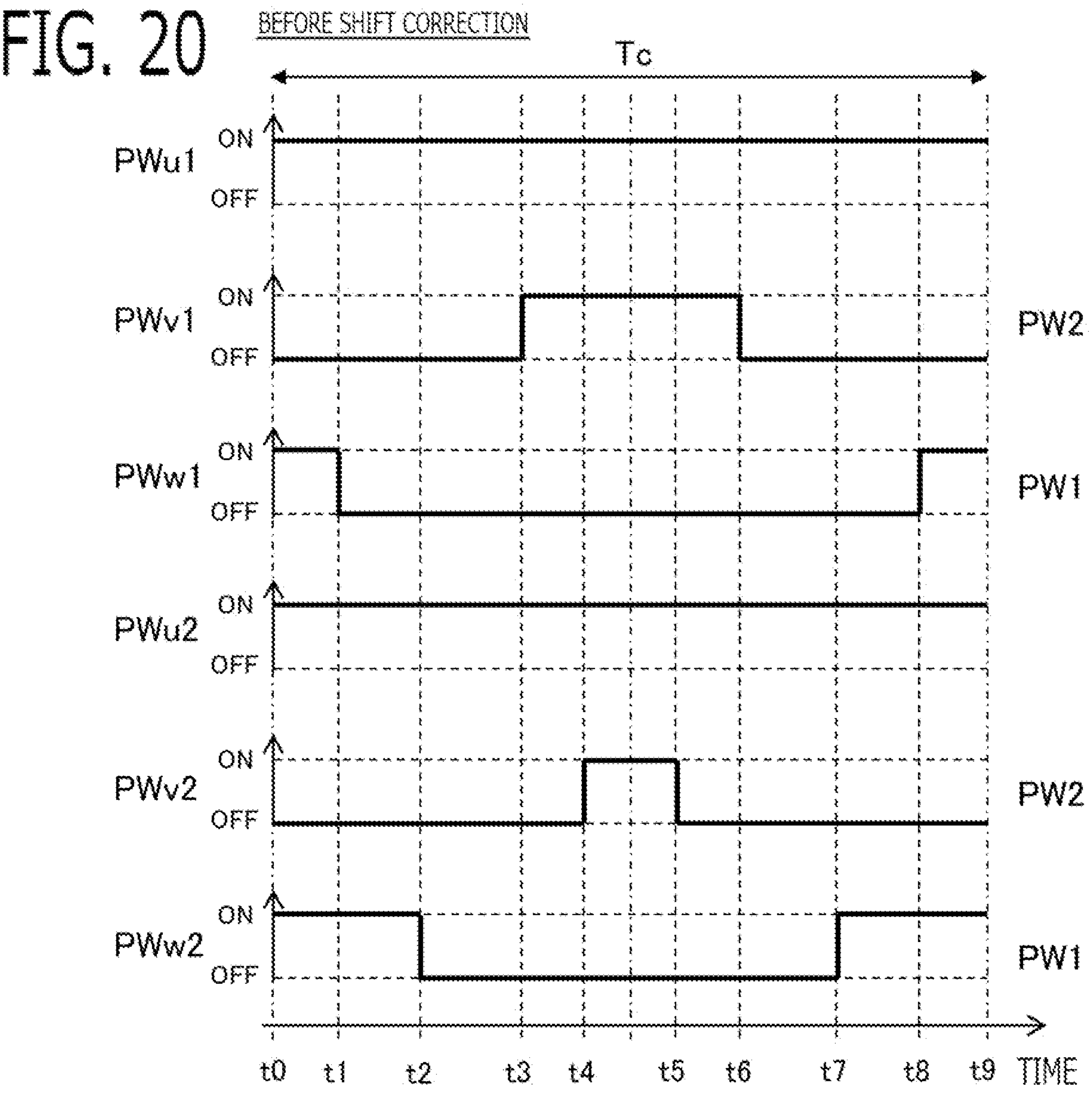
FIG. 20 is a time chart for explaining the pulse wave before the shift correction when the power-factor angle is 0 degree, according to Embodiment 1.
Figure 21:
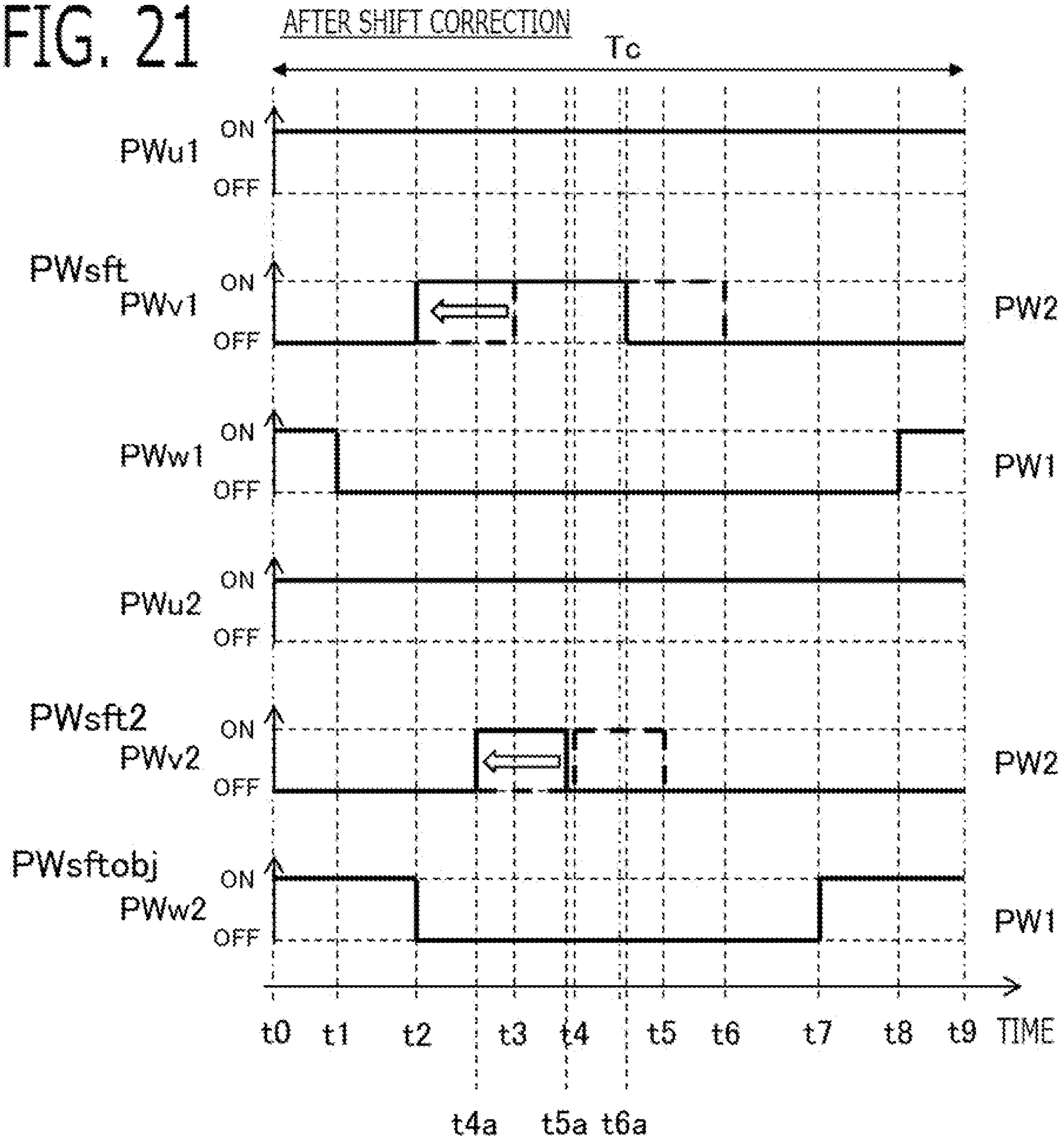
FIG. 21 is a time chart for explaining the pulse wave after the shift correction when the power-factor angle is 0 degree, according to Embodiment 1.

As shown in FIG. 20, the first comparison pulse wave PW1 which is compared with the first carrier wave signal C1 becomes a waveform which changes from on to off, and then changes from off to on, within the same PWM period Tc. On the other hand, the second comparison pulse wave PW2 which is compared with the second carrier wave signal C2 which differs from the first carrier wave signal C1 by 180 degrees in phase becomes a waveform which changes from off to on, and then changes from on to off, within the same PWM period Tc. Accordingly, within the same PWM period Tc, the on-off waveform of the first comparison pulse wave PW1 and the on-off waveform of the second comparison pulse wave PW2 are inverted with each other. Accordingly, as shown in FIG. 21, one or both of the first comparison pulse wave PW1 and the second comparison pulse wave PW2 can be shifted in the advance direction or the delay direction so that the falling of the potential of the winding terminal by the falling on the advance direction side of the first comparison pulse wave PW1 coincides with the rising of the potential of the winding terminal by the rising on the advance direction side of the second comparison pulse wave PW2 within the same PWM period Tc, or so that the rising of the potential of the winding terminal by the rising on the delay direction side of the first comparison pulse wave PW1 coincides with the falling of the potential of the winding terminal by the falling on the delay direction side of the second comparison pulse wave PW2 within the same PWM period Tc.

In the present embodiment, since the dead time is not considered, the rising and the falling of the pulse wave coincides with the rising and the falling of potential of the winding terminal. The PWM control unit 34 shifts one or both of the first comparison pulse wave PW1 and the second comparison pulse wave PW2 in the advance direction or the delay direction so that the rising timings of one of the first comparison pulse wave PW1 and the second comparison pulse wave PW2 coincides with the falling timing of the other. If the dead time is considered, the PWM control unit 34 corrects a shift amount if the dead time is not considered, based on a setting value of the dead time and the positive or negative of the winding current so that the rising timing and the falling timing of the potentials of the winding terminals coincide with each other.

<Pulse Waves Before Shift Correction>

FIG. 20 shows the pulse waves of three-phase of first set PWu1, PWv1, PWw1 before the shift correction, and the pulse waves of three-phase of second set PWu2, PWv2, PWw2 before the shift correction at the timing A of FIG. 9. Herein, the pulse wave of U1 phase PWu1 and the pulse wave of U2 phase PWu2 are the pulse waves of the switching stop phase, the pulse wave of W1 phase PWw1 and the pulse wave of W2 phase PWw2 are the first comparison pulse waves PW1, and the pulse wave of V1 phase PWv1 and the pulse wave of V2 phase PWv2 are the second comparison pulse waves PW2.

The bus current Iinv1+Iinv2 is −Iv1−Iv2 in t0 to t1 and t8 to t9, is Iu1−Iv2 in t1 to t2 and t7 to t8, is Iu1+Iu2 in t2 to t3 and t6 to t7, is −Iw1+Iu2 in t3 to t4 and t5 to t6, and is −Iw1−Iw2 in t4 to t5. The voltage vector is V6_1 and V6_2 in t0 to t1 and t8 to t9, is V1_1 and V6_2 in t1 to t2 and t7 to t8, is V1_1 and V2_2 in t2 to t3 and t6 to t7, is V2_1 and V1_2 in t3 to t4 and t5 to t6, and is V2_1 and V2_2 in t4 to t5. Accordingly, all are adjacent voltage vectors, and the current change can be suppressed, so the effect of reducing the phase current ripple can also be obtained. Therefore, although it is before the shift correction, by switching the carrier wave signal according to FIG. 16, for the voltage command values of four phases other than the switching stop phases, the voltage command values of two phases with the smallest phase difference can be compared with the same carrier wave signal, and the phase current ripple can be reduced.

Unlike the present embodiment, if the pulse waves are generated by well-known third order harmonic wave superposition modulation, the switching stop phase is not provided. Accordingly, there are 12 rising or falling timings in the pulse waves of six phases (potentials of the winding terminals of six phases). On the other hand, in the present embodiment, before the shift correction, the flat-top two-phase modulation or the flat-bottom two-phase modulation is performed. Accordingly, in the pulse waves of two phases of the switching stop phases, there is no rising or falling timing. In the pulse waves of four phases other than the switching stop phases (potentials of the winding terminals of four phases), there are eight rising or falling timings. As explained in the following, by performing the shift correction, at least one pair of rising and falling are canceled. Accordingly, the number of rising or falling timings can be reduced to six or less, the leakage current can be suppressed by reducing the number, and the electromagnetic noise can be reduced.

<Shift Correction>

As shown in FIG. 21, the PWM control unit 34 determines the pulse wave whose rising and falling are the second closest to the center of the PWM period Tc, as the pulse wave of a shift object PWsft to be shifted, and determines a shift direction to the advance direction or the delay direction. The PWM control unit 34 determines, as the pulse wave of a subjected shift object PWsftobj, other pulse wave which has, in the shift direction, rising or falling opposite to rising or falling on the shift direction side of the pulse wave of the shift object PWsft within the same PWM period Tc; and shifts the pulse wave of the shift object PWsft in the shift direction so that rising or falling of potential of the winding terminal by the pulse wave of the shift object PWsft coincides with rising or falling of potential of the winding terminal by the pulse wave of the subjected shift object PWsftobj.

In an example of FIG. 21 corresponding to FIG. 20, the pulse wave of the shift object PWsft is the pulse wave of V1 phase PWv1 which is the second comparison pulse wave PW2, and the shift direction is determined to the advance direction. The pulse wave of the subjected shift object PWsftobj is determined to the pulse wave of W2 phase PWw2 which is the closest to the rising on the advance direction side of the pulse wave of V1 phase PWv1 among the first comparison pulse waves PW1 which have, in the advance direction, the falling opposite to the rising on the advance direction side of the pulse wave of V1 phase PWv1. The pulse wave of the subjected shift object PWsftobj may be determined to the pulse wave of W1 phase PWw1 which is the second closest. Then, the pulse wave of V1 phase PWv1 is shifted in the advance direction so that the rising of the potential of the winding terminal by the pulse wave of V1 phase PWv1 coincides with the falling of the potential of the winding terminal by the pulse wave of W2 phase PWw2. Accordingly, the rising of the potential of the winding terminal by the pulse wave of V1 phase PWv1 and the falling of the potential of the winding terminal by the pulse wave of W2 phase PWw2 can be canceled.

Figure 22:
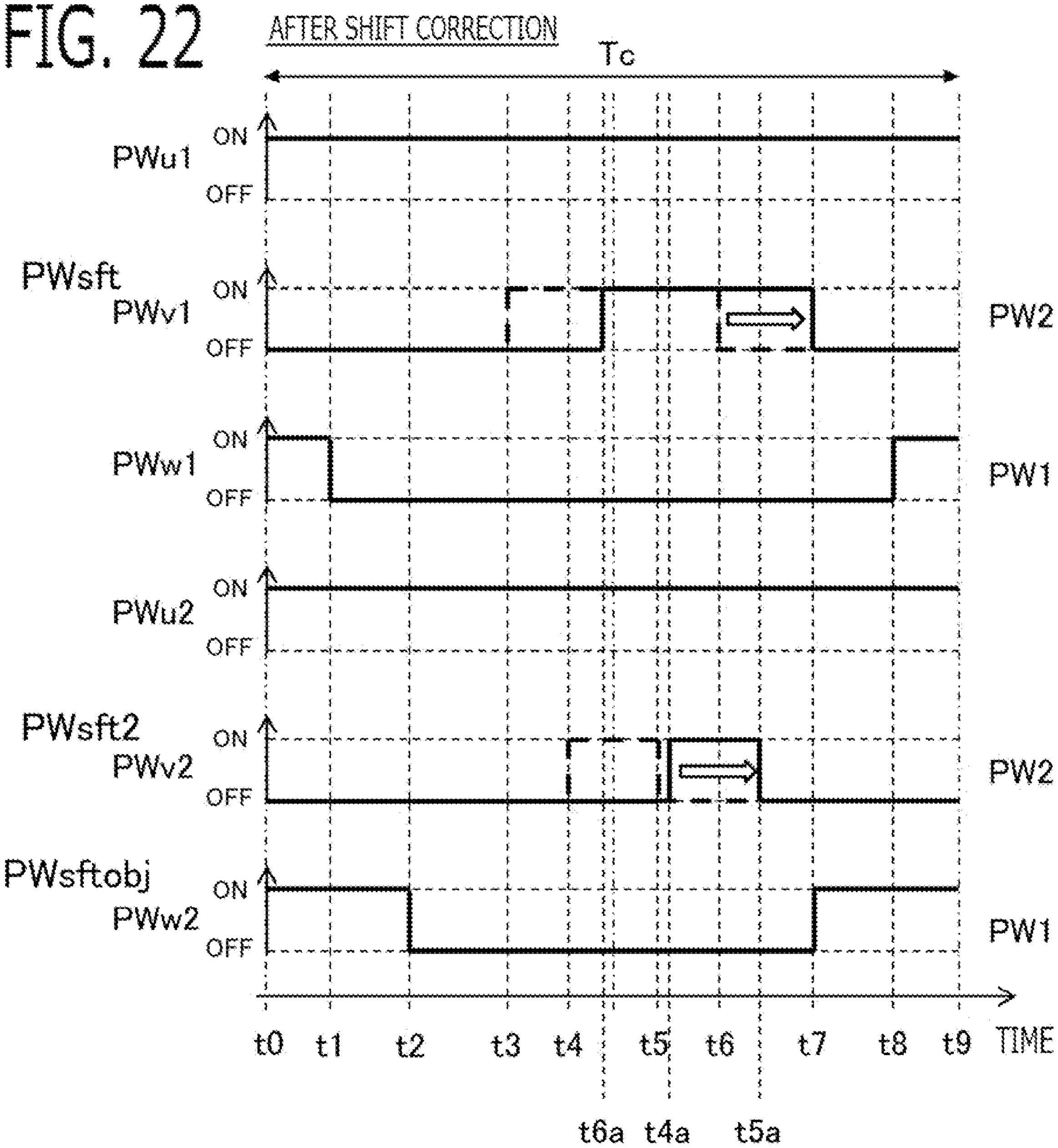
FIG. 22 is a time chart for explaining the pulse wave after the shift correction when the power-factor angle is 0 degree, according to Embodiment 1.

Alternatively, as shown in FIG. 22, the shift direction is determined to the delay direction, and the pulse wave of V1 phase PWv1 may be shifted in the delay direction so that the falling of the potential of the winding terminal by the pulse wave of V1 phase PWv1 coincide with the rising of the potential of the winding terminal by the pulse wave of W2 phase PWw2.

In the case of FIG. 21 and FIG. 22, the PWM control unit 34 sets a pair of the first comparison pulse wave PW1 and the second comparison pulse wave PW2 (a pair of the pulse wave of the shift object PWsft and the pulse wave of the subjected shift object PWsftobj) in which a shift amount in the advance direction or the delay direction of the pulse wave becomes the minimum.

<Shift of Pulse Wave of Second Shift Object>

A shift method of the pulse wave of the second shift object will be explained. The PWM control unit 34 determines the pulse wave whose rising and falling are the first closest to the center of the PWM period Tc, as the pulse wave of a second shift object PWsft2 to be shifted in the same direction as the pulse wave of the shift object PWsft; and shifts the pulse wave of the second shift object PWsft2 in the same direction as the pulse wave of the shift object PWsft so that rising and falling of the pulse wave of the second shift object PWsft2 after the shift are positioned between rising and falling of the pulse wave of the shift object PWsft after the shift.

In the example of FIG. 21, the pulse wave of the second shift object PWsft2 is the pulse wave of V2 phase PWv2 which is the second comparison pulse wave PW2. The pulse wave of V2 phase PWv2 is shifted in the advance direction so that the rising and the falling of the pulse wave of V2 phase PWv2 after the shift are positioned between the rising and the falling of the pulse wave of V1 phase PWv1 after the shift. In the example of FIG. 22, the pulse wave of V2 phase PWv2 is shifted in the delay direction in a similar manner.

As the result, in the example of FIG. 21, the bus current Iinv1+Iinv2 is −Iv1−Iw1 in t0 to t1 and t8 to t9, is Iu1−Iw1 in t1 to t2 and t7 to t8, is Iu1+Iu2 in t6*a* to t7, is −Iw1+Iu2 in t2 to t4*a* and t5*a* to t6*a*, and is −Iw1−Iw2 in t4*a* to t5*a*. Accordingly, the bus current Iinv1+Iinv2 changes in the timing, but does not change in the combination and the period of each combination. Therefore, even if the shift correction is performed, similarly to before the shift correction, the bus current ripple can be reduced, and the capacitor current can be maintained equivalent to before the shift correction.

In the example of FIG. 21 and FIG. 22, the PWM control unit 34 sets the shift amount of the pulse wave of the second shift object PWsft2 to the same shift amount as that of the pulse wave of the shift object PWsft. The shift amount of the second shift object can be set easily.

In this way, for each set of two sets, the PWM control unit 34 shifts the pulse waves in the advance direction or the delay direction so that types of on-off patterns of the switching devices of each phase which are set in the PWM period Tc and a set period of each type in the PWM period Tc become the same before and after the shift correction of the pulse waves.

The PWM control unit 34 shifts other pulse wave whose rising and falling exist between rising and falling of the pulse wave before the shift in the pulse wave to be shifted, in the same direction as the pulse wave to be shifted, within the same PWM period Tc.

<Other Shift Method of Pulse Wave of Second Shift Object>

Figure 23:
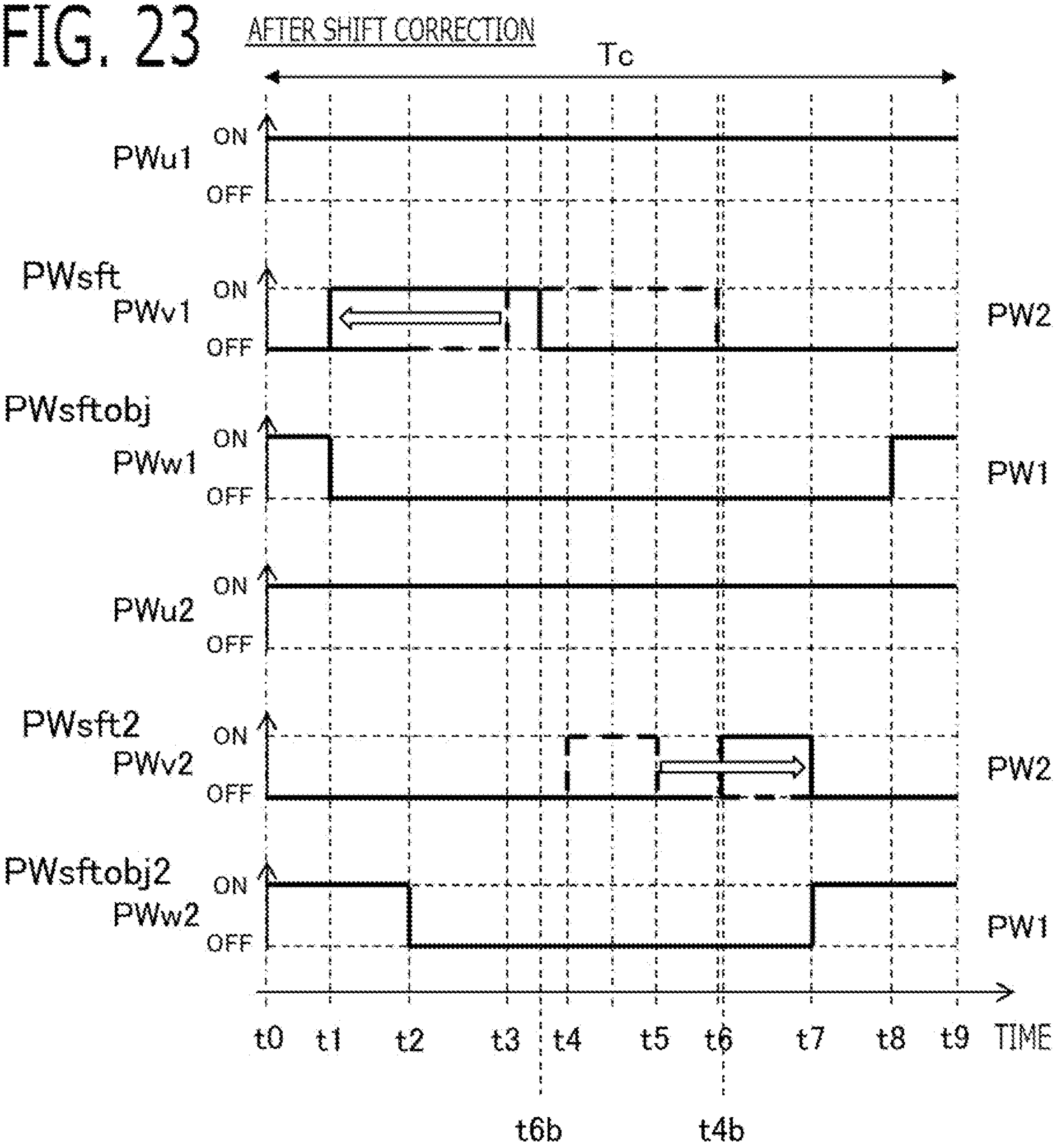
FIG. 23 is a time chart for explaining the pulse wave after the shift correction when the power-factor angle is 0 degree, according to Embodiment 1.

Other shift method of the pulse wave of the second shift object will be explained. As shown in FIG. 23, the PWM control unit 34 determines the pulse wave whose rising and falling are the first closest to the center of the PWM period Tc, as the pulse wave of the second shift object PWsft2; and determines the second shift direction of the pulse wave of the second shift object PWsft2 to the advance direction or the delay direction. The PWM control unit 34 determines, as the pulse wave of a second subjected shift object PWsftobj2, other pulse wave which has, in the second shift direction, rising or falling opposite to rising or falling on the second shift direction side of the pulse wave of the second shift object PWsft2, and has rising or falling different from rising or falling of the pulse wave of the subjected shift object PWsftobj with which the pulse wave of the shift object PWsft is coincided, within the same PWM period Tc. Then, the PWM control unit 34 shifts the pulse wave of the second shift object PWsft2 in the second shift direction so that rising or falling of potential of the winding terminal by the pulse wave of the second shift object PWsft2 coincides with rising or falling of the potential of the winding terminal by the pulse wave of the second subjected shift object PWsftobj2.

In the example of FIG. 23, the pulse wave of the second shift object PWsft2 is the pulse wave of V2 phase PWv2 which is the second comparison pulse wave PW2. The second shift direction is determined to the delay direction. Then, the pulse wave of W2 phase PWw2 which has, in the delay direction, the rising opposite to the falling on the delay direction side of the pulse wave of V2 phase PWv2, and has the rising different from the falling of the pulse wave of W1 phase PWw1 with which the pulse wave of V1 phase PWv1 is coincided, within the same PWM period Tc is determined as the pulse wave of the second subjected shift object PWsftobj2. The pulse wave of W1 phase PWw1 may be determined as the pulse wave of the second subjected shift object PWsftobj2. Then, the pulse wave of V2 phase PWv2 is shifted in the delay direction so that the falling of the potential of the winding terminal by the pulse wave of V2 phase PWv2 coincides with the rising of the potential of the winding terminal by the pulse wave of W2 phase PWw2. Accordingly, the falling of the potential of the winding terminal by the pulse wave of V2 phase PWv2 and the rising of the potential of the winding terminal by the pulse wave of W2 phase PWw2 can be canceled. Accordingly, by performing the shift corrections of two pairs, the risings and fallings of two pairs are canceled. Accordingly, the number of rising or falling timings can be reduced to four, the leakage current can be suppressed by reducing the number, and the electromagnetic noise can be reduced.

The bus current of first set Iinv1 can be any of −Iv1, Iu1 and −Iw1, although the timing changes. The bus current of second set Iinv2 can be any of −Iv2, Iu2 and −Iw2, although the timing changes. Accordingly, even if the shift correction is performed, similarly to before the shift correction, the bus current ripple can be reduced, and the capacitor current can be maintained equivalent to before the shift correction.

The shift direction of the pulse wave of V1 phase PWv1 which is the pulse wave of the shift object PWsft is determined to the advance direction. The pulse wave of the subjected shift object PWsftobj is determined to the pulse wave of W1 phase PWw1 which is the second closest to the rising on the advance direction side of the pulse wave of V1 phase PWv1 among the first comparison pulse waves PW1 which have, in the advance direction, the falling opposite to the rising on the advance direction side of the pulse wave of V1 phase PWv1. The pulse wave of the subjected shift object PWsftobj may be determined to the pulse wave of W2 phase PWw2 which is the first closest. The shift direction of the pulse wave of the shift object PWsft may be determined to the delay direction, and the pulse wave of the subjected shift object PWsftobj may be determined to the pulse wave of W1 phase PWw1 which has, in the delay direction, the rising opposite to the falling on the delay direction side of the pulse wave of V1 phase PWv1.

Figure 24:
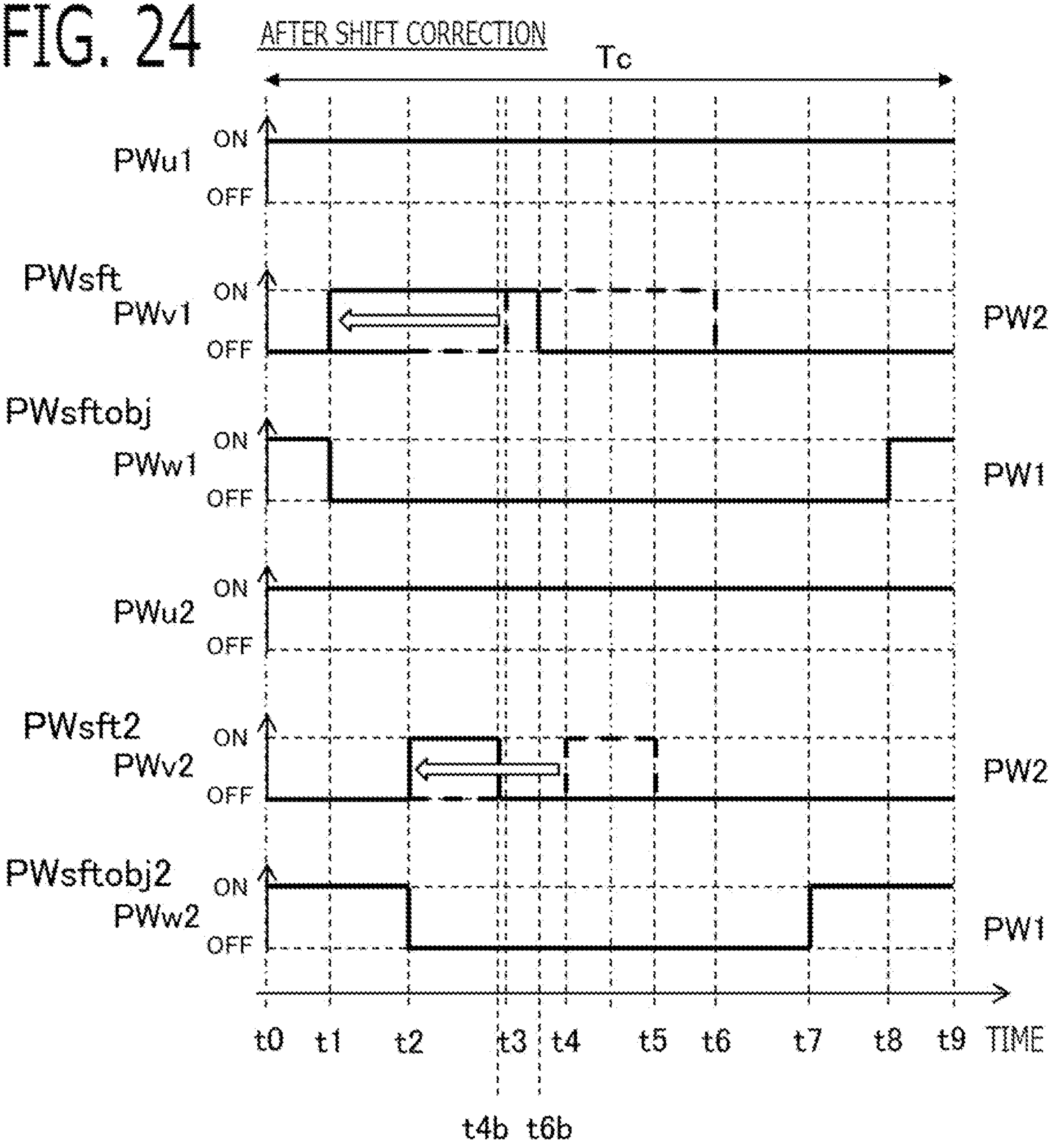
FIG. 24 is a time chart for explaining the pulse wave after the shift correction when the power-factor angle is 0 degree, according to Embodiment 1.

Alternatively, as shown in the example of FIG. 24, the second shift direction may be determined to the advance direction. Then, the pulse wave of W2 phase PWw2 which has, in the advance direction, the falling opposite to the rising on the advance direction side of the pulse wave of V2 phase PWv2, and has the falling different from the falling of the pulse wave of W1 phase PWw1 with which the pulse wave of V1 phase PWv1 is coincided, within the same PWM period Tc is determined as the pulse wave of the second subjected shift object PWsftobj2. Then, the pulse wave of V2 phase PWv2 is shifted in the advance direction so that the rising of the potential of the winding terminal by the pulse wave of V2 phase PWv2 coincides with the falling of the potential of the winding terminal by the pulse wave of W2 phase PWw2. Accordingly, the rising of the potential of the winding terminal by the pulse wave of V2 phase PWv2 and the falling of the potential of the winding terminal by the pulse wave of W2 phase PWw2 can be canceled. The pulse wave of the subjected shift object PWsftobj may be determined to the pulse wave of W2 phase PWw2, and the pulse wave of the second subjected shift object PWsftobj2 may be determined to the pulse wave of W1 phase PWw1.

<Second Example of Pulse Wave Before Shift Correction>

Figure 25:
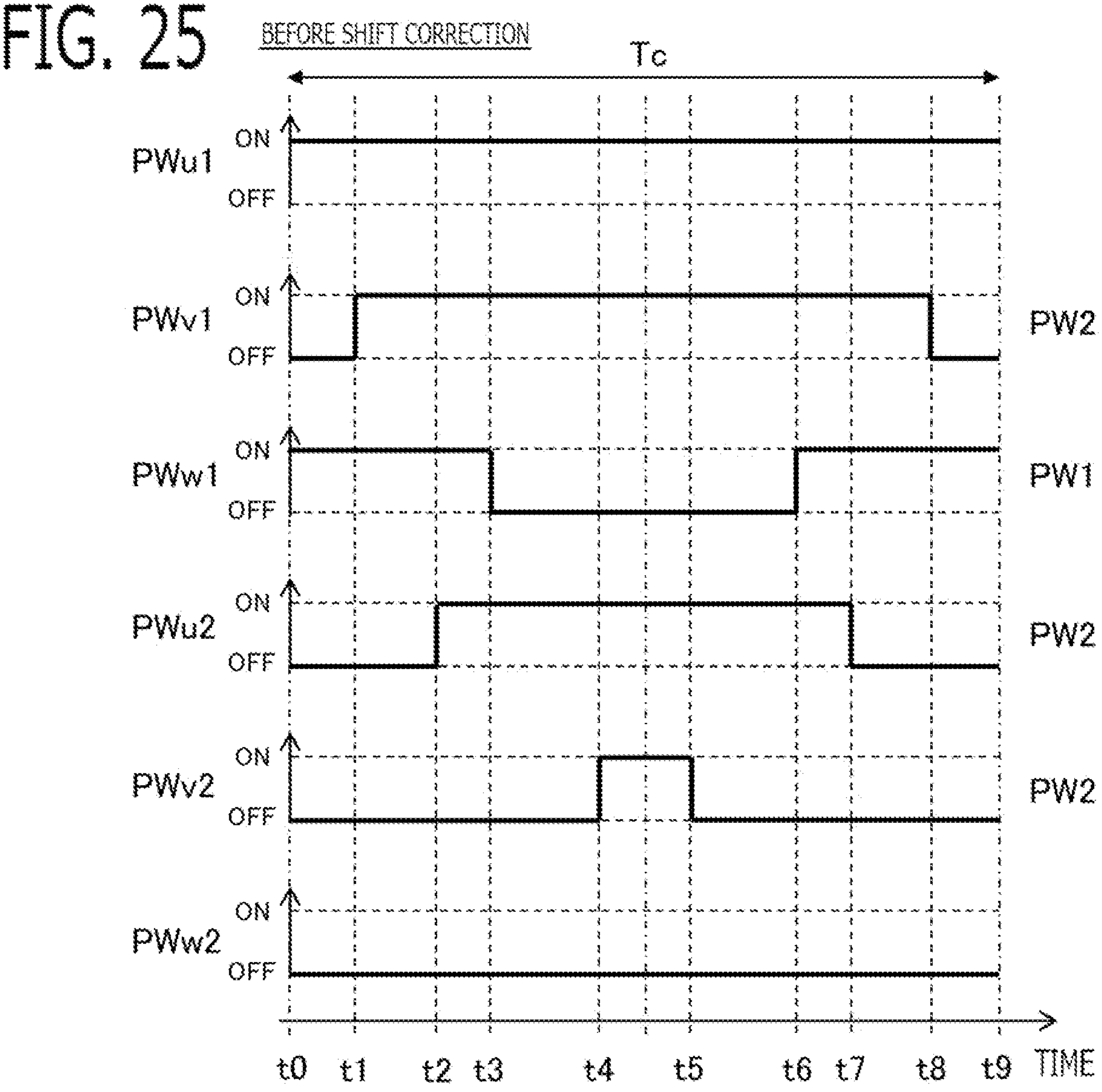
FIG. 25 is a time chart for explaining the pulse wave before the shift correction when the power-factor angle is 60 degrees, according to Embodiment 1.

FIG. 25 shows the pulse waves of three-phase of first set PWu1, PWv1, PWw1 before the shift correction and the pulse waves of three-phase of second set PWu2, PWv2, PWw2 before the shift correction at the timing B of FIG. 12 when the power-factor angle is 60 degrees. Herein, the pulse wave of U1 phase PWu1 and the pulse wave of W2 phase PWw2 are the pulse waves of the switching stop phases. In the first set, the phase of the maximum current absolute value coincides with the phase of the maximum voltage Vmax1, the pulse wave of W1 phase PWw1 is compared with the first carrier wave signal C1, and is the first comparison pulse wave PW1, and the pulse wave of V1 phase PWv1 is compared with the second carrier wave signal C2, and is the second comparison pulse wave PW2. On the other hand, in the second set, the phase of the maximum current absolute value coincides with the phase of the middle voltage Vmid2, and the pulse wave of U2 phase PWu2 and the pulse wave of V2 phase PWv2 are compared with the second carrier wave signal C2, and are the second comparison pulse waves PW2.

As the result, the bus current Iinv1+Iinv2 is −Iv1 in t0 to t1 and t8 to t9, is 0 in t1 to t2 and t7 to t8, is Iu2 in t2 to t3 and t6 to t7, is −Iw1+Iu2 in t3 to t4 and t5 to t6, and is −Iw1−Iw2 in t4 to t5. The voltage vector is V6_1 and V0_2 in t0 to t1 and t8 to t9, is V7_1 and V0_2 in t1 to t2 and t7 to t8, is V7_1 and V1_2 in t2 to t3 and t6 to t7, is V2_1 and V1_2 in t3 to t4 and t5 to t6, and is V2_1 and V2_2 in t4 to t5. Accordingly, although it is before the shift correction, the two voltage vectors are adjacent voltage vectors, or at least one of two voltage vectors is the zero voltage vector, and the current change can be suppressed, so the effect of reducing the phase current ripple can also be obtained.

<Second Example of Shift Correction>

Figure 26:
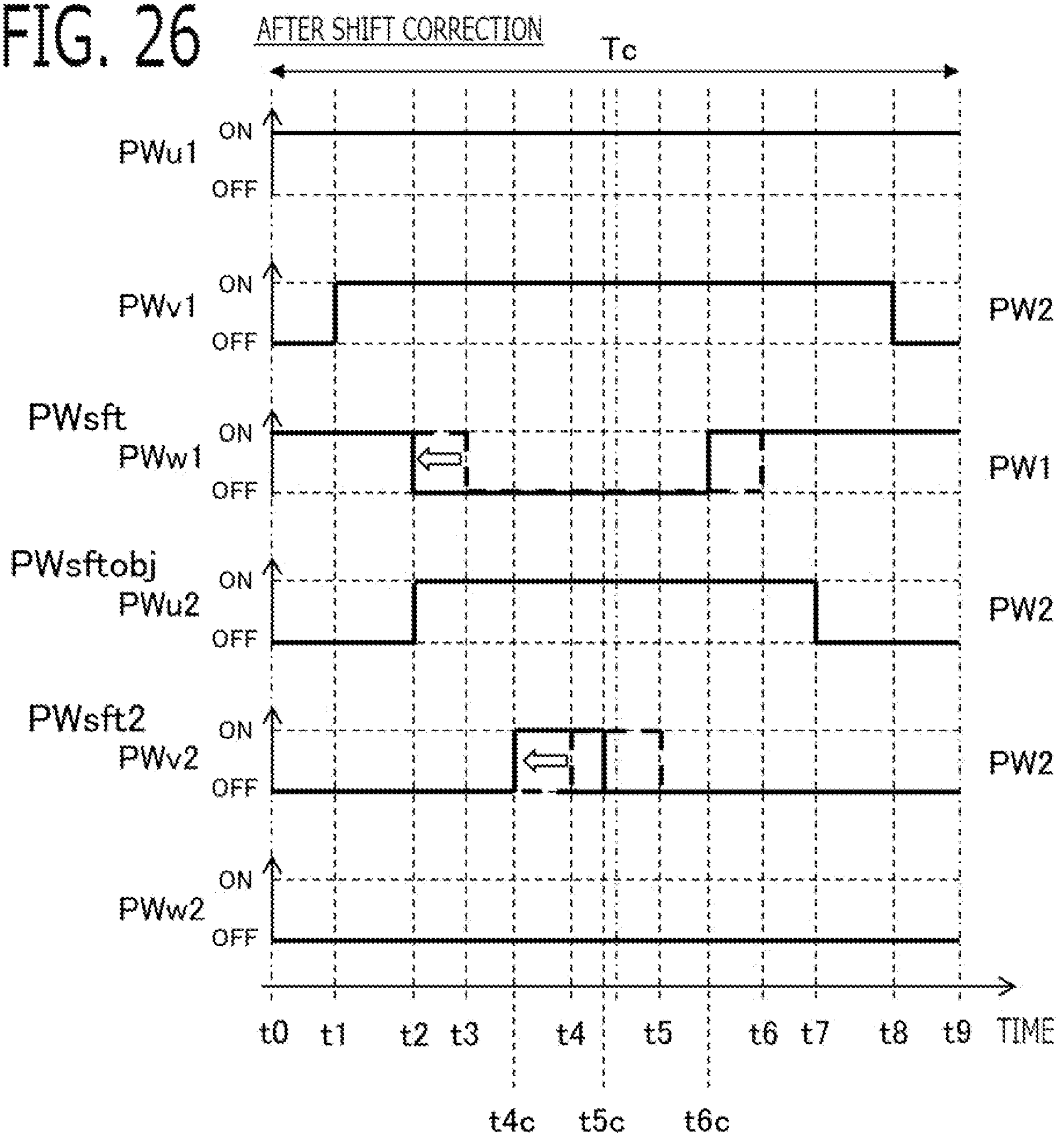
FIG. 26 is a time chart for explaining the pulse wave after the shift correction when the power-factor angle is 60 degrees, according to Embodiment 1.

As shown in FIG. 26, the PWM control unit 34 determines the pulse wave whose rising and falling are the second closest to the center of the PWM period Tc, as the pulse wave of the shift object PWsft to be shifted, and determines the shift direction to the advance direction or the delay direction. The PWM control unit 34 determines, as the pulse wave of the subjected shift object PWsftobj, other pulse wave which has, in the shift direction, rising or falling opposite to rising or falling on the shift direction side of the pulse wave of the shift object PWsft, within the same PWM period Tc; and shifts the pulse wave of the shift object PWsft in the shift direction so that rising or falling of potential of the winding terminal by the pulse wave of the shift object PWsft coincides with rising or falling of potential of the winding terminal by the pulse wave of the subjected shift object PWsftobj.

In an example of FIG. 26 corresponding to FIG. 25, the pulse wave of the shift object PWsft is the pulse wave of W1 phase PWw1 which is the first comparison pulse wave PW1, and the shift direction is determined to the advance direction. The pulse wave of the subjected shift object PWsftobj is determined to the pulse wave of U2 phase PWu2 which is the closest to the falling on the advance direction side of the pulse wave of W1 phase PWw1 among the second comparison pulse waves PW2 which have, in the advance direction, the rising opposite to the falling on the advance direction side of the pulse wave of W1 phase PWw1. The pulse wave of the subjected shift object PWsftobj may be determined to the pulse wave of V1 phase PWv1 which is the second closest. Then, the pulse wave of W1 phase PWw1 is shifted in the advance direction so that the falling of the potential of the winding terminal by the pulse wave of W1 phase PWw1 coincides with the rising of the potential of the winding terminal by the pulse wave of U2 phase PWu2. Accordingly, the falling of the potential of the winding terminal by the pulse wave of W1 phase PWw1 and the rising of the potential of the winding terminal by the pulse wave of U2 phase PWu2 can be canceled. Alternatively, the shift direction may be determined to the delay direction, and the pulse wave of W1 phase PWw1 may be shifted in the delay direction so that the rising of the potential of the winding terminal by the pulse wave of W1 phase PWv1 coincides with the falling of the potential of the winding terminal by the pulse wave of U2 phase PWu2.

In this case, the PWM control unit 34 sets a pair of the first comparison pulse wave PW1 and the second comparison pulse wave PW2 (a pair of the pulse wave of the shift object PWsft and the pulse wave of the subjected shift object PWsftobj) in which a shift amount in the advance direction or the delay direction of the pulse wave becomes the minimum.

<Shift of Pulse Wave of Second Shift Object>

A shift method of the pulse wave of the second shift object will be explained. The PWM control unit 34 determines the pulse wave whose rising and falling are the first closest to the center of the PWM period Tc, as the pulse wave of the second shift object PWsft2 to be shifted in the same direction as the pulse wave of the shift object PWsft; and shifts the pulse wave of the second shift object PWsft2 in the same direction as the pulse wave of the shift object PWsft so that rising and falling of the pulse wave of the second shift object PWsft2 after the shift are positioned between rising and falling of the pulse wave of the shift object PWsft after the shift.

In the example of FIG. 26, the pulse wave of the second shift object PWsft2 is the pulse wave of V2 phase PWv2 which is the second comparison pulse wave PW2. The pulse wave of V2 phase PWv2 is shifted in the advance direction so that the rising and the falling of the pulse wave of V2 phase PWv2 after the shift are positioned between the rising and the falling of the pulse wave of W1 phase PWw1 after the shift. In the example of FIG. 26, the PWM control unit 34 sets the shift amount of the pulse wave of the second shift object PWsft2 to the same shift amount as that of the pulse wave of the shift object PWsft. The shift amount of the second shift object can be set easily.

As the result, the bus current Iinv1+Iinv2 is −Iv1 in t0 to t1 and t8 to t9, is 0 in t1 to t2 and t7 to t8, is −Iw1+Iu2 in t2 to t4*c* and t5*c* to t6*c*, is −Iw1−Iw2 in t4*c* to t5*c*, and is Iu2 in t6*c* to t7. Due to the effect of shifting the rising timing of V2 phase similarly to the rising timing of W1 phase, the bus current Iinv1+Iinv2 changes in the timing, but does not change in the combination. Accordingly, the bus current Iinv1+Iinv2 changes in the timing, but does not change in the combination and the period of each combination. Accordingly, even if the shift correction is performed, similarly to before the shift correction, the bus current ripple can be reduced, and the capacitor current can be maintained equivalent to before the shift correction.

In this way, for each set of two sets, the PWM control unit 34 shifts the pulse waves in the advance direction or the delay direction so that types of on-off patterns of the switching devices of each phase which are set in the PWM period Tc and a set period of each type in the PWM period Tc become the same before and after the shift correction of the pulse waves.

The PWM control unit 34 shifts other pulse wave whose rising and falling exist between rising and falling of the pulse wave before the shift in the pulse wave to be shifted, in the same direction as the pulse wave to be shifted, within the same PWM period Tc.

<Other Example of Shift Correction>

Figure 27:
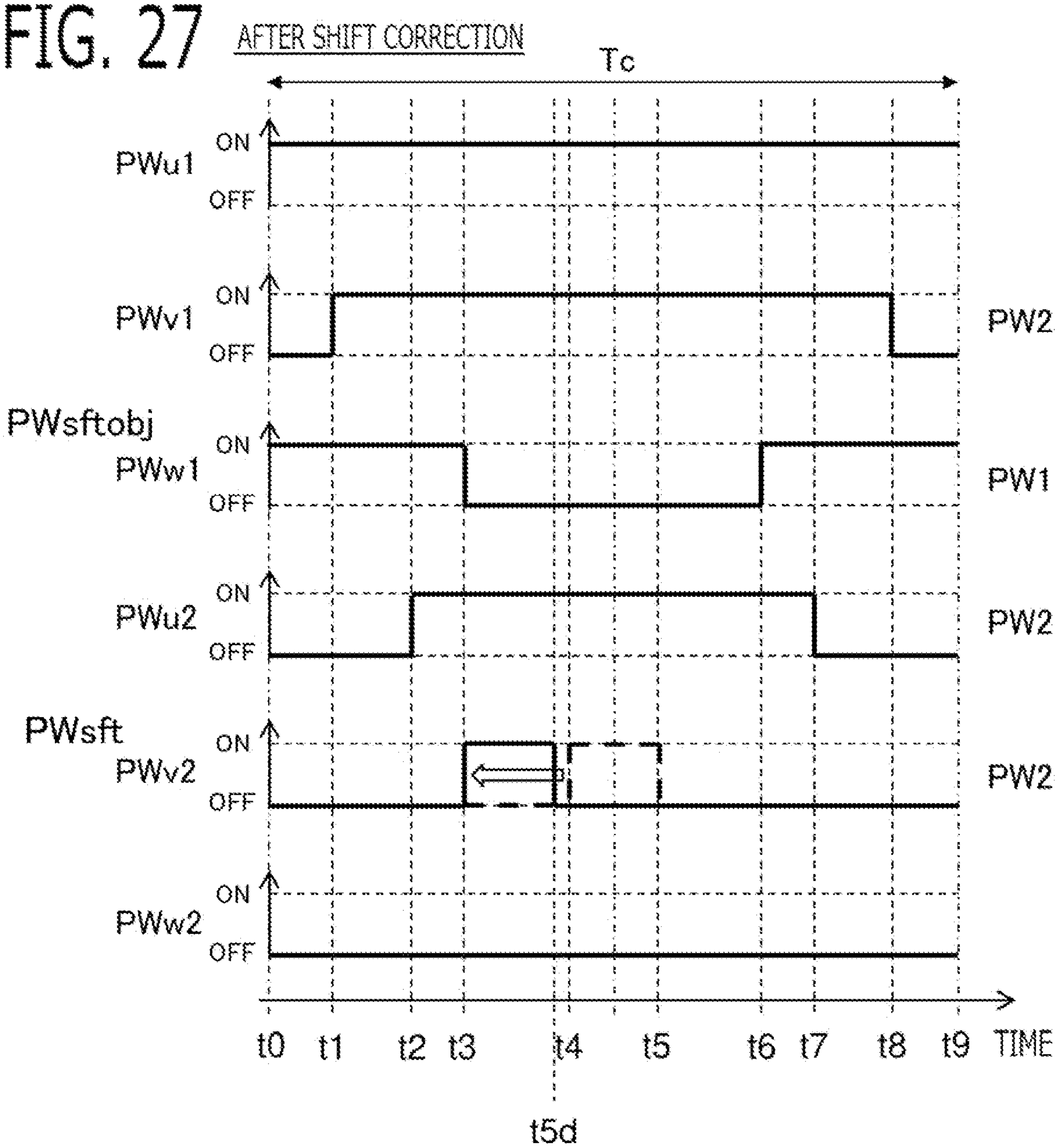
FIG. 27 is a time chart for explaining the pulse wave after the shift correction when the power-factor angle is 60 degrees, according to Embodiment 1.

Alternatively, as shown in FIG. 27, the PWM control unit 34 determines the pulse wave whose rising and falling are the first closest to the center of the PWM period Tc, as the pulse wave of a shift object PWsft to be shifted, and determines a shift direction to the advance direction or the delay direction. The PWM control unit 34 determines, as the pulse wave of the subjected shift object PWsftobj, other pulse wave which has, in the shift direction, rising or falling opposite to rising or falling on the shift direction side of the pulse wave of the shift object PWsft, within the same PWM period Tc; and shifts the pulse wave of the shift object PWsft in the shift direction so that rising or falling of potential of the winding terminal by the pulse wave of the shift object PWsft coincides with rising or falling of potential of the winding terminal by the pulse wave of the subjected shift object PWsftobj.

In an example of FIG. 27 corresponding to FIG. 25, the pulse wave of the shift object PWsft is the pulse wave of V2 phase PWv2 which is the second comparison pulse wave PW2, and the shift direction is determined to the advance direction. The pulse wave of the subjected shift object PWsftobj is determined to the pulse wave of W1 phase PWw1 which is the first comparison pulse wave PW1 which has, in the advance direction, the falling opposite to the rising on the advance direction side of the pulse wave of V2 phase PWv2. Then, the pulse wave of V2 phase PWv2 is shifted in the advance direction so that the rising of the potential of the winding terminal by the pulse wave of V2 phase PWv2 coincides with the falling of the potential of the winding terminal by the pulse wave of W1 phase PWw1. Accordingly, the rising of the potential of the winding terminal by the pulse wave of V2 phase PWv2 and the falling of the potential of the winding terminal by the pulse wave of W1 phase PWw1 can be canceled. Alternatively, the shift direction may be determined to the delay direction, and the pulse wave of V2 phase PWv2 may be shifted in the delay direction so that the falling of the potential of the winding terminal by the pulse wave of V2 phase PWv2 coincides with the rising of the potential of the winding terminal by the pulse wave of W1 phase PWw1.

Also in this case, the bus current Iinv1+Iinv2 changes in the timing, but does not change in the combination and the period of each combination. Accordingly, even if the shift correction is performed, similarly to before the shift correction, the bus current ripple can be reduced, and the capacitor current can be maintained equivalent to before the shift correction.

When the power-factor angle is 60 degrees, in the interval of 0 to 30 degrees of the phase θi1 of the current vector of first set, as shown in FIG. 11, the carrier wave signal of U1 phase and W1 phase is the first carrier wave signal C1, and as shown in FIG. 19, V2 phase is the second carrier wave signal C2, and W2 phase is the first carrier wave signal C1. In the interval of 30 to 60 degrees of the phase θi1 of the current vector of first set, as shown in FIG. 11, the carrier wave signal of U1 phase is the first carrier wave signal C1, and the carrier wave signal of V1 phase is the second carrier wave signal C2, and as shown in FIG. 19, U2 phase and W2 phase are the first carrier wave signal C1. Accordingly, in one set, the phase of the maximum current absolute value coincides with the phase of the middle voltage, and the carrier wave signals of two phases other than the switching stop phase is set to one of the first carrier wave signal C1 and the second carrier wave signal C2. Even in this case, in the other set, the phase of maximum current absolute value coincides with the phase of the maximum voltage or the minimum voltage, the carrier wave signals of two phases other than the switching stop phase is set to the first carrier wave signal C1 and the second carrier wave signal C2. Accordingly, even when the power-factor angle is large, in two sets, out of the voltage command values of four phases other than the switching stop phases, at least one voltage command value is compared with the first carrier wave signal C1, and at least one voltage command value is compared with the second carrier wave signal C2. This is because the phase difference (in this example, 30 degrees) is provided between the three-phase windings of first set and the three-phase windings of second set.

Since at least one first carrier wave signal C1 and at least one second carrier wave signal C2 are used, at least one pair of the first comparison pulse wave PW1 and the second comparison pulse wave PW2 is set within the same PWM period Tc, and these can be mutually canceled by the shift correction.

For each set, when the power-factor angle is operated around −30 degrees to 30 degrees, a frequency that the phase of the maximum current absolute value coincides with the phase of the middle voltage is small. Accordingly, even when the phase of the maximum current absolute value coincides with the phase of the middle voltage, the carrier wave signals of two phases other than the switching stop phase may be set to the first carrier wave signal C1 and the second carrier wave signal C2.

Even if the carrier wave signal and the voltage command value are not actually compared, the on-off timing of each pulse wave in the PWM period Tc can be calculated by using well-known calculation methods, based on the geometrical relation between the waveform of the carrier wave signal, and the voltage command value. Accordingly, at the start time point of the PWM period Tc, the PWM control unit 34 calculates the on timing and the off timing of the pulse wave of each phase before the shift correction on the basis of the start time point of the PWM period Tc, based on the geometrical relation between the waveform of the first carrier wave signal C1 or the second carrier wave signal C2, and the voltage command value of each phase. Then, at the start time point of the PWM period Tc, the PWM control unit 34 determines the pulse wave to which the shift correction is performed, and the shift amount, as mentioned above, based on the on-off timing of the pulse wave of each phase; and calculates the on timing and the off timing of the pulse wave of each phase after the shift correction. Then, the PWM control unit 34 sets the on timing and the off timing of the switching signal of each switching device, based on the on timing and the off timing of the pulse wave of each phase after the shift correction. Then, the PWM control unit 34 generates the switching signal of each switching device based on the on-off timing of the switching signal of each switching device by the timer processing on the basis of the start time point of the PWM period Tc.

1-4. AC Rotary Machine for Vehicle

Figure 28:
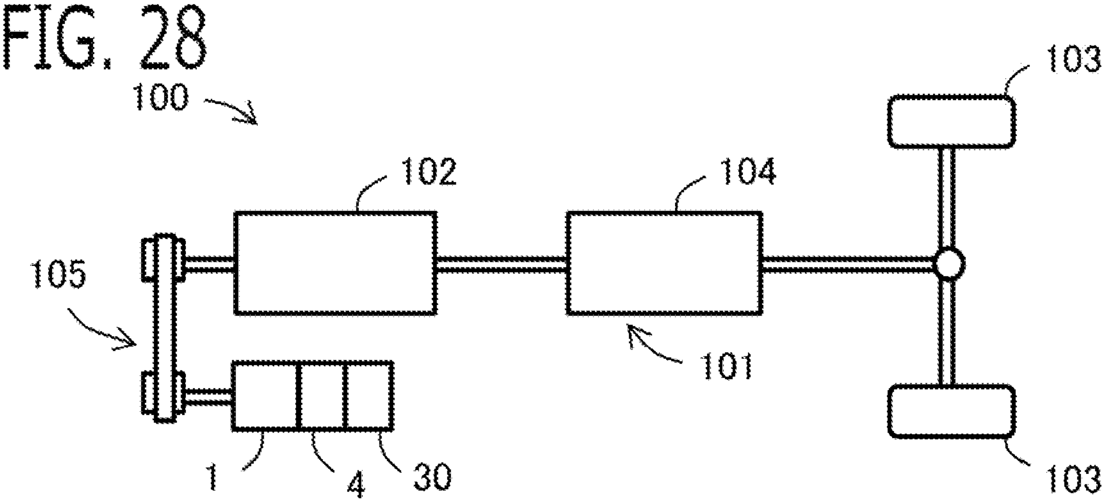
FIG. 28 is a schematic configuration diagram of the vehicle driving apparatus, according to Embodiment 1.

Although an application of the AC rotary machine 1 according to the present embodiment is not limited in particular, a case where the AC rotary machine 1 is used as an AC rotary machine for vehicle will be explained, for example. A vehicle driving apparatus 100 is provided with the AC rotary machine controller 30, the AC rotary machine 1, and a driving force transmission mechanism 101 that transmits a driving force of the AC rotary machine 1 to wheels 103 of a vehicle. As shown in FIG. 28, the vehicle driving apparatus 100 is provided with an internal combustion engine 102, and the AC rotary machine 1 is connected with a crankshaft of the internal combustion engine 102 via a pulley and belt mechanism 105. The rotation axis of the AC rotary machine 1 is connected with the wheels 103 via the internal combustion engine 102 and a transmission 104. The AC rotary machine 1 functions as a motor, becomes a driving force source of the wheels 103 as an auxiliary machine of the internal combustion engine 102, and functions as a generator and generates electricity utilizing rotation of the internal combustion engine 102. The AC rotary machine 1 may be provided between the internal combustion engine 102 and the transmission 104, and may be provided within the transmission 104. The internal combustion engine 102 may not be provided.

Since the rotation of the internal combustion engine 102 and the AC rotary machine 1 becomes in one direction, the rotation in the other direction shown in FIG. 17 need not be considered. For each set, by performing the flat-top two-phase modulation or the flat-bottom two-phase modulation, the bus current ripple can be reduced and the capacitor current can be reduced; and by performing the shift correction of the pulse wave, the leakage current can be reduced and the electromagnetic noise can be reduced.

1-5. Electric Power Steering Apparatus

Figure 29:
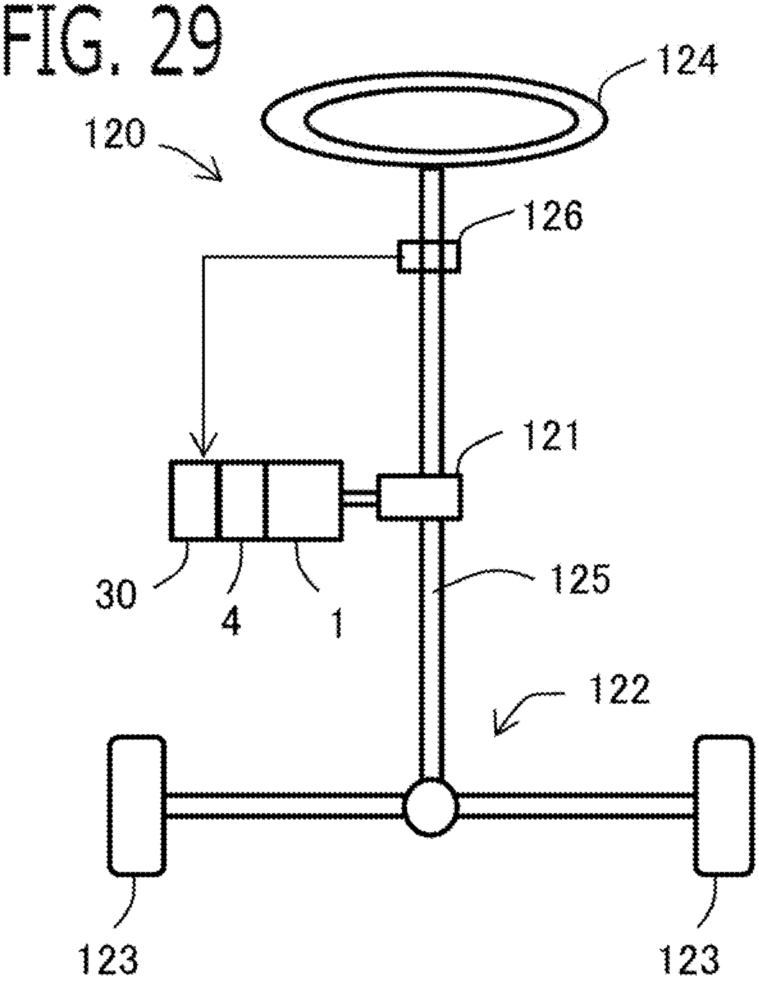
FIG. 29 is a schematic configuration diagram of the electric power steering apparatus, according to Embodiment 1.

Next, a case where the AC rotary machine 1 is used as a driving force source of the electric power steering apparatus 120 will be explained. The electric power steering apparatus 120 is provided with the AC rotary machine controller 30, the AC rotary machine 1, and a driving force transmission mechanism 121 which transmits the driving force of the AC rotary machine 1 to a steering apparatus of a vehicle. As shown in FIG. 29, the rotation axis of the of the AC rotary machine 1 is connected with a steering apparatus 122 of the wheels via the driving force transmission mechanism 121. For example, the electric power steering apparatus 120 is provided with a handle 124 that a driver rotates right and left, a shaft 125 that is connected with the handle 124 and transmits a steering wheel torque by the handle 124 to the steering apparatus 122 of the wheels 123, a torque sensor 126 that is mounted on the shaft 125 and detects a steering torque by the handle 124, and a driving force transmission mechanisms 121, such as a worm gear mechanism, which connects the rotation axis of the AC rotary machine 1 with the shaft 125. An output signal of the torque sensor 126 is inputted into the controller 30. The controller 30 calculates a torque command value or a current command value, based on the steering torque detected by the torque sensor 126, and calculates the basic voltage command values of three-phase, based on the torque command value or the current command value. The electric power steering apparatus 120 may be a so-called steer by wire system.

Since the AC rotary machine 1 rotates to one direction or the other direction, processing of FIG. 16 and FIG. 17 is used. For each set, by performing the flat-top two-phase modulation or the flat-bottom two-phase modulation, the bus current ripple can be reduced and the capacitor current can be reduced; and by performing the shift correction of the pulse wave, the leakage current can be reduced and the electromagnetic noise can be reduced.

In the present embodiment, there has been explained the case where m is two, and two sets of three-phase windings are provided. However, m may be set to three or more. Also in this case, the voltage command calculation unit 33 executes the flat-top two-phase modulation or the flat-bottom two-phase modulation for each set. The PWM control unit 34 uses the first carrier wave signal C1 and the second carrier wave signal C2 as the carrier wave signal. The PWM control unit 34 generates at least one first comparison pulse wave PW1 by comparing the first carrier wave signal C1 with at least one the voltage command value, and generates at least one second comparison pulse wave PW2 by comparing the second carrier wave signal C2 with at least one other the voltage command value, out of the voltage command values of $m\times(n-1)$ not coinciding with the maximum value or the minimum value of the carrier wave signal in m sets. Within the same PWM period, the PWM control unit 34 sets at least one pair of the first comparison pulse wave PW1 and the second comparison pulse wave PW2. Within the same PWM period, the PWM control unit 34 shifts one or both of paired the first comparison pulse wave PW1 and the second comparison pulse wave PW2 in the advance direction or the delay direction so that the rising timing of one of the potential of the winding terminal applied by the paired first comparison pulse wave PW1 and the potential of the winding terminal applied by the paired second comparison pulse wave PW2 coincides with the falling timing of the other.

2. Embodiment 2

The controller 30 according to Embodiment 2 will be explained with reference to drawings. The explanation for constituent parts the same as those in Embodiment 1 will be omitted. The basic configuration of the AC rotary machine 1, the inverter 4, and the controller 30 according to the present embodiment is the same as that of Embodiment 1. However, the present embodiment is different from Embodiment 1 in the performing method of the flat-top two-phase modulation and the flat-bottom two-phase modulation of each set and the setting method of the first carrier wave signal C1 and the second carrier wave signal C2.

Figure 30:
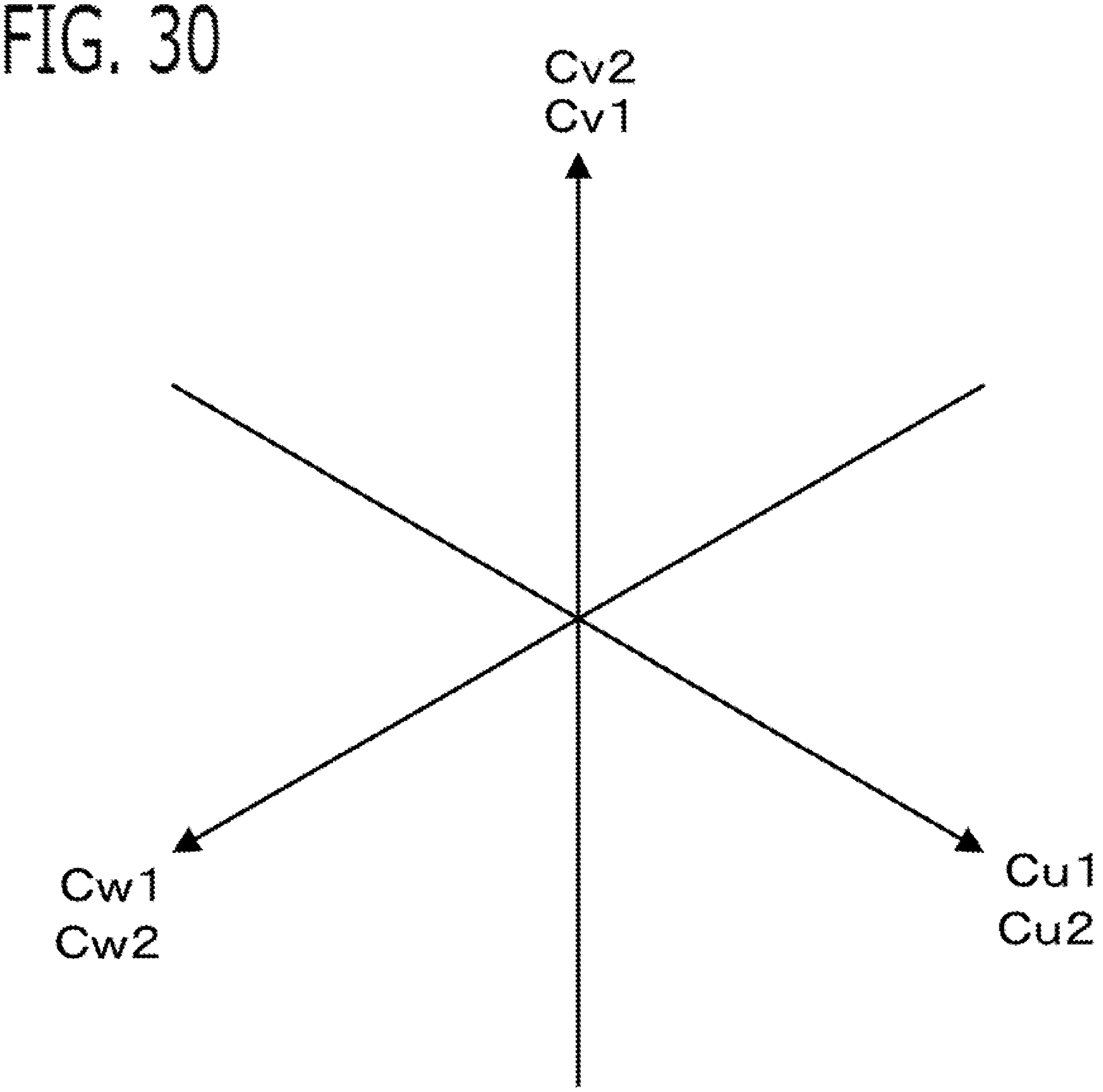
FIG. 30 is a figure for explaining the phase difference between the windings of first set and the windings of second set, according to Embodiment 2.

In the present embodiment, as FIG. 30 shows a schematic diagram, the phase difference is not provided between the three-phase windings of first set Cu1, Cv1, Cw1, and the three-phase windings of second set Cu2, Cv2 and Cw2. The phase difference may be other phase difference.

<Voltage Command Calculation Unit 33>

In the present embodiment, the voltage command calculation unit 33 executes the same flat-top two-phase modulation for each set of two sets, or executes the same flat-bottom two-phase modulation for each set of two sets.

Figure 31:
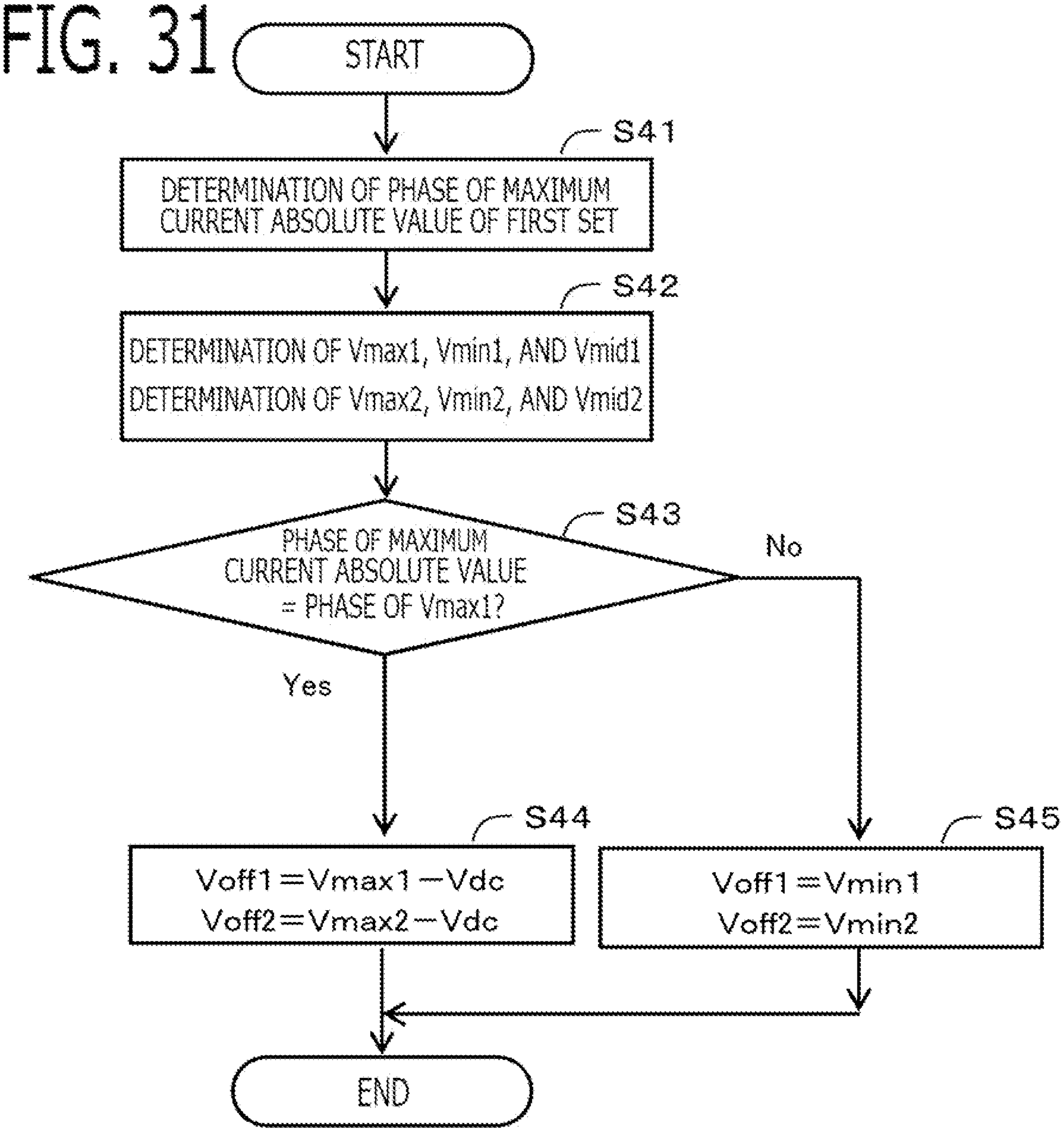
FIG. 31 is a flowchart for explaining the flat-top two-phase modulation and the flat-bottom two-phase modulation of first set and second set, according to Embodiment 2.

For example, the processing is configured like the flowchart of FIG. 31. In the step S41, the modulation unit 33*b* determines the maximum current absolute value of first set Iabsmax1 which is the maximum value of the absolute values of the winding currents of three-phase of first set, based on the detection values of three-phase currents of first set Ius1, Ivs1, Iws1; and determines the phase of the maximum current absolute value of first set Iabsmax1. The modulation unit 33*b* may estimate winding currents of three-phase of first set based on the voltage command values of first set or the current command values of first set, and may use them for determination.

In the step S42, the modulation unit 33*b* determines the maximum voltage Vmax1, the minimum voltage Vmin1, and the middle voltage Vmid1 in the voltage command values of three-phase of first set. In the present embodiment, the modulation unit 33*b* determines the maximum voltage Vmax1, the minimum voltage Vmin1, and the middle voltage Vmid1 in the basic voltage command values of three-phase of first set Vub1, Vvb1, Vwb1. The modulation unit 33*b* determines the maximum voltage Vmax2, the minimum voltage Vmin2, and the middle voltage Vmid2 in the voltage command values of three-phase of second set. In the present embodiment, the modulation unit 33*b* determines the maximum voltage Vmax2, the minimum voltage Vmin2, and the middle voltage Vmid2 in the basic voltage command values of three-phase of second set Vub2, Vvb2, Vwb2.

In the step S43, the modulation unit 33*b* determines whether or not the phase of the maximum current absolute value of first set Iabsmax1 coincides with the phase of the maximum voltage of first set Vmax1. When it coincides, it advances to the step S44, and when it does not coincide, it advances to the step S45.

In the step S44, the modulation unit 33*b* executes the flat-top two-phase modulation that calculates the offset voltage of first set Voff1 which makes the voltage command value of the phase of the maximum voltage of first set Vmax1 coincide with the maximum value (in this example, Vdc) of the carrier wave signal (Voff1=Vmax1−Vdc), and calculates the voltage command values of three-phase of first set Vuo1, Vvo1, Vwo1 by subtracting the offset voltage of first set Voff1 from the basic voltage command values of three-phase of first set Vub1, Vvb1, Vwb1. And, the modulation unit 33*b* executes the flat-top two-phase modulation that calculates the offset voltage of second set Voff2 which makes the voltage command value of the phase of the maximum voltage of second set Vmax2 coincide with the maximum value (Vdc) of the carrier wave signal (Voff2=Vmax2−Vdc), and calculates the voltage command values of three-phase of second set Vuo2, Vvo2, Vwo2 by subtracting the offset voltage of second set Voff2 from the basic voltage command values of three-phase of second set Vub2, Vvb2, Vwb2.

On the other hand, in the step S45, the modulation unit 33*b* executes the flat-bottom two-phase modulation that calculates the offset voltage of first set Voff1 which makes the voltage command value of the phase of the minimum voltage of first set Vmin1 coincide with the minimum value (in this example, 0) of the carrier wave signal (Voff1=Vmin1), and calculates the voltage command values of three-phase of first set Vuo1, Vvo1, Vwo1 by subtracting the offset voltage of first set Voff1 from the basic voltage command values of three-phase of first set Vub1, Vvb1, Vwb1. And, the modulation unit 33*b* executes the flat-bottom two-phase modulation that calculates the offset voltage of second set Voff2 which makes the voltage command value of the phase of the minimum voltage of second set Vmin2 coincide with the minimum value (0) of the carrier wave signal (Voff2=Vmin2), and calculates the voltage command values of three-phase of second set Vuo2, Vvo2, Vwo2 by subtracting the offset voltage of second set Voff2 from the basic voltage command values of three-phase of second set Vub2, Vvb2, Vwb2.

In the step S41 to the step S43, the modulation unit 33*b* may determine the phase of the maximum current absolute value of second set Iabsmax2, and may determine whether or not the phase of the maximum current absolute value of second set Iabsmax2 coincides with the phase of the maximum voltage of second set Vmax2. Alternatively, in the step S43, the determination may be performed using a different condition. Alternatively, the determination of the step S43 may not be performed, and the step S44 or the step S45 may be executed continuously.

<PWM Control Unit 34>

In the present embodiment, the PWM control unit 34 compares the voltage command values of three-phase of first set Vuo1, Vvo1, Vwo1 with the first carrier wave signal C1, and compares the voltage command values of three-phase of second set Vuo2, Vvo2, Vwo2 with the second carrier wave signal C2. The first carrier wave signal C1 and the second carrier wave signal C2 may be replaced.

By generating the pulse waves using the carrier wave signals that differ in phase by 180 degrees between two sets, an overlap of the generation intervals of the effective voltage vectors between two sets can be reduced in the low modulation rate, and the overlap of the generation intervals of the effective voltage vectors between two sets can be increased in the high modulation rate. Accordingly, the bus current ripple and the capacitor current can be reduced.

According to the above configuration, while executing the flat-top two-phase modulation or the flat-bottom two-phase modulation for each set, for the first set, the carrier wave signals of two phases other than the switching stop phase are set to the first carrier wave signal C1, and for the second set, the carrier wave signals of two phases other than the switching stop phase are set to the second carrier wave signal C2. Accordingly, at least one pair of the first comparison pulse wave PW1 and the second comparison pulse wave PW2 can be set between two sets within the same PWM period Tc, and these can be mutually canceled by the shift correction.

When the power-factor angle is 0 degree, the setting of the flat-top two-phase modulation and the flat-bottom two-phase modulation of each set, and the setting of the first carrier wave signal C1 and the second carrier wave signal C2 of each set are shown in FIG. 32.

<Pulse Waves Before Shift Correction>

Figure 33:
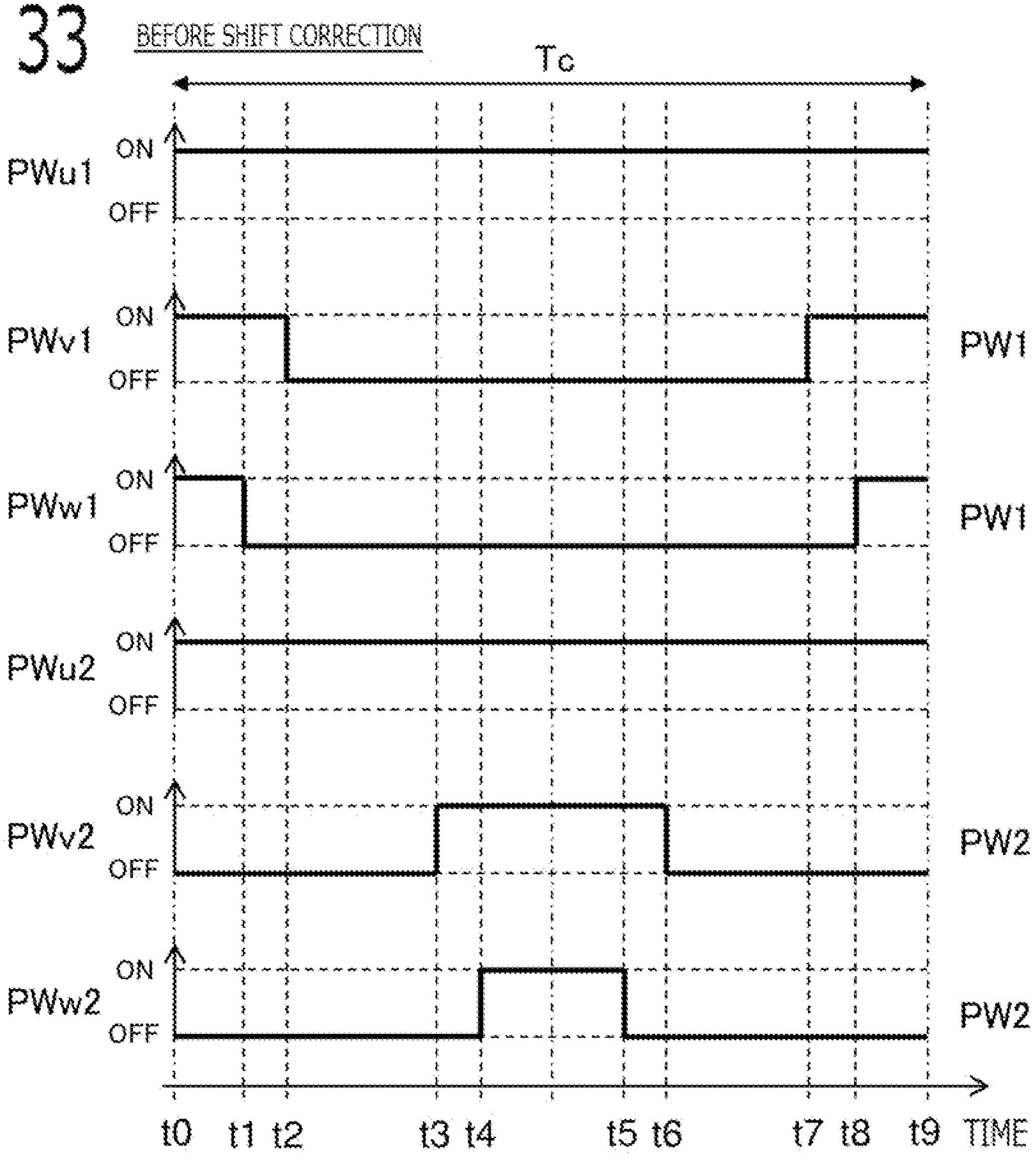
FIG. 33 is a time chart for explaining the pulse wave before the shift correction, according to Embodiment 2.

FIG. 33 shows a time chart showing the pulse waves of three-phase of each set before the shift correction according to the present embodiment at the same timing as the timing A of FIG. 9.

The bus current Iinv1+Iinv2 is −Iu2 in t0 to t1 and t8 to t9, is Iw1−Iu2 in t1 to t2 and t7 to t8, is Iu1+Iu2 in t2 to t3 and t6 to t7, is Iu1−Iw2 in t3 to t4 and t5 to t6, and is Iu1 in t4 to t5.

<Shift Correction>

Also in the present embodiment, the PWM control unit 34 sets at least one pair of the first comparison pulse wave PW1 compared with the first carrier wave signal C1 and the second comparison pulse wave PW2 compared with the second carrier wave signal C2 within the same PWM period Tc. Within the same PWM period Tc, the PWM control unit 34 shifts one or both of paired the first comparison pulse wave PW1 and the second comparison pulse wave PW2 in the advance direction or the delay direction so that the rising timing of one of the potential of the winding terminal applied by the paired first comparison pulse wave PW1 and the potential of the winding terminal applied by the paired second comparison pulse wave PW2 coincides with the falling timing of the other.

Also in the present embodiment, the shift correction similar to each example explained in Embodiment 1 is performed, but some examples are explained below.

Figure 34:
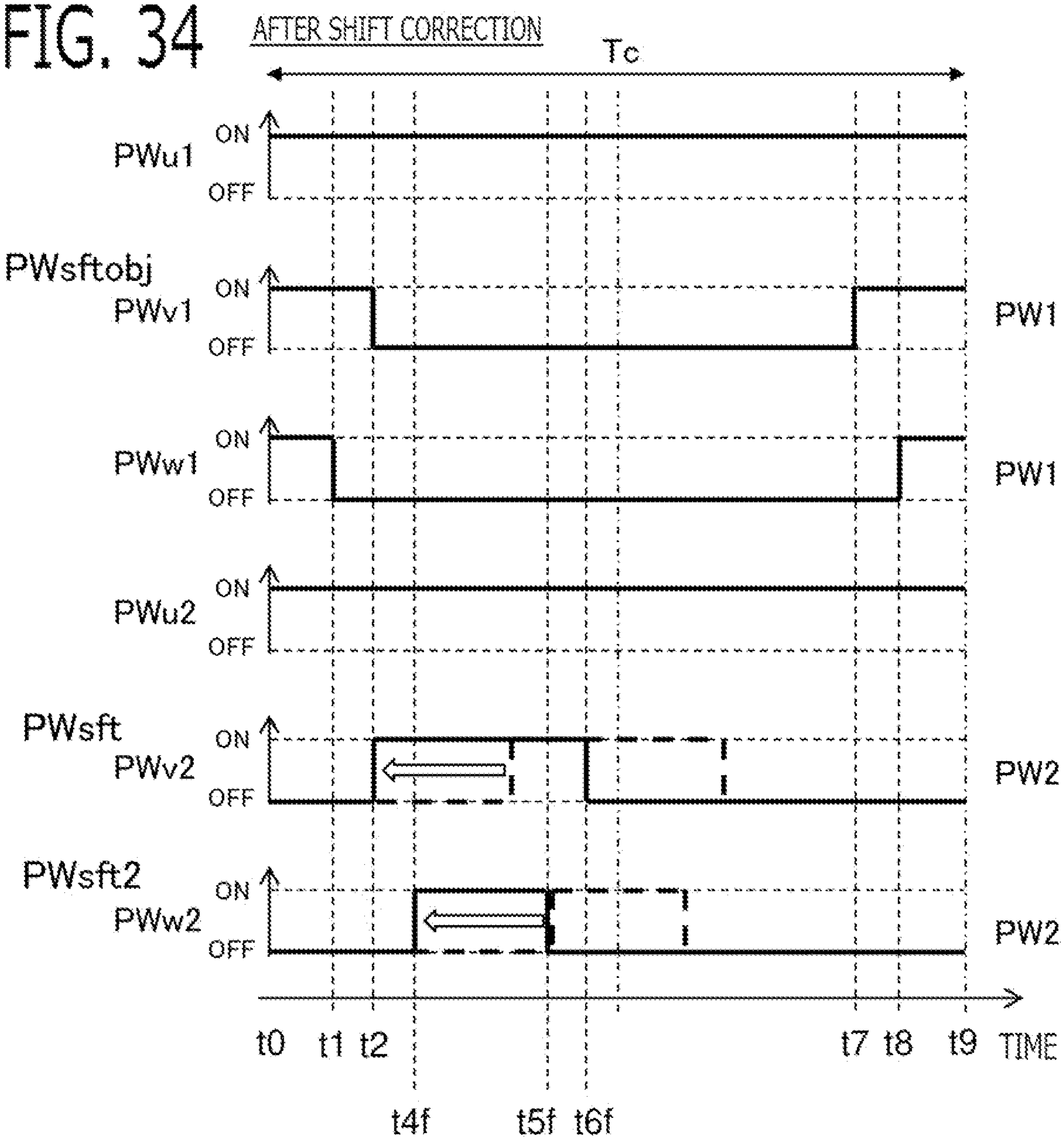
FIG. 34 is a time chart for explaining the pulse wave after the shift correction, according to Embodiment 2.

As shown in FIG. 34, the PWM control unit 34 determines the pulse wave whose rising and falling are the second closest to the center of the PWM period Tc, as the pulse wave of the shift object PWsft to be shifted, and determines the shift direction to the advance direction or the delay direction. The PWM control unit 34 determines, as the pulse wave of the subjected shift object PWsftobj, other pulse wave which has, in the shift direction, rising or falling opposite to rising or falling on the shift direction side of the pulse wave of the shift object PWsft, within the same PWM period Tc; and shifts the pulse wave of the shift object PWsft in the shift direction so that rising or falling of potential of the winding terminal by the pulse wave of the shift object PWsft coincides with rising or falling of potential of the winding terminal by the pulse wave of the subjected shift object PWsftobj.

In the example of FIG. 34 corresponding to FIG. 33, the pulse wave of the shift object PWsft is the pulse wave of V2 phase PWv2 which is the second comparison pulse wave PW2, and the shift direction is determined to the advance direction. The pulse wave of the subjected shift object PWsftobj is determined to the pulse wave of V1 phase PWv1 which is the closest to the rising on the advance direction side of the pulse wave of V2 phase PWv2 among the first comparison pulse waves PW1 which have, in the advance direction, the falling opposite to the rising on the advance direction side of the pulse wave of V2 phase PWv2. The pulse wave of the subjected shift object PWsftobj may be determined to the pulse wave of W1 phase PWw1 which is the second closest. Then, the pulse wave of V2 phase PWv2 is shifted in the advance direction so that the rising of the potential of the winding terminal by the pulse wave of V2 phase PWv2 coincides with the falling of the potential of the winding terminal by the pulse wave of V1 phase PWv1. Accordingly, the rising of the potential of the winding terminal by the pulse wave of V2 phase PWv2 and the falling of the potential of the winding terminal by the pulse wave of V1 phase PWv1 can be canceled. Accordingly, the rising and the falling of one pair are canceled. Therefore, the number of rising or falling timings can be reduced to six, the leakage current can be suppressed by reducing the number, and the electromagnetic noise can be reduced.

Alternatively, the shift direction may be determined to the delay direction, and the pulse wave of V2 phase PWv2 may be shifted in the delay direction so that the falling of the potential of the winding terminal by the pulse wave of V2 phase PWv2 coincides with the rising of the potential of the winding terminal by the pulse wave of V1 phase PWv1 or the pulse wave of W1 phase PWw1.

In the case of FIG. 34, the PWM control unit 34 sets the pair of the first comparison pulse wave PW1 and the second comparison pulse wave PW2 (the pair of the pulse wave of the shift object PWsft and the pulse wave of the subjected shift object PWsftobj) in which the shift amount in the advance direction or the delay direction of the pulse wave becomes the minimum.

<Shift of Pulse Wave of Second Shift Object>

A shift method of the pulse wave of the second shift object will be explained. The PWM control unit 34 determines the pulse wave whose rising and falling are the first closest to the center of the PWM period Tc, as the pulse wave of the second shift object PWsft2 to be shifted in the same direction as the pulse wave of the shift object PWsft; and shifts the pulse wave of the second shift object PWsft2 in the same direction as the pulse wave of the shift object PWsft so that rising and falling of the pulse wave of the second shift object PWsft2 after the shift are positioned between rising and falling of the pulse wave of the shift object PWsft after the shift.

In the example of FIG. 34, the pulse wave of the second shift object PWsft2 is the pulse wave of W2 phase PWw2 which is the second comparison pulse wave PW2. The pulse wave of W2 phase PWw2 is shifted in the advance direction so that the rising and the falling of the pulse wave of W2 phase PWw2 after the shift are positioned between the rising and the falling of the pulse wave of V2 phase PWv2 after the shift.

As the result, in the example of FIG. 34, the bus current Iinv1+Iinv2 is −Iu2 in t0 to t1 and t8 to t9, is Iw1−Iu2 in t1 to t2 and t7 to t8, is Iu1−Iw2 in t2 to t4*f* and t5*f* to t6*f*, is Iu1 in t4*f* to t5*f*, and is Iu1+Iu2 in t6*f* to t7. Accordingly, the bus current Iinv1+Iinv2 changes in the timing, but does not change in the combination and the period of each combination. Accordingly, even if the shift correction is performed, similarly to before the shift correction, the bus current ripple can be reduced, and the capacitor current can be maintained equivalent to before the shift correction.

In the example of FIG. 34, the PWM control unit 34 sets the shift amount of the pulse wave of the second shift object PWsft2 to the same shift amount as that of the pulse wave of the shift object PWsft.

In this way, for each set of two sets, the PWM control unit 34 shifts the pulse waves in the advance direction or the delay direction so that types of on-off patterns of the switching devices of each phase which are set in the PWM period Tc and the set period of each type in the PWM period Tc become the same before and after the shift correction of the pulse waves.

The PWM control unit 34 shifts other pulse wave whose rising and falling exist between rising and falling of the pulse wave before the shift in the pulse wave to be shifted, in the same direction as the pulse wave to be shifted, within the same PWM period Tc.

<Other Shift Method of Pulse Wave of Second Shift Object>

Figure 35:
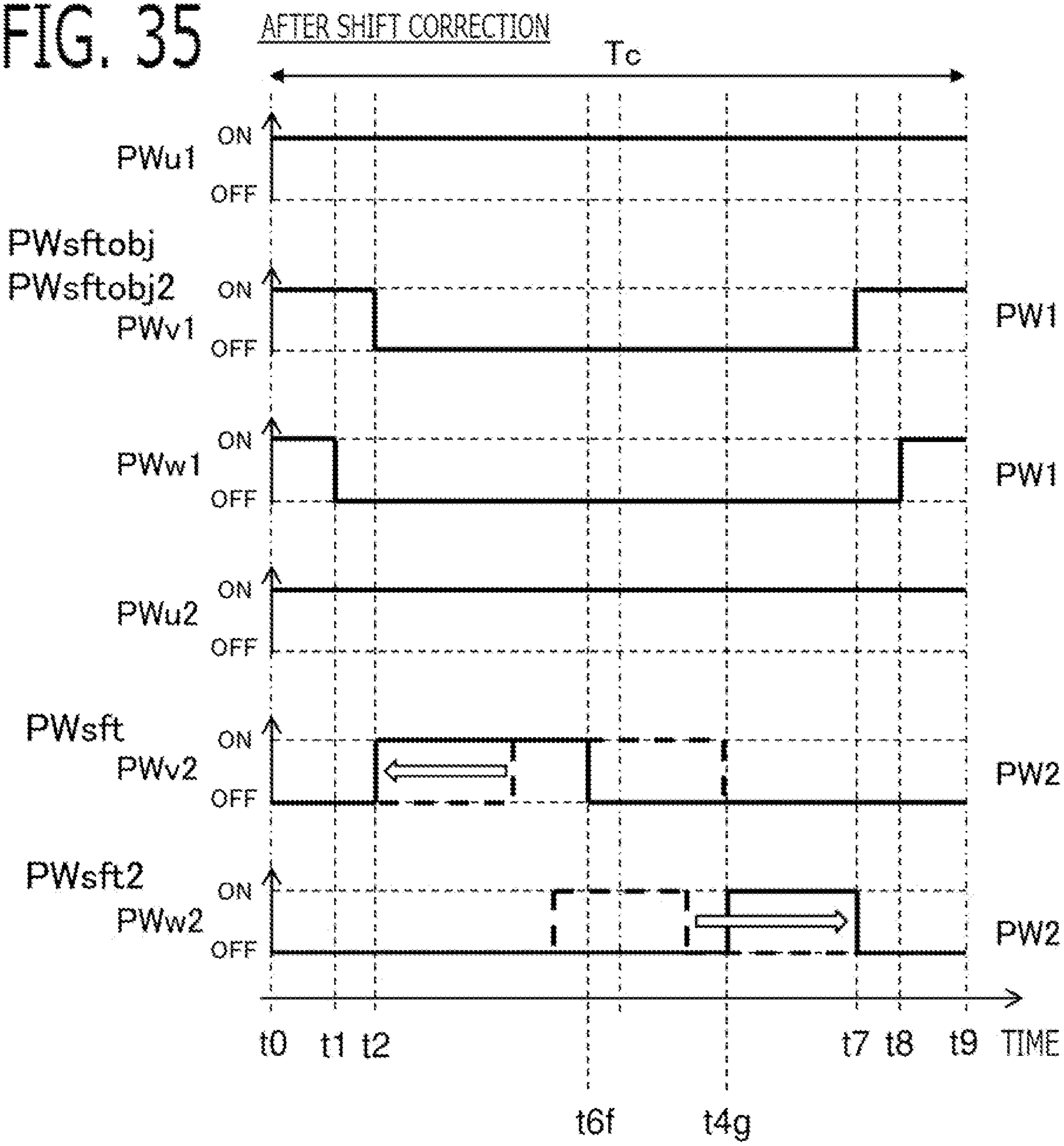
FIG. 35 is a time chart for explaining the pulse wave after the shift correction, according to Embodiment 2.

Other shift method of the pulse wave of the second shift object will be explained. As shown in FIG. 35, the PWM control unit 34 determines the pulse wave whose rising and falling are the first closest to the center of the PWM period Tc, as the pulse wave of the second shift object PWsft2; and determines the second shift direction of the pulse wave of the second shift object PWsft2 to the advance direction or the delay direction. The PWM control unit 34 determines, as the pulse wave of the second subjected shift object PWsftobj2, other pulse wave which has, in the second shift direction, rising or falling opposite to rising or falling on the second shift direction side of the pulse wave of the second shift object PWsft2, and has rising or falling different from rising or falling of the pulse wave of the subjected shift object PWsftobj with which the pulse wave of the shift object PWsft is coincided, within the same PWM period Tc. Then, the PWM control unit 34 shifts the pulse wave of the second shift object PWsft2 in the second shift direction so that rising or falling of potential of the winding terminal by the pulse wave of the second shift object PWsft2 coincides with rising or falling of the potential of the winding terminal by the pulse wave of the second subjected shift object PWsftobj2.

In the example of FIG. 35, the pulse wave of the second shift object PWsft2 is the pulse wave of W2 phase PWw2 which is the second comparison pulse wave PW2. The second shift direction is determined to the delay direction. Then, the pulse wave of V1 phase PWv1 which has, in the delay direction, the rising opposite to the falling on the delay direction side of the pulse wave of W2 phase PWw2, and has the rising different from the falling of the pulse wave of V1 phase PWv1 with which the pulse wave of V2 phase PWv2 is coincided, within the same PWM period Tc is determined as the pulse wave of the second subjected shift object PWsftobj2. The pulse wave of W1 phase PWw1 may be determined as the pulse wave of the second subjected shift object PWsftobj2. Then, the pulse wave of W2 phase PWw2 is shifted in the delay direction so that the falling of the potential of the winding terminal by the pulse wave of W2 phase PWw2 coincides with the rising of the potential of the winding terminal by the pulse wave of V1 phase PWv1. Accordingly, the falling of the potential of the winding terminal by the pulse wave of W2 phase PWw2 and the rising of the potential of the winding terminal by the pulse wave of V1 phase PWv1 can be canceled. Accordingly, by performing the shift corrections of two pairs, two pairs of risings and fallings are canceled. Accordingly, the number of rising or falling timings can be reduced to four, the leakage current can be suppressed by reducing the number, and the electromagnetic noise can be reduced.

Alternatively, the second shift direction may be determined to the advance direction. Then, the pulse wave of W1 phase PWw1 which has, in the advance direction, the falling opposite to the rising on the advance direction side of the pulse wave of W2 phase PWw2, and has the falling different from the falling of the pulse wave of V1 phase PWv1 with which the pulse wave of V2 phase PWv2 is coincided, within the same PWM period Tc may be determined as the pulse wave of the second subjected shift object PWsftobj2. Then, the pulse wave of W2 phase PWw2 may be shifted in the advance direction so that the rising of the potential of the winding terminal by the pulse wave of W2 phase PWw2 coincides with the falling of the potential of the winding terminal by the pulse wave of W1 phase PWw1. The pulse wave of the subjected shift object PWsftobj may be determined as the pulse wave of W1 phase PWw1, and the pulse wave of the second subjected shift object PWsftobj2 may be determined as the pulse wave of V1 phase PWv1.

3. Embodiment 3

The controller 30 according to Embodiment 3 will be explained with reference to drawings. The explanation for constituent parts the same as those in Embodiment 1 will be omitted. The basic configuration of the AC rotary machine 1, the inverter 4, and the controller 30 according to the present embodiment is the same as that of Embodiment 1. However, in the present embodiment, m is set to 1, and one set of three-phase windings and the inverter are provided. Accordingly, the method of shift correction is different from Embodiment 1.

Figure 36:
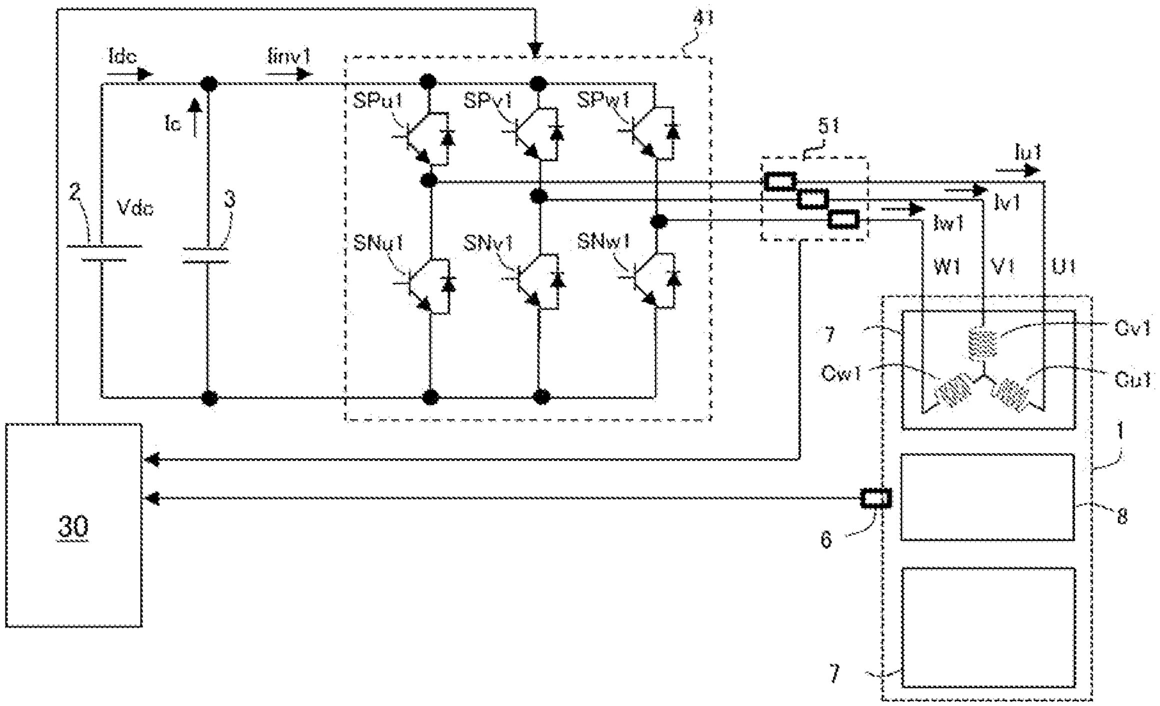
FIG. 36 is a schematic configuration diagram of the AC rotary machine, the inverter, and the controller, according to Embodiment 3.

As shown in FIG. 36, in the present embodiment, the one stator 7 is provided with the three-phase windings of first set Cu1, Cv1, Cw1, but the three-phase windings of second set is not provided unlike Embodiment 1. The inverter of first set 41 for the three-phase windings of first set is provided, but the inverter of second set for the three-phase windings of second set is not provided unlike Embodiment 1.

Similarly to the first set of Embodiment 1, the voltage command calculation unit 33 calculates the basic voltage command values of three-phase of first set Vub1, Vvb1, Vwb1; executes the flat-top two-phase modulation that calculates the offset voltage of first set Voff1 which makes the voltage command value of the phase of the maximum voltage of first set Vmax1 in the voltage command values of three-phase of first set coincide with the maximum value (Vdc) of the carrier wave signal, and calculates the voltage command values of three-phase of first set Vuo1, Vvo1, Vwo1 by subtracting the offset voltage of first set Voff1 from the basic voltage command values of three-phase of first set Vub1, Vvb1, Vwb1, or the flat-bottom two-phase modulation that calculates the offset voltage of first set Voff1 which makes the voltage command value of the phase of the minimum voltage of first set Vmin1 in the voltage command values of three-phase of first set coincide with the minimum value (0) of the carrier wave signal, and calculates the voltage command values of three-phase of first set Vuo1, Vvo1, Vwo1 by subtracting the offset voltage of first set Voff1 from the basic voltage command values of three-phase of first set Vub1, Vvb1, Vwb1. Since the processing similar to FIG. 5 of Embodiment 1 and the equation (1) is performed, explanation is omitted.

Similarly to the first set of Embodiment 1, when the phase of the maximum current absolute value of first set coincides with the phase of the maximum voltage Vmax1 or the minimum voltage Vmin1 in the voltage command values of three-phase of first set, in two phases other than the phase of the maximum voltage Vmax1 at the execution time of the flat-top two-phase modulation (the phase of the minimum voltage Vmin1, the phase of the middle voltage Vmid1), or two phases other than the phase of the minimum voltage Vmin1 at the execution time of the flat-bottom two-phase modulation (the phase of the maximum voltage Vmax1, the phase of the middle voltage Vmid1), the PWM control unit 34 generates the first comparison pulse wave PW1 by comparing the voltage command value of one phase with the first carrier wave signal C1, and generates the second comparison pulse wave PW2 by comparing the voltage command value of the other phase with the second carrier wave signal C2. When the phase of the maximum current absolute value of first set coincides with the phase of the middle voltage Vmid1 in the voltage command values of three-phase of first set, the PWM control unit 34 compares the voltage command values of two phases other than the phase of the maximum voltage Vmax1 at the execution time of the flat-top two-phase modulation, or the voltage command values of two phases other than the phase of the minimum voltage Vmin1 at the execution time of the flat-bottom two-phase modulation, with one of the first carrier wave signal C1 and the second carrier wave signal C2. Since the processing similar to FIG. 16 and FIG. 17 of Embodiment 1 is performed, explanation is omitted.

<Pulse Waves Before Shift Correction>

Figure 37:
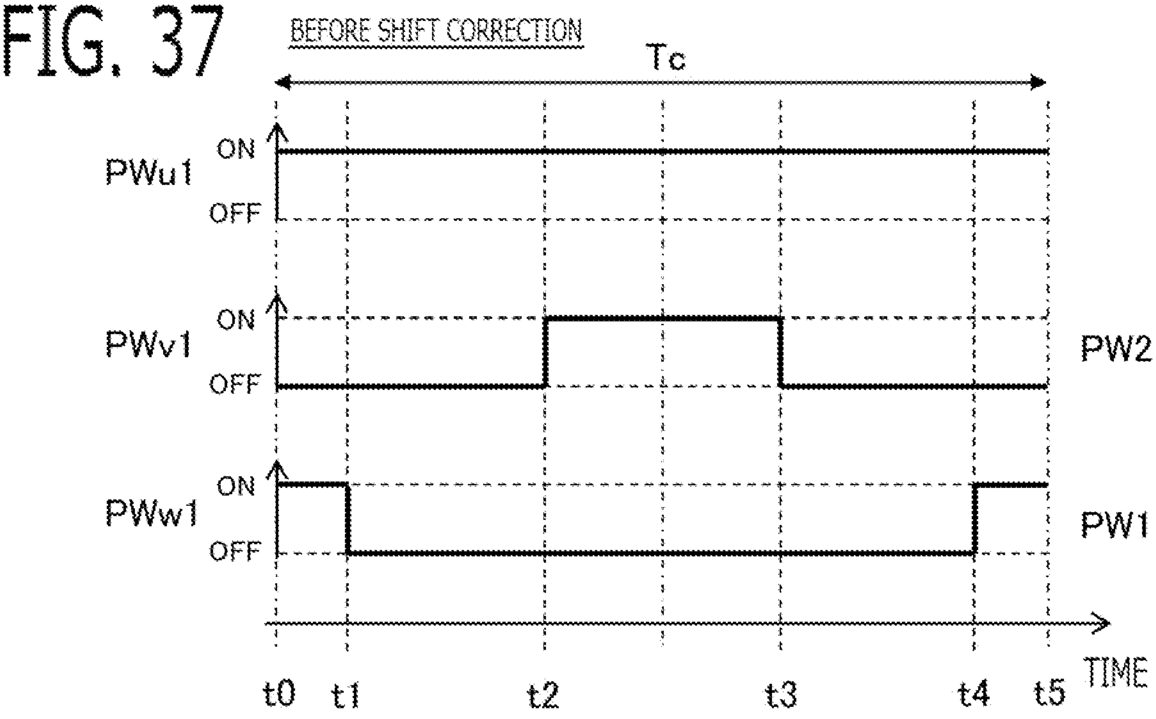
FIG. 37 is a time chart for explaining the pulse wave before the shift correction, according to Embodiment 3.

The pulse waves of three-phase of first set before the shift correction are generated similarly to Embodiment 1. FIG. 37 shows the pulse waves of three-phase of first set PWu1, PWv1, PWw1 before the shift correction at the timing A of FIG. 9. The pulse wave of V1 phase PWv1 is the second comparison pulse wave PW2 compared with the second carrier wave signal C2, and the pulse wave of W1 phase PWw1 is the first comparison pulse wave PW1 compared with the first carrier wave signal C1. The bus current Iinv1 is −Iv1 in t0 to t1 and t8 to t9, is Iu1 in t1 to t2 and t3 to t4, and is −Iw1 in t2 to t3. Power current flows at all the timings. That is, the bus current ripple can be reduced and the capacitor current can be reduced.

Unlike the present embodiment, if the pulse waves are generated by well-known third order harmonic wave superposition modulation, the switching stop phase is not provided. Accordingly, there are 6 rising or falling timings in the pulse waves of three phases (potentials of the winding terminals of three phases). On the other hand, in the present embodiment, before the shift correction, the flat-top two-phase modulation or the flat-bottom two-phase modulation is performed. In the pulse wave of one phase of the switching stop phase, there is no rising or falling timing. In the pulse waves of two phases other than the switching stop phase (potentials of the winding terminals of two phases), there are four rising or falling timings. Number of times can be reduced.

<Shift Correction>

Figure 38:
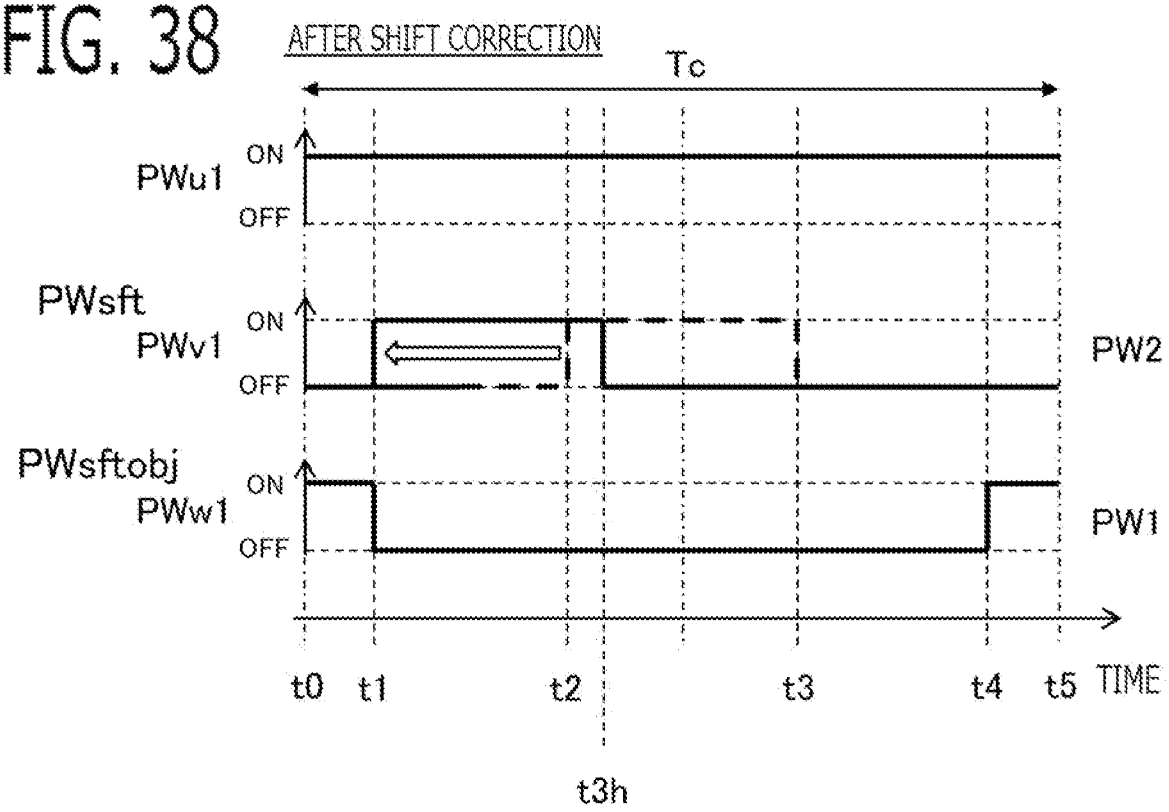
FIG. 38 is a time chart for explaining the pulse wave after the shift correction, according to Embodiment 3.

In the present embodiment, as shown in FIG. 38, within the same PWM period Tc, the PWM control unit 34 shifts one or both of the first comparison pulse wave PW1 and the second comparison pulse wave PW2 in the advance direction or the delay direction so that the rising timing of one of the potential of the winding terminal by the first comparison pulse wave PW1 and the potential of the winding terminal by the second comparison pulse wave PW2 coincides with the falling timing of the other.

As shown in FIG. 38, the PWM control unit 34 determines the pulse wave whose rising and falling are the first closest to the center of the PWM period Tc, as the pulse wave of a shift object PWsft to be shifted, and determines a shift direction to the advance direction or the delay direction. The PWM control unit 34 determines, as the pulse wave of the subjected shift object PWsftobj, other pulse wave which has, in the shift direction, rising or falling opposite to rising or falling on the shift direction side of the pulse wave of the shift object PWsft, within the same PWM period Tc; and shifts the pulse wave of the shift object PWsft in the shift direction so that rising or falling of potential of the winding terminal by the pulse wave of the shift object PWsft coincides with rising or falling of potential of the winding terminal by the pulse wave of the subjected shift object PWsftobj.

In the example of FIG. 38 corresponding to FIG. 37, the pulse wave of the shift object PWsft is the pulse wave of V1 phase PWv1 which is the second comparison pulse wave PW2, and the shift direction is determined to the advance direction. The pulse wave of the subjected shift object PWsftobj is determined to the pulse wave of W1 phase PWw1 which is the first comparison pulse wave PW1 which has, in the advance direction, the falling opposite to the rising on the advance direction side of the pulse wave of V1 phase PWv1. Then, the pulse wave of V1 phase PWv1 is shifted in the advance direction so that the rising of the potential of the winding terminal by the pulse wave of V1 phase PWv1 coincides with the falling of the potential of the winding terminal by the pulse wave of W1 phase PWw1. Accordingly, the rising of the potential of the winding terminal by the pulse wave of V1 phase PWv1 and the falling of the potential of the winding terminal by the pulse wave of W1 phase PWw1 can be canceled. By performing the shift correction, one pair of rising and falling are canceled. Accordingly, the number of rising or falling timings can be reduced to two, the leakage current can be suppressed by reducing the number, and the electromagnetic noise can be reduced.

In the example of FIG. 38, the bus current Iinv1 is −Iv1 in t0 to t1 and t4 to t5, is −Iw1 in t1 to t3*h*, and is Iu1 in t3*h* to t4. Accordingly, the bus current Iinv1Iinv2 changes in the timing, but does not change in the combination and the period of each combination. Accordingly, even if the shift correction is performed, similarly to before the shift correction, the bus current ripple can be reduced, and the capacitor current can be maintained equivalent to before the shift correction.

Alternatively, the shift direction may be determined to the delay direction, and the pulse wave of V1 phase PWv1 may be shifted in the delay direction so that the falling of the potential of the winding terminal by the pulse wave of V1 phase PWv1 coincide with the rising of the potential of the winding terminal by the pulse wave of W1 phase PWw1.

In each of the above-mentioned embodiments, there was explained the case where the PWM control unit 34 shifts one of paired the first comparison pulse wave PW1 and the second comparison pulse wave PW2 in the advance direction or the delay direction. However, the PWM control unit 34 may shift both of paired the first comparison pulse wave PW1 and the second comparison pulse wave PW2 in the advance direction or the delay direction so as to approach with each other.

In each of the above-mentioned embodiments, there was explained the case where the center value of the DC voltage is set to Vdc/2; and the voltage command values of three-phase, the basic voltage command values of three-phase, and the first and the second carrier wave signals oscillate centering on Vdc/2. However, the center value of the DC voltage may be set to 0; and the voltage command values of three-phase, the basic voltage command values of three-phase, and the first and second carrier wave signals may oscillate centering on 0. In this case, Vdc/2 are subtracted from the voltage command values of three-phase, the basic voltage command values of three-phase, and the first and second carrier wave signals of each Embodiment.

Although the present disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments. It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

REFERENCE SIGNS LIST

1: AC Rotary Machine, 3: Smoothing Capacitor, 30: AC rotary machine controller, 33: Voltage Command Calculation Unit, 34: PWM Control Unit, 41: Inverter of First Set, 42: Inverter of Second Set, C1: First Carrier Wave Signal, C2: Second Carrier Wave Signal, PW1: First Comparison Pulse Wave, PW2: Second Comparison Pulse Wave, PWsft: Pulse Wave of Shift Object, PWsft2: Pulse Wave of Second Shift Object, PWsftobj: Pulse Wave of Subjected Shift Object, PWsftobj2: Pulse Wave of Second Subjected Shift Object, Tc: PWM period

What is claimed is:

1. An AC rotary machine controller that controls an AC rotary machine having a stator provided with m sets of n-phase windings (m is one or more natural numbers, and n is three or more natural numbers) via m sets of inverters, the AC rotary machine controller comprising at least one processor configured to implement:

a voltage command calculator that, for each set of m sets, calculates voltage command values of n-phase applied to the n-phase windings; and a PWM controller that, for each set of m sets, generates pulse waves of n-phase by comparing each of the voltage command values of n-phase with a carrier wave signal oscillating at a PWM period, and turns on and off application of a DC voltage to a winding terminal of each phase by turning on and off switching devices of each phase of the inverter by each of the pulse waves of n-phase;

wherein, for each set of m sets, the voltage command calculator calculates basic voltage command values of n-phase; and executes a flat-top two-phase modulation that calculates an offset voltage by subtraction a DC voltage value from a maximum voltage value in the basic voltage command values of n-phase, and calculates the voltage command values of n-phase by subtracting the offset voltage from the basic voltage command values of n-phase, or a flat-bottom two-phase modulation that calculates the voltage command values of n-phase by subtracting a minimum voltage in the voltage command values of n-phase from the basic voltage command values of n-phase, and wherein the PWM controller uses, as the carrier wave signal, a first carrier wave signal, and a second carrier wave signal which differs from the first carrier wave signal by 180 degrees in phase;

the PWM controller generates at least one first comparison pulse wave which is at least one the pulse wave by comparing the first carrier wave signal with at least one the voltage command value, and generates at least one second comparison pulse wave which is at least one the pulse wave by comparing the second carrier wave signal with at least one other the voltage command value, out of the voltage command values of m×(n−1) not coinciding with the maximum value or the minimum value of the carrier wave signal in m sets;

within the same PWM period, the PWM controller sets at least one pair of the first comparison pulse wave and the second comparison pulse wave; and within the same PWM period, the PWM controller shifts one or both of paired the first comparison pulse wave and the second comparison pulse wave in an advance direction or a delay direction so that a rising timing of one of a potential of the winding terminal applied by the paired first comparison pulse wave and a potential of the winding terminal applied by the paired second comparison pulse wave coincides with a falling timing of the other.

2. The AC rotary machine controller according to claim 1, wherein m is two, and n is three.

3. The AC rotary machine controller according to claim 2, wherein, for each set of two sets, the PWM controller shifts at least one the pulse wave in the advance direction or the delay direction so that types of on-off patterns of the switching devices of each phase which are set in the PWM period and a set period of each type in the PWM period become the same before and after a shift correction of the pulse wave.

4. The AC rotary machine controller according to claim 3, wherein the PWM controller shifts other pulse wave whose rising and falling exist between rising and falling of the pulse wave before the shift in the pulse wave to be shifted, in the same direction as the pulse wave to be shifted, within the same PWM period.

5. The AC rotary machine controller according to claim 2, wherein the PWM controller determines the pulse wave whose rising and falling are the second closest or the first closest to the center of the PWM period, as the pulse wave of a shift object to be shifted; determines a shift direction to the advance direction or the delay direction; determines, as the pulse wave of a subjected shift object, other pulse wave which has, in the shift direction, rising or falling opposite to rising or falling on the shift direction side of the pulse wave of the shift object within the same PWM period; and shifts the pulse wave of the shift object in the shift direction so that rising or falling of potential of the winding terminal by the pulse wave of the shift object coincides with rising or falling of potential of the winding terminal by the pulse wave of the subjected shift object.

6. The AC rotary machine controller according to claim 5, wherein the PWM controller determines the pulse wave whose rising and falling are the second closest to the center of the PWM period, as the pulse wave of the shift object;

determines the pulse wave whose rising and falling are the first closest to the center of the PWM period, as the pulse wave of a second shift object to be shifted in the same direction as the pulse wave of the shift object; and shifts the pulse wave of the second shift object in the same direction as the pulse wave of the shift object so that rising and falling of the pulse wave of the second shift object after the shift are positioned between rising and falling of the pulse wave of the shift object after the shift.

7. The AC rotary machine controller according to claim 6, wherein the PWM controller sets a shift amount of the pulse wave of the second shift object to the same amount as a shift amount of the pulse wave of the shift object.

8. The AC rotary machine controller according to claim 5, wherein the PWM controller determines the pulse wave whose rising and falling are the second closest to the center of the PWM period, as the pulse wave of the shift object;

determines the pulse wave whose rising and falling are the first closest to the center of the PWM period, as the pulse wave of a second shift object;

determines a second shift direction of the pulse wave of the second shift object to the advance direction or the delay direction;

determines, as the pulse wave of a second subjected shift object, other pulse wave which has, in the second shift direction, rising or falling opposite to rising or falling on the second shift direction side of the pulse wave of the second shift object, and has rising or falling different from rising or falling of the pulse wave of the subjected shift object with which the pulse wave of the shift object is coincided, within the same PWM period; and shifts the pulse wave of the second shift object in the second shift direction so that rising or falling of potential of the winding terminal by the pulse wave of the second shift object coincides with rising or falling of the potential of the winding terminal by the pulse wave of the second subjected shift object.

9. The AC rotary machine controller according to claim 2, wherein, for each set of two sets, the voltage command calculator executes the flat-top two-phase modulation, when a phase of a maximum current absolute value in absolute values of currents of three-phase flowing into the three-phase windings coincides with a phase of a maximum voltage in the voltage command values of three-phase; and executes the flat-bottom two-phase modulation, when the phase of the maximum current absolute value coincides with a phase of a minimum voltage in the voltage command values of three-phase, wherein, for each set of two sets, in two phases other than the phase of the maximum voltage at the execution time of the flat-top two-phase modulation, or two phases other than the phase of the minimum voltage at the execution time of the flat-bottom two-phase modulation, the PWM controller generates the first comparison pulse wave by comparing the voltage command value of one phase with the first carrier wave signal, and generates the second comparison pulse wave by comparing the voltage command value of the other phase with the second carrier wave signal.

10. The AC rotary machine controller according to claim 9, wherein, for each set of two sets, when the phase of the maximum current absolute value coincides with a phase of a middle voltage in the voltage command values of three-phase, the voltage command calculator executes the flat-top two-phase modulation or the flat-bottom two-phase modulation, wherein, for each set of two sets, when the phase of the maximum current absolute value coincides with the phase of the middle voltage in the voltage command values of three-phase, the PWM controller compares the voltage command values of two phases other than the phase of the maximum voltage at the execution time of the flat-top two-phase modulation, or the voltage command values of two phases other than the phase of the minimum voltage at the execution time of the flat-bottom two-phase modulation, with one of the first carrier wave signal and the second carrier wave signal.

11. The AC rotary machine controller according to claim 2, wherein a phase difference between the three-phase windings of first set and the three-phase windings of second set is 30 degrees.

12. The AC rotary machine controller according to claim 2, wherein, for each set of two sets, the voltage command calculator executes the same flat-top two-phase modulation, or executes the same flat-bottom two-phase modulation, and wherein the PWM controller compares the voltage command values of three-phase of first set with the first carrier wave signal, and compares the voltage command values of three-phase of second set with the second carrier wave signal.

13. The AC rotary machine controller according to claim 1, wherein the PWM controller sets a pair of the first comparison pulse wave and the second comparison pulse wave in which a shift amount in the advance direction or the delay direction of the pulse wave becomes the minimum.

14. The AC rotary machine controller according to claim 1, wherein m is one, and n is three, wherein the PWM controller generates the first comparison pulse wave by comparing one of the voltage command values of two phases which do not coincide with the maximum value or the minimum value of the carrier wave signal, with the first carrier wave signal; and generates the second comparison pulse wave by comparing the other of the voltage command value of the two phases with the second carrier wave signal, and within the same PWM period, the PWM controller shifts one or both of the first comparison pulse wave and the second comparison pulse wave in the advance direction or the delay direction so that a rising timing of one of a potential of the winding terminal by the first comparison pulse wave and a potential of the winding terminal by the second comparison pulse wave coincides with a falling timing of the other.

15. The AC rotary machine controller according to claim 14, wherein the PWM controller determines the pulse wave whose rising and falling are the first closest to the center of the PWM period, as the pulse wave of a shift object to be shifted, and determines a shift direction to the advance direction or the delay direction;

determines, as the pulse wave of a subjected shift object, other pulse wave which has, in the shift direction, rising or falling opposite to rising or falling on the shift direction side of the pulse wave of the shift object within the same PWM period; and shifts the pulse wave of the shift object in the shift direction so that rising or falling of potential of the winding terminal by the pulse wave of the shift object coincides with rising or falling of potential of the winding terminal by the pulse wave of the subjected shift object.

16. The AC rotary machine controller according to claim 14, wherein the voltage command calculator executes the flat-top two-phase modulation, when a phase of a maximum current absolute value in absolute values of currents of three-phase flowing into the three-phase windings coincides with the phase of the maximum voltage in the voltage command values of three-phase; and executes the flat-bottom two-phase modulation, when the phase of the maximum current absolute value coincides with the phase of the minimum voltage in the voltage command values of three-phase, wherein, in two phases other than the phase of the maximum voltage at the execution time of the flat-top two-phase modulation, or two phases other than the phase of the minimum voltage at the execution time of the flat-bottom two-phase modulation, the PWM controller compares the voltage command value of one phase with the first carrier wave signal, and compares the voltage command value of the other phase with the second carrier wave signal.

17. A vehicle driving apparatus comprising:

the AC rotary machine controller according to claim 1, the AC rotary machine, and a driving force transmission mechanism that transmits a driving force of the AC rotary machine to wheels of a vehicle.

18. An electric power steering apparatus comprising:

the AC rotary machine controller according to claim 1, the AC rotary machine, and a driving force transmission mechanism that transmits a driving force of the AC rotary machine to a steering apparatus of a vehicle.

* * * * *